United States Patent
Sindhu et al.

(10) Patent No.: US 9,985,911 B2
(45) Date of Patent: May 29, 2018

(54) METHODS AND APPARATUS RELATED TO A FLEXIBLE DATA CENTER SECURITY ARCHITECTURE

(71) Applicant: Juniper Networks, Inc., Sunnyvale, CA (US)

(72) Inventors: Pradeep Sindhu, Los Altos Hills, CA (US); Gunes Aybay, Los Altos, CA (US); Jean-Marc Frailong, Los Altos, CA (US); Anjan Venkatramani, Los Altos, CA (US); Quaizar Vohra, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days. days.

(21) Appl. No.: 14/621,892

(22) Filed: Feb. 13, 2015

(65) Prior Publication Data

US 2015/0163171 A1  Jun. 11, 2015

Related U.S. Application Data

(63) Continuation of application No. 13/608,799, filed on Sep. 10, 2012, now Pat. No. 8,958,432, which is a (Continued)

(51) Int. Cl.
*H04L 12/935* (2013.01)
*H04L 12/24* (2006.01)
(Continued)

(52) U.S. Cl.
CPC .......... *H04L 49/30* (2013.01); *H04L 41/0806* (2013.01); *H04L 41/0846* (2013.01);
(Continued)

(58) Field of Classification Search
None
See application file for complete search history.

(56) References Cited

U.S. PATENT DOCUMENTS

| 599,518 A | 2/1898 | Runge |
|---|---|---|
| 4,942,574 A | 7/1990 | Zelle |

(Continued)

FOREIGN PATENT DOCUMENTS

| CN | 1098236 A | 2/1995 |
|---|---|---|
| CN | 1167417 A | 12/1997 |

(Continued)

OTHER PUBLICATIONS

Search Report for European Application No. 09170037.7, dated Dec. 10, 2009, 7 pages.

(Continued)

*Primary Examiner* — Duc T Duong
(74) *Attorney, Agent, or Firm* — Cooley LLP

(57) ABSTRACT

In one embodiment, edge devices can be configured to be coupled to a multi-stage switch fabric and peripheral processing devices. The edge devices and the multi-stage switch fabric can collectively define a single logical entity. A first edge device from the edge devices can be configured to be coupled to a first peripheral processing device from the peripheral processing devices. The second edge device from the edge devices can be configured to be coupled to a second peripheral processing device from the peripheral processing devices. The first edge device can be configured such that virtual resources including a first virtual resource can be defined at the first peripheral processing device. A network management module coupled to the edge devices and configured to provision the virtual resources such that the first (Continued)

virtual resource can be migrated from the first peripheral processing device to the second peripheral processing device.

16 Claims, 23 Drawing Sheets

Related U.S. Application Data continuation of application No. 12/558,126, filed on Sep. 11, 2009, now Pat. No. 8,265,071, which is a continuation-in-part of application No. 12/343,728, filed on Dec. 24, 2008, now Pat. No. 8,325,749, and a continuation-in-part of application No. 12/345,500, filed on Dec. 29, 2008, now Pat. No. 8,804,710, and a continuation-in-part of application No. 12/345,502, filed on Dec. 29, 2008, now Pat. No. 8,804,711, and a continuation-in-part of application No. 12/242,224, filed on Sep. 30, 2008, now Pat. No. 8,154,996, said application No. 12/558,126 is a continuation-in-part of application No. 12/242,230, filed on Sep. 30, 2008, now Pat. No. 8,218,442, and a continuation-in-part of application No. 12/495,337, filed on Jun. 30, 2009, now Pat. No. 8,730,954, and a continuation-in-part of application No. 12/495,344, filed on Jun. 30, 2009, and a continuation-in-part of application No. 12/495,358, filed on Jun. 30, 2009, now Pat. No. 8,335,213, and a continuation-in-part of application No. 12/495,361, filed on Jun. 30, 2009, now Pat. No. 8,755,396, and a continuation-in-part of application No. 12/495,364, filed on Jun. 30, 2009, now Pat. No. 9,847,953.

(60) Provisional application No. 61/098,516, filed on Sep. 19, 2008, provisional application No. 61/096,209, filed on Sep. 11, 2008.

(51) Int. Cl.
  *H04L 12/947* (2013.01)
  *H04L 12/931* (2013.01)
  *H04L 29/06* (2006.01)

(52) U.S. Cl.
  CPC ............ *H04L 49/257* (2013.01); *H04L 49/35* (2013.01); *H04L 49/356* (2013.01); *H04L 63/101* (2013.01)

(56) References Cited

U.S. PATENT DOCUMENTS

| | | | |
|---|---|---|---|
| 5,367,520 A | 11/1994 | Cordell | |
| 5,457,682 A | 10/1995 | Haag et al. | |
| 5,689,508 A | 11/1997 | Lyles | |
| 5,801,641 A | 9/1998 | Yang et al. | |
| 5,926,473 A | 7/1999 | Gridley | |
| 5,945,922 A | 8/1999 | Gao et al. | |
| 5,991,295 A | 11/1999 | Tout et al. | |
| 5,991,297 A | 11/1999 | Palnati | |
| 6,049,542 A | 4/2000 | Prasad | |
| 6,049,546 A | 4/2000 | Ramakrishnan | |
| 6,067,286 A | 5/2000 | Jones et al. | |
| 6,078,503 A | 6/2000 | Gallagher et al. | |
| 6,246,692 B1 | 6/2001 | Dai et al. | |
| 6,335,930 B1 | 1/2002 | Lee | |
| 6,473,428 B1 | 10/2002 | Nichols et al. | |
| 6,587,470 B1 | 7/2003 | Elliot et al. | |
| 6,597,689 B1 | 7/2003 | Chiu et al. | |
| 6,665,495 B1 | 12/2003 | Miles et al. | |
| 6,751,238 B1 | 6/2004 | Lipp et al. | |
| 6,760,339 B1 | 7/2004 | Noel et al. | |
| 6,829,237 B2 | 12/2004 | Carson et al. | |
| 6,850,704 B1 | 2/2005 | Dave | |
| 6,868,082 B1 | 3/2005 | Allen, Jr. et al. | |
| 6,876,652 B1 | 4/2005 | Bell et al. | |
| 6,981,078 B2 | 12/2005 | Paul | |
| 6,990,097 B2 | 1/2006 | Norman et al. | |
| 7,046,661 B2 | 5/2006 | Oki et al. | |
| 7,082,134 B1 | 7/2006 | Lim et al. | |
| 7,088,710 B1 | 8/2006 | Johnson et al. | |
| 7,173,931 B2 | 2/2007 | Chao et al. | |
| 7,177,919 B1 | 2/2007 | Truong et al. | |
| 7,178,052 B2 | 2/2007 | Hebber et al. | |
| 7,180,862 B2 | 2/2007 | Peebles et al. | |
| 7,230,947 B1 | 6/2007 | Huber et al. | |
| 7,248,760 B1 | 7/2007 | Corbalis et al. | |
| 7,295,566 B1 | 11/2007 | Chiu et al. | |
| 7,406,038 B1 | 7/2008 | Oelke et al. | |
| 7,408,927 B2 | 8/2008 | George | |
| 7,428,219 B2 | 9/2008 | Khosravi | |
| 7,430,171 B2 | 9/2008 | Black et al. | |
| 7,464,147 B1 | 12/2008 | Fakhouri | |
| 7,489,625 B2 | 2/2009 | Varma | |
| 7,496,252 B1 | 2/2009 | Corbalis et al. | |
| 7,505,458 B2 | 3/2009 | Menon et al. | |
| 7,519,054 B2 | 4/2009 | Varma | |
| 7,564,869 B2 | 7/2009 | Cafiero et al. | |
| 7,586,909 B1 | 9/2009 | Walrand et al. | |
| 7,590,102 B2 | 9/2009 | Varma | |
| 7,606,262 B1 | 10/2009 | Beshai et al. | |
| 7,688,816 B2 | 3/2010 | Park et al. | |
| 7,720,064 B1 | 5/2010 | Rohde | |
| 7,751,416 B2 | 7/2010 | Smith et al. | |
| 7,774,500 B1 * | 8/2010 | D'Souza et al. | ............ 709/242 |
| 7,792,017 B2 | 9/2010 | Lu et al. | |
| 7,792,944 B2 * | 9/2010 | DeSantis et al. | ............ 709/223 |
| 7,830,905 B2 | 11/2010 | Scott et al. | |
| 7,843,836 B2 | 11/2010 | Elliott et al. | |
| 7,873,693 B1 | 1/2011 | Mehrotra et al. | |
| 7,899,930 B1 | 3/2011 | Turner et al. | |
| 7,936,776 B2 | 5/2011 | Deng | |
| 7,961,734 B2 | 6/2011 | Panwar et al. | |
| 8,054,832 B1 * | 11/2011 | Shukla | ............ H04L 45/00 370/230 |
| 8,265,071 B2 | 9/2012 | Sindhu et al. | |
| 2002/0019958 A1 | 2/2002 | Cantwell et al. | |
| 2002/0034183 A1 | 3/2002 | Prabhakar et al. | |
| 2002/0061020 A1 | 5/2002 | Chao et al. | |
| 2002/0064170 A1 | 5/2002 | Siu et al. | |
| 2002/0118692 A1 | 8/2002 | Oberman et al. | |
| 2002/0136484 A1 | 9/2002 | MacDonald | |
| 2002/0141397 A1 | 10/2002 | Piekarski et al. | |
| 2002/0145974 A1 | 10/2002 | Saidi et al. | |
| 2002/0159449 A1 | 10/2002 | Carson et al. | |
| 2002/0168012 A1 | 11/2002 | Ramaswamy | |
| 2003/0026287 A1 | 2/2003 | Mullendore et al. | |
| 2003/0081540 A1 | 5/2003 | Jones et al. | |
| 2003/0084219 A1 | 5/2003 | Yao et al. | |
| 2003/0200330 A1 | 10/2003 | Oelke et al. | |
| 2003/0200473 A1 | 10/2003 | Fung | |
| 2003/0223420 A1 | 12/2003 | Ferolito | |
| 2004/0030766 A1 | 2/2004 | Witkowski | |
| 2004/0034864 A1 | 2/2004 | Barrett et al. | |
| 2004/0039986 A1 | 2/2004 | Solomon et al. | |
| 2004/0062202 A1 | 4/2004 | Storr | |
| 2004/0117438 A1 | 6/2004 | Considine et al. | |
| 2004/0165598 A1 | 8/2004 | Shrimali et al. | |
| 2005/0002334 A1 | 1/2005 | Chao et al. | |
| 2005/0002410 A1 | 1/2005 | Chao et al. | |
| 2005/0025141 A1 | 2/2005 | Chao et al. | |
| 2005/0055428 A1 | 3/2005 | Terai et al. | |
| 2005/0102549 A1 | 5/2005 | Davies et al. | |
| 2005/0120160 A1 | 6/2005 | Plouffe | |
| 2005/0175017 A1 | 8/2005 | Christensen et al. | |
| 2005/0201400 A1 | 9/2005 | Park et al. | |
| 2006/0018379 A1 | 1/2006 | Cooper | |
| 2006/0029072 A1 | 2/2006 | Perera et al. | |
| 2006/0165070 A1 | 7/2006 | Hall et al. | |
| 2006/0165085 A1 | 7/2006 | Konda | |
| 2006/0165098 A1 | 7/2006 | Varma | |

(56) References Cited

U.S. PATENT DOCUMENTS

| | | |
|---|---|---|
| 2006/0165111 A1 | 7/2006 | Varma |
| 2006/0165112 A1 | 7/2006 | Varma |
| 2006/0269187 A1 | 11/2006 | Lin et al. |
| 2007/0002883 A1 | 1/2007 | Edsall et al. |
| 2007/0006056 A1 | 1/2007 | Lehner et al. |
| 2007/0121499 A1 | 5/2007 | Pal et al. |
| 2007/0140230 A1 | 6/2007 | Beshai |
| 2007/0189283 A1 | 8/2007 | Agarwal et al. |
| 2007/0280253 A1 | 12/2007 | Rooholamini et al. |
| 2007/0291535 A1 | 12/2007 | Eberle et al. |
| 2008/0044181 A1 | 2/2008 | Sindhu |
| 2008/0065749 A1 | 3/2008 | Kucukyavuz et al. |
| 2008/0075071 A1 | 3/2008 | Beshai |
| 2008/0080548 A1 | 4/2008 | Mullendore et al. |
| 2008/0151863 A1 | 6/2008 | Lawrence et al. |
| 2008/0159277 A1 | 7/2008 | Vobbilisetty et al. |
| 2008/0212472 A1 | 9/2008 | Musacchio |
| 2008/0240122 A1* | 10/2008 | Richardson et al. ......... 370/401 |
| 2008/0259555 A1 | 10/2008 | Bechtolsheim et al. |
| 2008/0275975 A1 | 11/2008 | Pandey et al. |
| 2008/0285449 A1 | 11/2008 | Larsson et al. |
| 2008/0315985 A1 | 12/2008 | Johnsen et al. |
| 2008/0317025 A1 | 12/2008 | Manula et al. |
| 2008/0320117 A1 | 12/2008 | Johnsen et al. |
| 2009/0037585 A1 | 2/2009 | Miloushev et al. |
| 2009/0052345 A1 | 2/2009 | Brown et al. |
| 2009/0070775 A1 | 3/2009 | Riley |
| 2009/0074414 A1 | 3/2009 | Miles et al. |
| 2009/0116507 A1* | 5/2009 | Kanda ......................... 370/464 |
| 2009/0129775 A1 | 5/2009 | Handelman |
| 2009/0161692 A1 | 6/2009 | Hirata et al. |
| 2009/0214208 A1 | 8/2009 | Beshai |
| 2009/0296726 A1* | 12/2009 | Snively ................. H04L 45/66 370/401 |
| 2009/0300608 A1 | 12/2009 | Ferris et al. |
| 2009/0319688 A1* | 12/2009 | Mason ................. G06F 15/16 709/242 |
| 2009/0323706 A1* | 12/2009 | Germain ............ H04L 67/1097 370/401 |
| 2010/0014526 A1* | 1/2010 | Chavan ................. H04L 49/35 370/395.53 |
| 2010/0017497 A1 | 1/2010 | Brown et al. |
| 2010/0020806 A1 | 1/2010 | Vandat et al. |
| 2010/0027420 A1* | 2/2010 | Smith .................. G06F 9/4856 370/235 |
| 2010/0061240 A1 | 3/2010 | Sindhu et al. |
| 2010/0061241 A1 | 3/2010 | Sindhu et al. |
| 2010/0061242 A1 | 3/2010 | Sindhu et al. |
| 2010/0061367 A1 | 3/2010 | Sindhu et al. |
| 2010/0061389 A1 | 3/2010 | Sindhu et al. |
| 2010/0061391 A1 | 3/2010 | Sindhu et al. |
| 2010/0061394 A1 | 3/2010 | Sindhu et al. |
| 2010/0165876 A1 | 7/2010 | Shukla et al. |
| 2010/0165877 A1 | 7/2010 | Shukla et al. |
| 2010/0169467 A1 | 7/2010 | Shukla et al. |
| 2010/0189121 A1 | 7/2010 | Beshai |
| 2010/0192202 A1 | 7/2010 | Ker |
| 2011/0052191 A1 | 3/2011 | Beshai |
| 2012/0320795 A1 | 12/2012 | Shukla et al. |
| 2013/0003726 A1 | 1/2013 | Sindhu et al. |
| 2014/0033197 A1 | 1/2014 | Vinberg et al. |

FOREIGN PATENT DOCUMENTS

| | | |
|---|---|---|
| CN | 101132286 A | 2/2008 |
| EP | 1128585 A2 | 8/2001 |
| EP | 1 892 905 A1 | 2/2008 |

OTHER PUBLICATIONS

F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

H. Jonathan Chao et al. "Matching Algorithms for Three-Stage Bufferless Clos Network Switches" IEEE Communications Magazine, Oct. 2003, pp. 46-54.

Jonathan S. Turner et al. "Multirate Clos Networks" IEEE Communications Magazine, Oct. 2003, pp. 1-11.

Office Action dated Apr. 1, 2011 for U.S. Appl. No. 12/495,337 (17 pages).

Office Action dated Dec. 13, 2011 for U.S. Appl. No. 12/495,337 (17 pages).

Office Action dated May 11, 2011 for U.S. Appl. No. 12/495,344 (11 pages).

Office Action dated Jan. 4, 2012 for U.S. Appl. No. 12/495,344 (13 pages).

Office Action dated Dec. 21, 2011 for U.S. Appl. No. 12/495,358 (12 pages).

Office Action dated Jun. 15, 2011 for U.S. Appl. No. 12/495,361.

Office Action dated Jan. 5, 2012 for U.S. Appl. No. 12/495,361.

Office Action dated Apr. 20, 2011 for U.S. Appl. No. 12/495,364.

Final Office Action dated Oct. 21, 2011 for U.S. Appl. No. 12/495,364.

Office Action dated Mar. 26, 2012 for U.S. Appl. No. 12/558,130.

Office Action dated Jul. 17, 2012 for U.S. Appl. No. 12/495,337.

Search Report for European Application No. 12185735.3, dated Oct. 29, 2012.

Chinese Office Action dated Nov. 30, 2012 issued in corresponding Chinese Application No. 200910246898.X.

Second Chinese Office Action dated Jul. 3, 2013 issued in corresponding Chinese Application No. 200910246898.X.

Office Action dated Apr. 10, 2013 for U.S. Appl. No. 12/495,337.

Final Office Action dated Aug. 26, 2013 for U.S. Appl. No. 12/495,337.

Final Office Action dated Sep. 13, 2012 for U.S. Appl. No. 12/495,344.

Office Action dated Aug. 15, 2013 for U.S. Appl. No. 12/495,344.

Final Office Action dated Jan. 17, 2014 for U.S. Appl. No. 12/495,344.

Final Office Action dated Sep. 13, 2012 for U.S. Appl. No. 12/495,361.

Final Office Action dated Aug. 16, 2013 for U.S. Appl. No. 12/495,361.

Office Action for U.S. Appl. No. 13/608,799 dated Nov. 21, 2013.

Office Action for Chinese Application No. 201410138824.5 dated Jul. 19, 2016.

Search Report for Chinese Application No. 201410138824.5 dated Jun. 30, 2016 (No English translation available).

Final Office Action for U.S. Appl. No. 12/495,364 dated Aug. 30, 2016.

Office Action for U.S. Appl. No. 12/495,364 dated Jan. 4, 2016.

Final Office Action for U.S. Appl. No. 13/608,799 dated Jul. 24, 2014.

Office Action for European Application No. 09170037.7 dated Dec. 9, 2016.

Office Action for European Application No. 12185735.3 dated Dec. 9, 2016.

Office Action for U.S. Appl. No. 12/495,344, dated Jun. 30, 2017.

Office Action for U.S. Appl. No. 12/495,364, dated Mar. 27, 2017.

Second Office Action for Chinese Application No. 201410138824.5 dated Feb. 4, 2017.

* cited by examiner

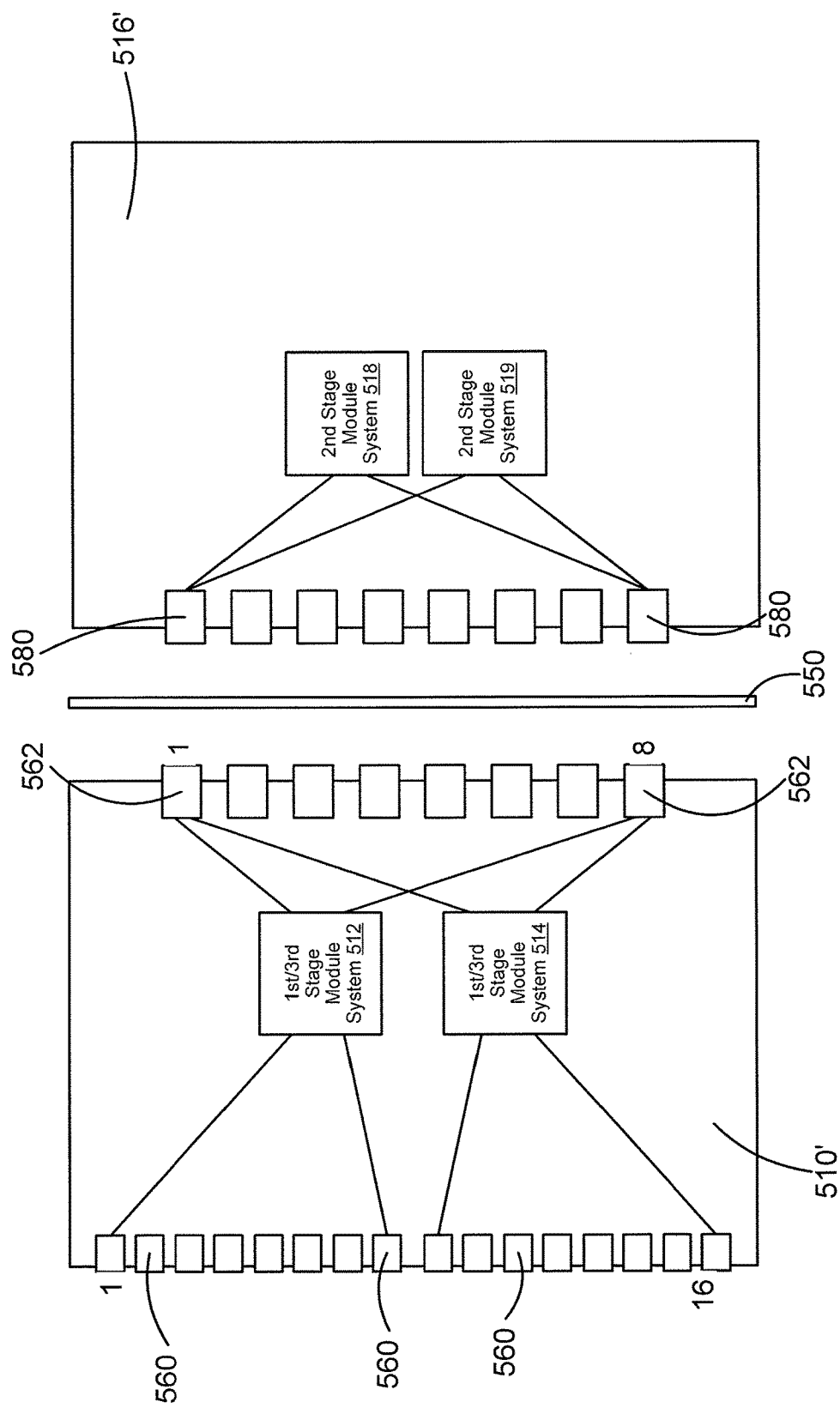

METHODS AND APPARATUS RELATED TO A FLEXIBLE DATA CENTER SECURITY ARCHITECTURE

CROSS REFERENCE OF RELATED PATENT APPLICATIONS

This patent application is a continuation of U.S. patent application Ser. No. 13/608,799, (now U.S. Pat. No. 8,958,432), entitled "Methods And Apparatus Related To A Flexible Data Center Security Architecture", filed on Sep. 10, 2012 which is a continuation of and claims priority to U.S. patent application Ser. No. 12/558,126, (now U.S. Pat. No. 8,265,071), entitled "Methods And Apparatus Related To A Flexible Data Center Security Architecture" and filed on Sep. 11, 2009, which claims priority to and the benefit of U.S. Patent Application No. 61/098,516 entitled "Systems, Apparatus and Methods for a Data Center" and filed on Sep. 19, 2008; and claims priority to and the benefit of U.S. Patent Application No. 61/096,209 entitled "Methods and Apparatus Related to Flow Control within a Data Center" and filed on Sep. 11, 2008; each of which is incorporated herein by reference in its entirety.

U.S. patent application Ser. No. 12/558,126, is also a continuation-in-part of U.S. patent application Ser. No. 12/343,728, now (U.S. Pat. No. 8,325,749), entitled "Methods and Apparatus for Transmission of Groups of Cells via a Switch Fabric" and filed on Dec. 24, 2008; a continuation-in-part of U.S. patent application Ser. No. 12/345,500 (now U.S. Pat. No. 8,804,710), entitled "System Architecture for a Scalable and Distributed Multi-Stage Switch Fabric" and filed on Dec. 29, 2008; a continuation-in-part of U.S. patent application Ser. No. 12/345,502 (now U.S. Pat. No. 8,804,711), entitled "Methods and Apparatus Related to a Modular Switch Architecture" and filed on Dec. 29, 2008; a continuation-in-part of U.S. patent application Ser. No. 12/242,224 (now U.S. Pat. No. 8,154,996), entitled "Methods and Apparatus for Flow Control Associated with Multi-Staged Queues" and filed on Sep. 30, 2008, which claims priority to and the benefit of U.S. Patent Application No. 61/096,209 entitled "Methods and Apparatus Related to Flow Control within a Data Center" and filed on Sep. 11, 2008; and a continuation-in-part of U.S. patent application Ser. No. 12/242,230 (now U.S. Pat. No. 8,218,442), entitled "Methods and Apparatus for Flow-Controllable Multi-Staged Queues" and filed on Sep. 30, 2008, which claims priority to and the benefit of U.S. Patent Application No. 61/096,209 entitled "Methods and Apparatus Related to Flow Control within a Data Center" and filed on Sep. 11, 2008. Each of the above-identified applications is incorporated herein by reference in its entirety.

U.S. patent application Ser. No. 12/558,126, is also is also a continuation-in-part of U.S. patent application Ser. No. 12/495,337 (now U.S. Pat. No. 8,730,954), entitled "Methods and Apparatus Related to Any-to-Any Connectivity within a Data Center" and filed Jun. 30, 2009; a continuation-in-part of U.S. patent application Ser. No. 12/495,344, entitled "Methods and Apparatus Related to Lossless Operation within a Data Center" and filed on Jun. 30, 2009; a continuation-in-part of U.S. patent application Ser. No. 12/495,358 (now U.S. Pat. No. 8,335,213), entitled "Methods and Apparatus Related to Low Latency within a Data Center" and filed on Jun. 30, 2009; a continuation-in-part of U.S. patent application Ser. No. 12/495,361 (now U.S. Pat. No. 8,755,396), entitled "Methods and Apparatus Related to Flow Control within a Data Center Switch Fabric" and filed on Jun. 30, 2009; and a continuation-in-part of U.S. patent application Ser. No. 12/495,364 (now U.S. Pat. No. 9,847,953), entitled "Methods and Apparatus Related to Virtualization of Data Center Resources" and filed on Jun. 30, 2009. Each of the above-identified applications is incorporated herein by reference in its entirety.

U.S. patent application Ser. No. 12/558,126, is also related to U.S. patent application Ser. No. 12/558,130 (now U.S. Pat. No. 8,340,088), entitled "Methods and Apparatus Related to a Low Cost Data Center Architecture" and filed on Sep. 11, 2009, which is incorporated herein by reference in its entirety.

SUMMARY

In one embodiment, edge devices can be configured to be coupled to a multi-stage switch fabric and peripheral processing devices. The edge devices and the multi-stage switch fabric can collectively define a single logical entity. A first edge device from the edge devices can be configured to be coupled to a first peripheral processing device from the peripheral processing devices. The second edge device from the edge devices can be configured to be coupled to a second peripheral processing device from the peripheral processing devices. The first edge device can be configured such that virtual resources including a first virtual resource can be defined at the first peripheral processing device. A network management module coupled to the edge devices and configured to provision the virtual resources such that the first virtual resource can be migrated from the first peripheral processing device to the second peripheral processing device.

BACKGROUND

Embodiments relate generally to data center equipment, and more particularly to architectures, apparatus and methods for data center systems having a switch core and edge devices.

Known architectures for data center systems involve overly involved and complex approaches that increase the costs and latency of such systems. For example, some known data center networks consist of three or more layers of switches where Ethernet and/or Internet Protocol (IP) packet processing is performed at each layer. Packet processing and queuing overhead unnecessarily repeated at each layer directly increases the costs and end-to-end latency. Similarly, such known data center networks do not typically scale in a cost effective manner: an increase in the number servers for a given data center systems often requires the addition of ports, and thus the addition of more devices, at each layer of the data center systems. Such poor scalability increases the cost of such data center systems.

Thus, a need exists for improved data center systems including improved architectures, apparatus and methods.

BRIEF DESCRIPTION OF THE DRAWINGS

FIG. 7 is a schematic diagram that illustrates a portion of the switch fabric system of FIG. 5A, according to an embodiment.

DETAILED DESCRIPTION

Figure 1:
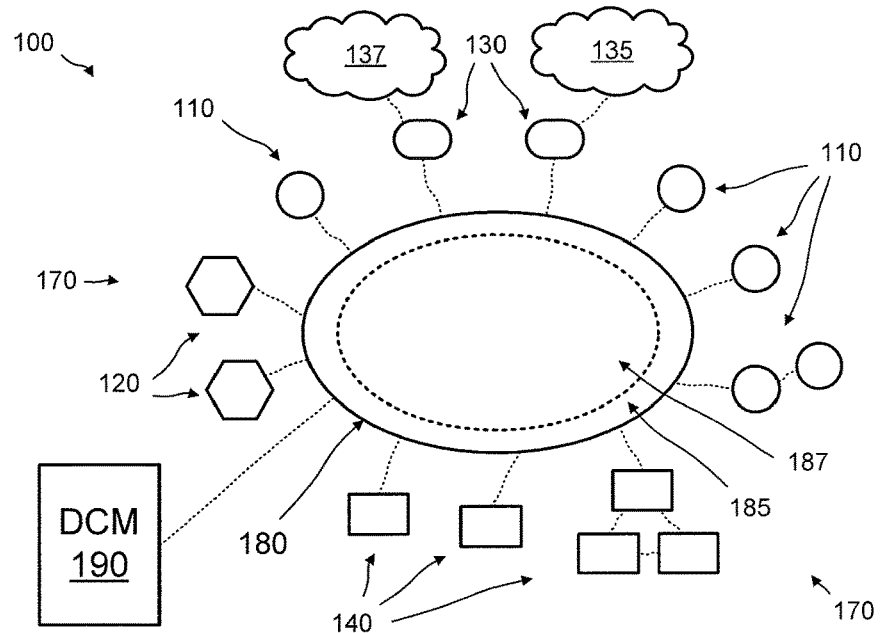
FIG. 1 is a system block diagram of a data center (DC), according to an embodiment.

FIG. 1 is a schematic diagram that illustrates a data center (DC) 100 (e.g., a super data center, an idealized data center), according to an embodiment. The data center 100 includes a switch core (SC) 180 operably connected to four types of peripheral processing devices 170: compute nodes 110, service nodes 120, routers 130, and storage nodes 140. In this embodiment, a data center management (DCM) module 190 is configured to control (e.g., manage) operation of the data center 100. In some embodiments, the data center 100 can be referred to as a data center. In some embodiments, the peripheral processing devices can include one or more virtual resources such as virtual machines.

Each of the peripheral processing devices 170 is configured to communicate via the switch core 180 of the data center 100. Specifically, the switch core 180 of the data center 100 is configured to provide any-to-any connectivity between the peripheral processing devices 170 at relatively low latency. For example, switch core 180 can be configured to transmit (e.g., convey) data between one or more of the compute nodes 110 and one or more of the storage nodes 140. In some embodiments, the switch core 180 can have at least hundreds or thousands of ports (e.g., egress ports and/or ingress ports) through which peripheral devices 170 can transmit and/or receive data. The peripheral processing devices 170 can include one or more network interface devices (e.g., a network interface card (NIC), a 10 Gigabit (Gb) Ethernet Converged Network Adapter (CNA) device) through which the peripheral processing device 170 can send signals to and/or receive signals from the switch core 180. The signals can be sent to and/or received from the switch core 180 via a physical link and/or a wireless link operably coupled to the peripheral processing devices 170. In some embodiments, the peripheral processing devices 170 can be configured to send to and/or receive signals from the switch core 180 based on one or more protocols (e.g., an Ethernet protocol, a multi-protocol label switching (MPLS) protocol, a fibre channel protocol, a fibre-channel-over Ethernet protocol, an Infiniband-related protocol).

In some embodiments, the switch core 180 can be (e.g., can function as) a single consolidated switch (e.g., a single large-scale consolidated L2/L3 switch). In other words, the switch core 180 can be configured to operate as a single logical entity (e.g., a single logical network element) as opposed to, for example, a collection of distinct network elements configured to communicate with one another via Ethernet connections. The switch core 180 can be configured to connect (e.g., facilitate communication between) the compute nodes 110, the storage nodes 140, the services nodes 120, and/or the routers 130 within the data center 100. In some embodiments, the switch core 180 can be configured to communicate via interface devices configured to transmit data at a rate of at least 10 Gb/s. In some embodiments, the switch core 180 can be configured to communicate via interface devices (e.g., fibre-channel interface devices) configured to transmit data at a rate of, for example, 2 Gb/s, 4, Gb/s, 8 Gb/s, 10 Gb/s, 40 Gb/s, 100 Gb/s and/or faster link speeds.

Although the switch core 180 can be logically centralized, the implementation of the switch core 180 can be highly distributed, for example, for reliability. For example, portions of the switch core 180 can be physically distributed across, for example, many chassis. In some embodiments, for example, a processing stage of the switch core 180 can be included in a first chassis and another processing stage of the switch core 180 can be included in a second chassis.

Both of the processing stages can logically function as part of a single consolidated switch. More details related to architecture of the switch core 180 are described in connection with FIGS. 4 through 13.

As shown in FIG. 1, the switch core 180 includes an edge portion 185 and a switch fabric 187. The edge portion 185 can include edge devices (not shown) that can function as gateway devices between the switch fabric 187 and the peripheral processing devices 170. In some embodiments, edge devices within the edge portion 185 can collectively have thousands of ports (e.g., 100,000 ports, 500,000 ports) through which data from the peripheral processing devices 170 can be transmitted (e.g., routed) into and/or out of one or more portions of the switch core 180. In some embodiments, the edge devices can be referred to as access switches, as network devices, and/or as input/output modules (shown in, for example, FIG. 5A and FIG. 5B). In some embodiments, the edge devices can be included in, for example, a top-of-rack (TOR) of a chassis.

Data can be processed at the peripheral processing devices 170, at the switch core 180, the switch fabric 187 of the switch core 180, and/or at the edge portion 185 of the switch core 180 (e.g., at edge devices included in the edge portion 185) based on different platforms. For example, communication between one or more of the peripheral processing devices 170 and an edge device at the edge portion 185 can be a stream of data packets defined based on an Ethernet protocol or a non-Ethernet protocol. In some embodiments, various types of data processing can be performed at edge devices within the edge portion 185 that may not be performed within the switch fabric 187 of the switch core 180. For example, data packets can be parsed into cells at the edge device of edge portion 185, and the cells can be transmitted from the edge device to the switch fabric 187. The cells can be parsed into segments and transmitted within the switch fabric 187 as segments (also can be referred to as flits in some embodiments). In some embodiments, the data packets can be parsed into cells at a portion of the switch fabric 187. In some embodiments, a congestion resolution scheme can be implemented at and/or scheduling of transmission of data (e.g., cells) via the switch fabric 187 can be performed at edge devices (e.g., access switches) within the edge portion 185 of the switch core 180. Congestion resolution schemes and/or scheduling of transmissions of data, however, may not be performed within modules that define the switch fabric 187. More details related to processing of data packets, cells, and/or segments within components of the data center are described below. For example, more details related to processing of cells are described in connection with at least FIG. 16A through FIG. 21.

In some embodiments, edge devices within the edge portion 185 can be configured to classify, for example, data packets received at the switch core 180 from the peripheral processing devices 170. Specifically, the edge devices within the edge portion 185 of the switch core 180 can be configured to perform Ethernet-type classification, which can include classification based on for example, a layer-2 Ethernet address (e.g., a media access control (MAC) address) and/or a layer-4 Ethernet address (e.g., a universal datagram protocol (UDP) address). In some embodiments, a destination can be determined based on classification of, for example, a packet at the edge portion 185 of the switch core 180. For example, a first edge device can identify, based on classification of a packet, a second edge device as a destination of the packet. The packet can be parsed into cells and transmitted into the switch fabric 187 from the first edge device. The cells can be switched through the switch fabric 187 so that they are delivered to the second edge device. In some embodiments, the cells can be switched through the switch fabric 187 based on information related to the destination and associated with the cells.

Security policies can be more effectively applied with respect to the core switch 180 because classification is performed at a single logical layer of the core switch 180—at the edge portion 185 of the core switch 180. Specifically, many security policies can be applied during classification in a relatively uniform and seamless fashion at the edge portion 185 of the switch core 180.

More details related to packet classification within a data center are described in connection with, for example, FIG. 5A, FIG. 5B, and FIG. 19. Additional details related to packet classification associated within a data center are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

The switch core 180 can be defined so that classification of data (e.g., data packets) is not performed in the switch fabric 187. Accordingly, although the switch fabric 187 can have multiple stages, the stages need not be topological hops where data classification is performed, and the switch fabric 187 can define a single topological hop. Instead, destination information determined at the edge devices (e.g., edge devices within the edge portion 185 of the switch core 180) based on classification can be used for switching (e.g., switching of cells) within the switch fabric 187. More details related to switching within a switch fabric 187 are described in connection with, for example, FIG. 4A and FIG. 4B.

In some embodiments, processing related to classification can be performed at a classification module (not shown) included in an edge device (e.g., an input/output module). Parsing packets into cells, scheduling of transmission of cells via the switch fabric 187, reordering of packets and/or cells, and/or so forth, can be performed at a processing module (not shown) of an edge device (e.g., an input/output module). In some embodiments, a classification module can be referred to as a packet classification module, and/or a processing module can be referred to as a packet processing module. More details related to an edge device that includes a classification module and a processing module are described in connection with FIG. 5B.

In some embodiments, one or more portions of the data center 100 can be (or can include) a hardware-based module (e.g., an application-specific integrated circuit (ASIC), a digital signal processor (DSP), a field programmable gate array (FPGA)) and/or a software-based module (e.g., a module of computer code, a set of processor-readable instructions that can be executed at a processor). In some embodiments, one or more of the functions associated with the data center 100 can be included in different modules and/or combined into one or more modules. For example, the data center management module 190 can be a combination of hardware modules and software modules configured to manage the resources (e.g., resources of the switch core 180) within the data center 100.

One or more of the compute nodes 110 can be a general-purpose computational engine that can include, for example, processors, memory, and/or one or more network interface devices (e.g., a network interface card (NIC)). In some embodiments, the processors within a compute nodes 110 can be part of one or more cache coherent domains.

In some embodiments, the compute nodes 110 can be host devices, servers, and/or so forth. In some embodiments, one or more of the compute nodes 110 can have virtualized resources such that any compute node 110 (or a portion thereof) can be substituted for any other compute node 110 (or a portion thereof) within the data center 100.

One or more of the storage nodes 140 can be devices that include, for example, processors, memory, locally-attached disk storage, and/or one or more network interface devices. In some embodiments, the storage nodes 140 can have specialized modules (e.g., hardware modules and/or software modules) configured to enable, for example, one or more of the compute nodes 110 to read data from and/or write data to one or more of the storage nodes 140 via the switch core 180. In some embodiments, one or more of the storage nodes 140 can have virtualized resources so that any storage node 140 (or a portion thereof) can be substituted for any other storage node 140 (or a portion thereof) within the data center 100.

One or more of the services nodes 120 can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes 120 can include hardware and/or software configured to perform computations on relatively heavy network workloads. In some embodiments, the services nodes 120 can be configured perform computations on a per packet basis in a relatively efficient fashion (e.g., more efficiently than can be performed at, for example, a compute node 110). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes 120 can have virtualized resources so that any service node 120 (or a portion thereof) can be substituted for any other service node 120 (or a portion thereof) within the data center 100.

One or more of the routers 130 can be networking devices configured to connect at least a portion of the data center 100 to another network (e.g., the global Internet). For example, as shown in FIG. 1, the switch core 180 can be configured to communicate through the routers 130 to network 135 and network 137. Although not shown, in some embodiments, one or more of the routers 130 can enable communication between components (e.g., peripheral processing devices 170, portions of the switch core 180) within the data center 100. The communication can be defined based on, for example, a layer-3 routing protocol. In some embodiments, one or more of the routers 130 can have one or more network interface devices (e.g., 10 Gb Ethernet devices) through which the routers 130 can send signals to and/or receive signals from, for example, the switch core 180 and/or other peripheral processing devices 170.

More details related to virtualized resources within a data center are set forth in co-pending U.S. patent application Ser. No. 12/346,623, filed Dec. 30, 2008, entitled, "Method and Apparatus for Determining a Network Topology During Network Provisioning," co-pending U.S. patent application Ser. No. 12/346,632, filed Dec. 30, 2008, entitled, "Methods and Apparatus for Distributed Dynamic Network Provisioning," and co-pending U.S. patent application Ser. No. 12/346,630, filed Dec. 30, 2008, entitled, "Methods and Apparatus for Distributed Dynamic Network Provisioning," all of which are hereby incorporated by reference herein in their entireties.

Figure 2:
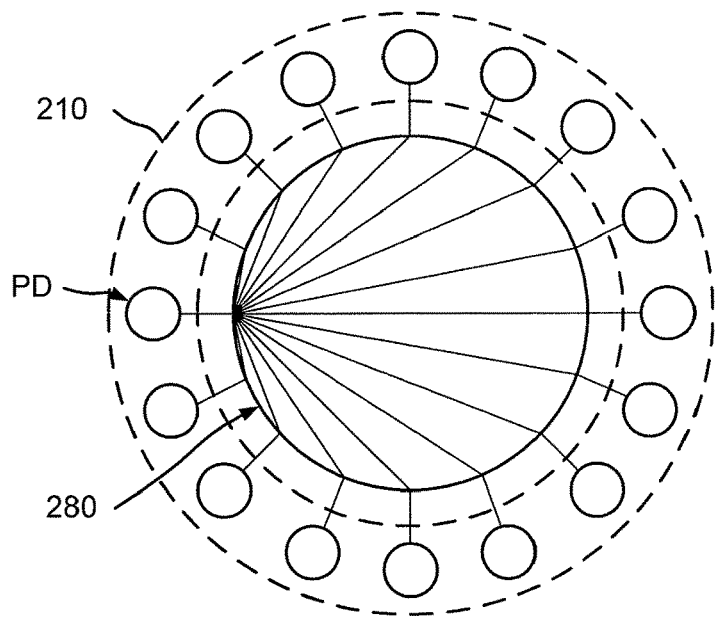
FIG. 2 is a schematic diagram that illustrates an example of a portion of a data center having any-to-any connectivity, according to an embodiment.

As discussed above, the switch core 180 can be configured to function as a single universal switch connecting any peripheral processing device 170 in the data center 100 to any other peripheral processing device 170. Specifically, the switch core 180 can be configured to provided any-to-any connectivity between the peripheral processing devices 170 (e.g., a relatively large number of peripheral processing devices 170) with the switch core 180 having substantially no perceptible limits except those imposed by the bandwidth of the network interfaces devices connecting the peripheral processing devices 170 to the switch core 180 and by speed-of-light signaling delays (also referred to as speed-of-light latency). Said differently, the switch core 180 can be configured so that each peripheral processing device 170 appears to be interconnected directly to every other peripheral processing device within the data center 100. In some embodiments, the switch core 180 can be configured so that the peripheral processing devices 170 can communicate at line rate (or at substantially line rate) via the switch core 180. A schematic representation of any-to-any connectivity is shown in FIG. 2.

In addition, the switch core 180 can handle migration of, for example, virtual resources between any of the peripheral processing devices 170 in communication with the switch core 180 in a desirable fashion because the switch core 180 functions a single logical entity. Accordingly, the migration span of virtual resources within peripheral processing devices 170 can be across substantially all ports coupled to the switch core 180 (e.g., all ports of the edge device 185 of the switch core 180).

In some embodiments, provisioning associated with migration of virtual resources can be handled, in part, by a network management module. A centralized network management entity or network management module can cooperate with network devices (e.g., portions of a switch core 180) to collect and manage network topology information. For example, network devices can push information about resources (both virtual and physical) currently operatively coupled to the network devices to the network management module as resources are attached to or separated from the network devices. An external management entity such as a peripheral processing device management tool (e.g., a server management tool) and/or a network management tool can communicate with the network management module to send network provisioning instructions to network devices and other resources in the network without a static description of the network. Such a system avoids the difficulties of static network descriptions and the network performance degradations resulting from other types of peripheral processing device 170 and network management systems.

In one embodiment, a server management tool or external management entity communicates with a network management module to provision network devices for virtual resources associated with peripheral processing devices 170, and determine the operating state or status (e.g., running, suspended, or migrating) and the locations in a network of virtual resources. Virtual resources can be virtual machines executing on peripheral processing devices 170 (e.g., a server) coupled to a switch fabric via access switches (e.g., access switches included in an edge portion 187) in a data center. Many types of peripheral processing devices 170 can be coupled to the switch fabric via the access switches.

Rather than rely on a static network description for discovery and/or management of network topology information (including binding of virtual resources to network devices), the network management module communicates and cooperates with the access switches and external management entity to discover or determine network topology information. After instantiating (and/or starting) a virtual machine on a host device (and/or other type of peripheral processing device 170), the external management entity can provide a device identifier of the virtual machine to the network management module. The device identifier can be, for example, a medium access protocol ("MAC") address of a network interface of the virtual machine or peripheral processing device 170, a name of the virtual machine or peripheral processing device 170, a globally unique identifier ("GUID"), and/or a universally unique identifier ("UUID") of the virtual resource or peripheral processing device 170. The GUID need not be globally unique with respect to all networks, virtual resources, peripheral processing devices 170, and/or network devices, but is unique within the network or network segment managed by the network management module. Additionally, the external management entity can provide instructions for provisioning a port of an access switch to which the peripheral processing device 170 hosting the virtual machine is connected. The access switch can detect that the virtual machine has been instantiated, started, and/or moved to the peripheral processing device 170. After detecting the virtual machine, the access switch can query the peripheral processing device 170 for information about the peripheral processing device 170 and/or virtual machine including, for example, a device identifier of the peripheral processing device 170 or virtual machine.

The access switch can query or request information such as, for example, the device identifier of the virtual machine using, for example, the link layer discovery protocol ("LLDP"), some other standards-based or well-known protocol, or a proprietary protocol where the virtual machine is configured to communicate via that protocol. Alternatively, the virtual machine can broadcast information about itself (including the device identifier of the virtual machine) after detecting that it has been connected to an access switch using, for example, an Ethernet or IP broadcast packet and/or packets.

The access switch then pushes the device identifier of the virtual device (sometimes referred to as a virtual device identifier) and, in some embodiments, other information received from the virtual machine to the network management module. Additionally, the access switch can push a device identifier of the access switch and a port identifier of the port of the access switch to which the peripheral processing device 170 hosting the virtual machine is connected to the network management module. This information functions as a description of the location of the virtual machine in the network, and defines the binding of the virtual machine to a peripheral processing device 170 for the network management module and an external management entity. In other words, after receiving this information, the network management module can associate the device identifier of the virtual machine with a particular port on a particular access switch to which the virtual machine (and/or the peripheral processing device 170 on which the virtual machine is hosted) is connected.

The device identifier of the virtual machine, the device identifier of the access switch, the port identifier, and the provisioning instructions provided by the external management entity can be stored in a memory accessible to the network management module. For example, the device identifier of the virtual machine, the device identifier of the access switch, and the port identifier can be stored in a memory configured as a database such that a database query based on the device identifier of the virtual machine returns the device identifier of the access switch, the port identifier, and the provisioning instructions.

Because the network management module can associate a location in the network of a virtual machine based on a device identifier of that virtual machine, the external management entity need not be aware of the topology of the network or the binding of virtual machines to peripheral processing devices 170 to provision network resources (e.g., network devices, virtual machines, virtual switches or physical servers). Said differently, the external management entity can be agnostic as to the interconnections in the network and the location of the virtual machines in the network (e.g., on which peripheral processing devices 170 at which port of which access switch in the network), and can provision access switches in the network based on device identifiers of the virtual machines hosted by the peripheral processing devices 170 in the network. In some embodiments, an external management entity can also provision physical peripheral processing devices 170. Additionally, because the network management module determines and manages the network topology information dynamically, the external management entity does not rely on a static description of the network for provisioning network.

As used in this specification, provisioning can include various types or forms of device and/or software module setup, configuration, and/or adjustment. For example, provisioning can include configuring a network device such as a network switch based on a network policy. More specifically, for example, network provisioning can include: configuring a network device to operate as a layer 2 or layer 3 network switch; alter routing tables of a network device; update security policies and/or device addresses or identifiers of devices operatively coupled to a network device; selecting which network protocols a network device with implement; setting network segment identifiers such as virtual local area network ("VLAN") tags for a port of a network device; and/or applying access control lists ("ACLs") to a network device. The network switch can be provisioned or configured such that rules and/or access restrictions defined by the network policy are applied to data packets that pass through the network switch. In some embodiments, virtual devices can be provisioned. A virtual device can be, for example, a software module implementing a virtual switch, virtual router, or virtual gateway that is configured to operate as an intermediary between a physical network and is hosted by a host device such as a peripheral processing device 170. In some embodiments, provisioning can include establishing a virtual port or connection between a virtual resource and a virtual device.

FIG. 2 is a schematic diagram that illustrates an example of a portion of a data center having any-to-any connectivity, according to an embodiment. As shown in FIG. 2, a peripheral processing device PD (from a group of peripheral processing devices 210) is connected to each of the peripheral processing devices 210 via switch core 280. In this embodiment, only connections from peripheral processing device PD to the other peripheral processing devices 210 (excluding peripheral processing device PD) are shown for clarity.

In some embodiments, the switch core 280 can be defined so that the switch core 280 is fair in the sense that the bandwidth of a destination link between the peripheral processing devices PD and the other peripheral processing devices 210 is shared substantially equitably among contending peripheral processing devices 210. For example, when several (or all) of the peripheral processing devices 210 shown in FIG. 2 are attempting to access peripheral processing device PD at a given time, the bandwidth (e.g., instantaneous bandwidth) available to each of the peripheral processing devices 280 to access the peripheral processing device PD will be substantially equal. In some embodiments, the switch core 280 can be configured so that several (or all) of the peripheral processing devices 210 can communicate with the peripheral processing device PD at full bandwidth (e.g., full bandwidth of the peripheral processing device PD) and/or in a non-blocking fashion. Moreover, the switch core 280 can be configured so that access to the peripheral processing device PD by a peripheral processing device (from the peripheral processing devices 210) may not be limited by other links (e.g., existing or attempted) between other peripheral processing devices and the peripheral processing device PD.

In some embodiments, any-to-any connectivity, low latency, fairness, and/or so forth, which are attributes of the switch core 280, can enable peripheral processing devices 210 of a given type (e.g., of a storage node type, of a compute node type) connected to (e.g., in communication with) the switch core 280 to be treated interchangeably (e.g., independent of location relative to other processing devices 210 and the switch core 280). This can be referred to as fungibility, and can facilitate the efficiency and simplicity of a data center including switch core 280. The switch core 280 can have the attributes of any-to-any connectivity and/or fairness even though the switch core 280 may have a large number of ports (e.g., more than 1000 ports) such that each port operates at a relatively high speed (e.g., operate a speed greater than 10 Gb/s). This can be achieved without specialized interconnects included in, for example, a supercomputer and/or without perfect a-priori knowledge of all communication patterns. More details related to the architecture of the switch core having any-to-any connectivity and/or fairness are described, at least in part, in connection with FIGS. 4 through 13.

Referring back to FIG. 1, in some embodiments, the data center 100 can be configured to allow for flexible oversubscription. In some embodiments, through flexible oversubscription, the relative cost of network infrastructure (e.g., network infrastructure related to the switch core 180) can be reduced compared with the cost of, for example, computing and storage. For example, resources (e.g., all resources) within the switch core 180 of the data center 100 can operate as flexible pooled resources so that underutilized resources that are associated with a first application (or set of applications) can be dynamically provisioned for use by a second application (or set of applications) during, for example, peak processing by the second application. Accordingly, the resources (or a subset of the resources) of the data center 100 can be configured to handle oversubscription more efficiently than if resources were strictly allocated as a silo of resources to a particular application (or set of applications). If managed as silos of resources, oversubscription can be implemented only within the silo of resources rather than across, for example, the entire data center 100. In some embodiments, one or more of the protocols and/or components within the data center 100 can be based on open standards (e.g., Institute of Electrical and Electronics Engineers (IEEE) standards, Internet Engineering Task Force (IETF) standards, InterNational Committee for Information Technology Standards (INCITS) standards).

In some embodiments, the data center 100 can support security models that permit a wide range of policies to be implemented. For example, the data center 100 can support no communication policies, where applications reside in separate virtual data centers of the data center 100 but can share the same physical peripheral processing devices (e.g., compute nodes 100, storage nodes 140) and network infrastructure (e.g., switch core 180). In some configurations, the data center 100 can support multiple processes that are part of the same application and need to communicate with almost no limitations. In some configurations, the data center 100 can also support policies that may require, for example, deep packet inspection, stateful firewalls, and/or stateless filters.

The data center 100 can have an end-to-end application to application latency (also can be referred to as end-to-end latency) defined based on source latency, zero-load latency, congestion latency, and destination latency. In some embodiments, source latency can be, for example, time expended during processing at a source peripheral processing device (e.g., time expended by software and/or a NIC). Similarly, destination latency can be, for example, time expended during processing at a destination peripheral processing device (e.g., time expended by software and/or a NIC). In some embodiments, zero-load latency can be the speed-of-light delay plus the processing and store-and-forward delays inside, for example, the switch core 180. In some embodiments, congestion latency can be, for example, queuing delays caused by backups in the network. The data center 100 can have a low end-to-end latency that enables desirable application performance for applications that are sensitive to latency such as applications with real-time constraints and/or applications with high levels of inter-process communication requirements.

The zero-load latency of the switch core 180 can be significantly less than that of a data center core portion having an interconnection of Ethernet-based hops. In some embodiments, for example, the switch core 180 can have a zero-load latency (excluding speed-of-light latency) from an ingress port of the switch core 180 to an egress port of the switch core 180 of less than 6 microseconds. In some embodiments, for example, the switch core 180 can have a zero-load latency (excluding congestion latency and speed-of-light latency) of less than 12 microseconds. Ethernet-based data center core portions may have significantly higher latencies because of, for example, undesirable levels of congestion (e.g., congestion between links). The congestion within the Ethernet-based data center core portions can be exacerbated by the inability of the Ethernet-based data center core (or management devices associated with the Ethernet-based data center core) to handle the congestion in a desirable fashion. In addition, latencies within an Ethernet-based data center core portion can be non-uniform because the core portion can have different numbers of hops between different source-destination pairs and/or many store-and-forward switch nodes where classification of data packets is performed. In contrast, classification of the switch core 180 is performed at the edge portion 185 and is not performed in the switch fabric 187, and the switch core 180 has a deterministic cell-based switch fabric 187. For example, the latency of processing of cells through the switch fabric 187 (but not the paths the cells through the switch fabric 187) can be predictable.

The switch core 180 of the data center 100 can provide lossless-end-to-end packet delivery, at least in part, based on flow control schemes implemented within the data center 100. For example, scheduling of transmission of data (e.g., data associated with data packets) via the switch fabric 187 is performed on a cell basis using a request-grant scheme (also can be referred to as a request-authorization scheme). Specifically, cells are transmitted into the switch fabric 187 (e.g., transmitted into the switch fabric 187 from the edge portion 185) after a request to transmit the cells has been granted based on substantially guaranteed delivery (without loss). Once admitted into the switch fabric 187, the cells are processed within the switch fabric 187 as segments. Flow of the segments within the switch fabric 187 can further be controlled, for example, so that the segments are not lost when congestion within the switch fabric 187 is detected. More details related to processing of cells and segments within the switch core 180 are described below.

In addition, data flow through the switch fabric 187 from each peripheral processing device 170 can be isolated from data flow through the switch fabric 187 from the remaining peripheral processing devices 170. Specifically, data congestion at one or more of the peripheral processing devices 170 may not affect the flow of data through the switch fabric 187 of the switch core 180 in an undesirable fashion because cells are only transmitted into the switch fabric 187 of the switch core 180 after a request for transmission has been granted at the edge portion 185 of the switch core 180. For example, a high level of data traffic at a first peripheral processing device 170 may be handled, based on a request-grant congestion resolution scheme, such that the high level of data traffic at the first peripheral processing device 170 will not adversely affect access of a second peripheral processing device 170 to the single logical entity of the switch core 180. In other words, traffic associated with the first peripheral processing device 170 when admitted into switch fabric 187 of the switch core 180 will be isolated (e.g., isolated from a congestion perspective) from traffic associated with the second peripheral processing device 170.

Also, flow of data packets in the switch core 180, which can be parsed into cells and segments, can be controlled at the peripheral processing devices 170 based on a fine grain flow control scheme. In some embodiments, fine grain flow control can be implemented based on stages of queues. This type of fine grain flow control can prevent (or substantially prevent) head-of-line blocking, which can result in poor network utilization. The fine grain flow control can also be used to reduce (or minimize) latency within the switch core 180. In some embodiments, fine grain flow control can enable high-performance block oriented disk traffic to and from the peripheral processing devices 170, which may not be achieved using Ethernet and Internet Protocol (IP) networks in a desirable fashion. More details related to fine grain flow control are described in connection with FIGS. 22 through 25.

In some embodiments, the data center 100, and, in particular, the switch core 180 can have a modular architecture. Specifically, the switch core 180 of the data canter 100 can be implemented initially at small scale and can be expanded (e.g., incrementally expanded) as needed. The switch core 180 can be expanded substantially without disruption to continuous operation of the existing network and/or can be expanded without constraints on where the new equipment of the switch core 180 should be physically located.

In some embodiments, one or more portions of the switch core 180 can be configured to operate based on virtual private networks (VPN's). Specifically, the switch core 180 can be partitioned so that one or more of the peripheral processing devices 170 can be configured to communicate via overlapping or non-overlapping virtual partitions of the switch core 180. The switch core 180 can also be parsed into virtualized resources that have disjoint or overlapping subsets. In other words, the switch core 180 can be a single switch that can be partitioned in a flexible fashion. In some embodiments, this approach can enable networking at scale once within the consolidated switch core 180 of the data center 100. This can be contrasted with data centers that can be a collection of separate scalable networks that may each have customized and/or specialized resources. In some embodiments, networking resources that define the switch core 180 can be pooled so that they can be used efficiently.

In some embodiments, the data center management module 190 can be configured to define multiple levels of virtualization of the physical (and/or virtual) resources that define the data center 100. For example, the data center management module 190 can be configured to define multiple levels of virtualization that can represent the breadth of applications of the data center 100. In some embodiments, a lower level (of two levels) can include a virtual application cluster (VAC), which can be a set of physical (or virtual) resources assigned to a single application belonging to (e.g., controlled by) one or more entities (e.g., an administrative entity, a financial institution). An upper level (of two levels) can include a virtual data center (VDC), which can include a set of VAC's belonging to (e.g., controlled by) one or more entities. In some embodiments, the data center 100 can include a number of VAC's that can each belong to a different administrative entity.

Figure 3:
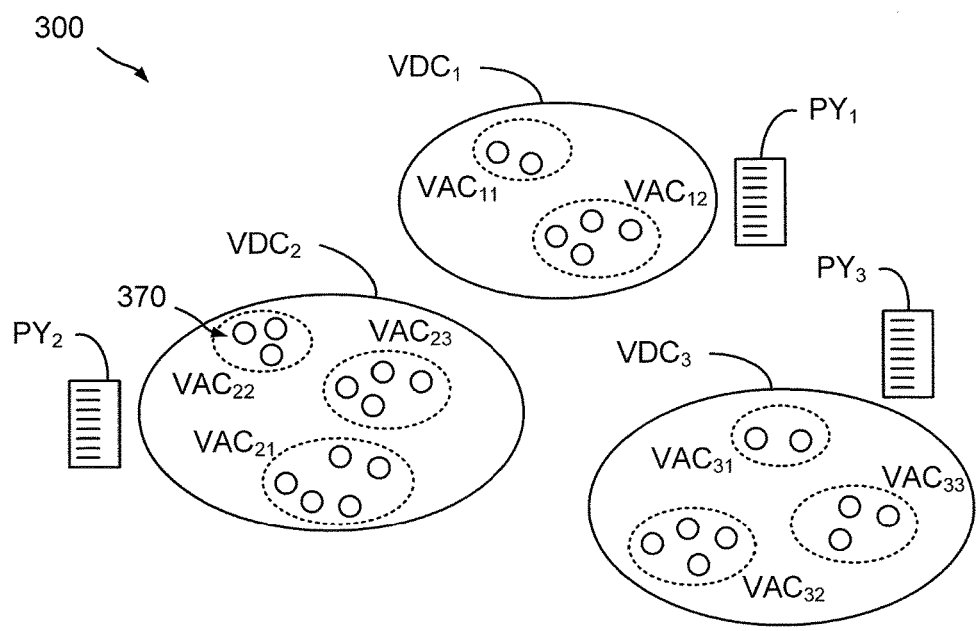
FIG. 3 is a schematic diagram that illustrates logical groups of resources associated with a data center, according to an embodiment.

FIG. 3 is a schematic diagram that illustrates logical groups 300 of resources associated with a data center, according to an embodiment. As shown in FIG. 3, the logical groups 300 include virtual data center $VDC_1$, virtual data center $VDC_2$, and virtual data center $VDC_3$ (collectively referred to as VDCs). Also, as shown in FIG. 3, each of the VDCs includes virtual application clusters VACs (e.g., $VAC_{32}$ within $VDC_3$). Each VDC represents logical groups of physical or virtual portions of a data center (e.g., portions of a switch core, portions of peripheral processing devices and/or a virtual machine within a peripheral processing device) such as data center 100 shown in FIG. 1. Each VAC within the VDCs represents logical groups of, for example, peripheral processing devices such as compute nodes. For example, $VDC_1$ can represent a logical group of a portion of a physical data center, and $VAC_{22}$ can represent a logical group of peripheral processing devices 370 within $VDC_1$. As shown in FIG. 3, each VDC can be managed based on a set of policies PYs (also can be referred to as business rules) that can be configured to, for example, define the permitted range of operating parameters for applications running within the VDCs. In some embodiments, the VDCs can be referred to as a first tier of logical resources, and the VACs can be referred to as a second tier of logical resources.

In some embodiments, VDCs (and VACs) can be established so that resources associated with a data center can be managed in a desirable fashion by, for example, entities that use (e.g., lease, own, communicate through) the resources of the data center and/or administrators of the resources of the data center. For example, $VDC_1$ can be a virtual data center associated with a financial institution, and $VDC_2$ can be a virtual data center associated with telecommunications service provider. Accordingly, the policy $PY_1$ can be defined by the financial institution so that $VDC_1$ (and the physical and/or virtual data center resources associated with $VDC_1$) can be managed in a manner that is different from (or similar to) a manner in which $VDC_2$ (and the physical and/or virtual data center resources associated with $VDC_2$) is managed based on policy $PY_2$, which can be defined by the telecommunications service provider. In some embodiments, one or more policies (e.g., a portion of policy $PY_1$) can be established by a network administrator that, when implemented, provide information security and/or firewalls between $VDC_1$, which is associated with the financial institution, and $VDC_2$, which is associated with the telecommunications service provider.

In some embodiments, policies can be associated with (e.g., integrated within) a data center management (not shown). For example, $VDC_2$ can be managed based on policy $PY_2$ (or a subset of policy $PY_2$). In some embodiments, the data center management can be configured to, for example, monitor the real-time performance of applications within the VDCs and/or can be configured to allocate or de-allocate resources automatically to satisfy the respective policies for applications within the VDCs. In some embodiments, policies can be configured to operate based on time thresholds. For example, one or more policies can be configured to function based on periodic events (e.g., predictable periodic events) such as variations in a parameter value (e.g., a traffic level) at a specified time of day or during a day of week.

In some embodiments, policies can be defined based on a high level language. Accordingly, the policies can be specified in a relatively accessible fashion. Examples of policies include information securing policies, failure isolation policies, firewall policies, performance guarantees policies (e.g., policies related to service levels to be implemented by an application), and/or other administrative policies (e.g., management isolation policies) related to protection or archiving of information.

In some embodiments, the policies can be implemented at a packet classification module that can be configured to, for example, classify a data packet (e.g., an IP packet, a session control protocol packet, a media packet, a data packet defined at a peripheral processing device). For example, the policies can be implemented within a packet classification module of an access switch within an edge portion of a switch core. Classifying can include any processing performed so that the data packet can be processed within a data center (e.g., a switch core of a data center) based on a policy. In some embodiments, the policy can include one or more policy conditions that are associated with an instruction that can be executed. The policy can be, for example, a policy to route a data packet to a particular destination (instruction) if the data packet has a specified type of network address (policy condition). Packet classification can include determining whether or not the policy condition has been satisfied so that the instruction can be executed. For example, one or more portions (e.g., a field, a payload, an address portion, a port portion) of the data packet can be analyzed by the packet classification module based on a policy condition defined within a policy. When the policy condition is satisfied, the data packet can be processed based on an instruction associated with the policy condition.

In some embodiments, one or more portions of the logical groups 300 can be configured to be operate in a "lights out" manner from multiple remote locations—such as a separate location for each of the VDCs and one or two master locations to control the logical groups 300. In some embodiments, a data center with logical groups such as those shown in FIG. 3 can be configured to function without personnel physically at the data center site. In some embodiments, a data center can have sufficient redundant resources to accommodate the occurrence of failures such as failure of one or more of the peripheral processing devices (e.g., a peripheral processing device within a VAC), failure of the data center management module, and/or failure of a component of a switch core. When monitoring software within a data center (e.g., within data center management of the data center) indicates that failures have reached a predefined threshold, personnel can be notified and/or dispatched to replace the failed components.

As shown in FIG. 3, the VDCs can be mutually exclusive logical groups. In some embodiments, resources (e.g., virtual resources, physical resources) of a data center (such as that shown in FIG. 1) can be divided into different logical groups 300 (e.g., different tiers of logical groups) than those shown in FIG. 3. In some embodiments, two or more of the VDCs of the logical groups 300 can be overlapping. For example, a first VDC can share resources (e.g., physical resources, virtual resources) of a data center with a second VDC. Specifically, a portion of a switch core of the first VDC can be shared with the second VDC. In some embodiments, for example, resources included in a VAC of the first VDC can be included in a VAC of the second VDC.

In some embodiments, one or more of the VDCs can be manually defined (e.g., manually defined by a network administrator) and/or automatically defined (e.g., automatically defined based on a policy). In some embodiments, the VDCs can be configured to change (e.g., change dynamically). For example, a VDC (e.g., $VDC_1$) can include a specified set of resources during a period of time and can include a different set of resources (e.g., mutually exclusive set of resources, overlapping set of resources) during a different period of time (e.g., mutually exclusive period of time, overlapping period of time).

In some embodiments, one or more portions of a data center can be dynamically provisioned in response to, before, or during a change related to a VDC (e.g., a migration of a portion of the VDC such as a virtual machine of the VDC). For example, a switch core of a data center can include multiple network devices such as network switches, each storing a library of configuration templates including provisioning instructions for services provided by and/or required by virtual machines. When a virtual machine migrates to and/or is instantiated or started on a server connected to a port of a network switch of the switch core, the server can send to the network switch an identifier related to a service provided by the virtual machine. The network device can select a configuration template from the library of configuration templates based on the identifier, and provision the port and/or the server based on the configuration template. Thus, the task of provisioning network ports and/or devices can be distributed (e.g., distributed in an automated fashion, distributed without redefining templates) across network switches in the switch core, and can vary dynamically as virtual machines or resources are migrated among peripheral processing devices.

In some embodiments, provisioning can include various types or forms of device and/or software module setup, configuration, and/or adjustment. For example, provisioning can include configuring a network device within a data center such as a network switch based on a policy such as one of the policies PY shown in FIG. 3. More specifically, for example, provisioning related to a data center can include one or more of the following: configuring a network device to operate as a network router or a network switch; alter routing tables of a network device; update security policies and/or device addresses or identifiers of devices operatively coupled to a network device; selecting which network protocols a network device will implement; setting network segment identifiers such as virtual local area network ("VLAN") tags for a port of a network device; and/or applying access control lists ("ACLs") to a network device. A portion of a data center can be provisioned or configured such that rules and/or access restrictions defined by the policy (e.g., policy $PY_3$) are applied (e.g., applied through a classification process) to data packets that pass through the portion of the data center.

In some embodiments, virtual resources associated with a data center can be provisioned. A virtual resource can be, for example, a software module implementing a virtual switch, virtual router, or virtual gateway that is configured to operate as an intermediary between a physical network and virtual resources hosted by a host device such as a server. In some embodiments, a virtual resource can be hosted by the host device. In some embodiments, provisioning can include establishing a virtual port or connection between a virtual resource and a virtual device.

More details related to virtualized resources within a data center are set forth in co-pending U.S. patent application Ser. No. 12/346,623, filed Dec. 30, 2008, entitled, "Method and Apparatus for Determining a Network Topology During Network Provisioning," co-pending U.S. patent application Ser. No. 12/346,632, filed Dec. 30, 2008, entitled, "Methods and Apparatus for Distributed Dynamic Network Provisioning," and co-pending U.S. patent application Ser. No. 12/346,630, filed Dec. 30, 2008, entitled, "Methods and Apparatus for Distributed Dynamic Network Provisioning," all of which have been incorporated by reference herein in their entireties.

Figure 4A:
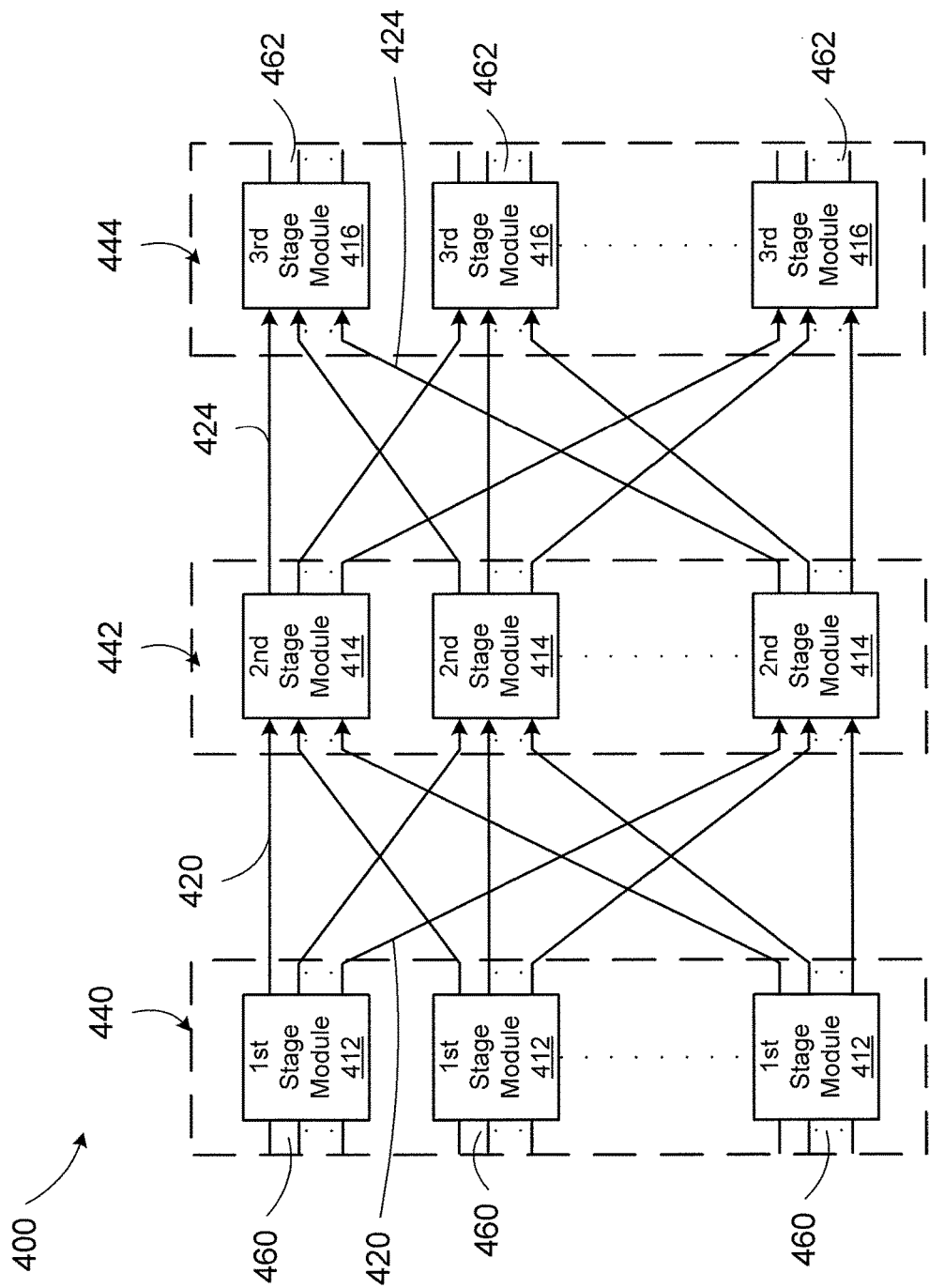
FIG. 4A is a schematic diagram that illustrates a switch fabric that can be included in a switch core, according to an embodiment.

FIG. 4A is a schematic diagram that illustrates a switch fabric 400 that can be included in a switch core, according to an embodiment. In some embodiments, the switch fabric 400 can be included in switch core such as switch core 180 shown in FIG. 1. As shown in FIG. 4A, switch fabric 400 is a three-stage, non-blocking Clos network and includes a first stage 440, a second stage 442, and a third stage 444. The first stage 440 includes modules 412 (which can each be referred to as a switch module or as a cell switch). Each module 412 of the first stage 440 is an assembly of electronic components and circuitry. In some embodiments, for example, each module is an application-specific integrated circuit (ASIC). In other embodiments, multiple modules are contained on a single ASIC. In some embodiments, each module is an assembly of discrete electrical components. In some embodiments, a switch fabric with multiple stages can be referred to as a multi-stage switch fabric.

In some embodiments, each module 412 of the first stage 440 can be a cell switch. The cell switches can be configured to effectively redirect data (e.g., segments) as it flows through the switch fabric 400. In some embodiments, for example, each module 412 of the first stage 440 can be configured to redirect data based on information included in a switch table. In some embodiments, the redirection of data such as cells within stages of the switch fabric 400 can be referred to as switching (e.g., switching of data) or as cell switching if the data is in the form of cells within the switch fabric 400. In some embodiments, the switching within the modules of the switch fabric 400 can be based on, for example, information (e.g., headers) associated with the data. The switching performed by the modules of the switch fabric 400 can be different than Ethernet-type classification that can be performed within the edge devices (e.g., edge devices within the edge portion 185 of the switch core 180 shown in FIG. 1). In other words, the switching within the modules of the switch fabric 400 may not be based on, for example, a layer-2 Ethernet address and/or a layer-4 Ethernet address. More details related to switching of data based on a switch table are described in connection with FIG. 4B.

In some embodiments, each cell switch can also include multiple input ports operatively coupled to write interfaces on a memory buffer (e.g., a cut-through buffer). In some embodiments, the memory buffer can be included in a buffer module. Similarly, a set of output ports can be operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) per time period and all output ports to read one outgoing cell per time period. Each cell switch operates similar to a crossbar switch that can be reconfigured subsequent each time period.

In some embodiments, the memory buffer (e.g., portions of the memory buffer associated particular ports and/or streams) can have a size (e.g., a length) sufficient for modules (e.g., modules 412) within the switch fabric 400 to implement switching (e.g., cell switching, switching of data) and/or synchronization of data (e.g., cells). The memory buffer, however, may have a size that is insufficient (and/or processing latency that is too short) for modules (e.g., modules 412) within the switch fabric 400 to implement a congestion resolution scheme. A congestion resolution scheme such as a grant/request scheme can be implemented at, for example, edge devices (not shown) associated with a switch core but may not be implemented at modules within the switch fabric 400 using the memory buffer for queuing of data associated with the congestion resolution scheme. In some embodiments, one or more of the memory buffers within the modules (e.g., modules 414) may have a size that is insufficient (and/or processing latency that is too short) for, for example, reordering of data (e.g., cells) at the modules. More details related to a shared memory buffer are described in connection with FIG. 15, and in co-pending U.S. patent application Ser. No. 12/415,517, filed on Mar. 31, 2009, entitled, "Methods and Apparatus Related to a Shared Memory Buffer for Variable-Sized Cells," which is incorporated herein by reference in its entirety.

In alternate embodiments, each module of the first stage can be a crossbar switch having input bars and output bars. Multiple switches within the crossbar switch connect each input bar with each output bar. When a switch within the crossbar switch is in an "on" position, the input is operatively coupled to the output and data can flow. Alternatively, when a switch within the crossbar switch is in an "off" position, the input is not operatively coupled to the output and data cannot flow. Thus, the switches within the crossbar switch control which input bars are operatively coupled to which output bars.

Each module 412 of the first stage 440 includes a set of input ports 460 configured to receive data as it enters the switch fabric 400. In this embodiment, each module 412 of the first stage 440 includes the same number of input ports 460.

Similar to the first stage 440, the second stage 442 of the switch fabric 400 includes modules 414. The modules 414 of the second stage 442 are structurally similar to the modules 412 of the first stage 440. Each module 414 of the second stage 442 is operatively coupled to each module of the first stage 440 by a data path 420. Each data path 420 between each module of the first stage 440 and each module 414 of the second stage 442 is configured to facilitate data transfer from the modules 412 of the first stage 440 to the modules 414 of the second stage 442.

The data paths 420 between the modules 412 of the first stage 440 and the modules 414 of the second stage 442 can be constructed in any manner configured to facilitate data transfer from the modules 412 of the first stage 440 to the modules 414 of the second stage 442 in a desirable fashion (e.g., in an effective fashion). In some embodiments, for example, the data paths are optical connectors between the modules. In other embodiments, the data paths are within a midplane. Such a midplane can be similar to that described in further detail herein. Such a midplane can be effectively used to connect each module of the second stage with each module of the first stage. In still other embodiments, the modules are contained within a single chip package and the data paths are electrical traces.

In some embodiments, the switch fabric 400 is a non-blocking Clos network. Thus, the number of modules 414 of the second stage 442 of the switch fabric 400 varies based on the number of input ports 460 of each module 412 of the first stage 440. In a rearrangeably non-blocking Clos network (e.g., a Benes network), the number of modules 414 of the second stage 442 is greater than or equal to the number of input ports 460 of each module 412 of the first stage 440. Thus, if n is the number of input ports 460 of each module 412 of the first stage 440 and m is the number of modules 414 of the second stage 442, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 444 of the switch fabric 400 includes modules 416. The modules 416 of the third stage 444 are structurally similar to the modules 412 of the first stage 440. The number of modules 416 of the third stage 444 is equivalent to the number of modules 412 of the first stage 440. Each module 416 of the third stage 444 includes output ports 462 configured to allow data to exit the switch fabric 400. Each module 416 of the third stage 444 includes the same number of output ports 462. Further, the number of output ports 462 of each module 416 of the third stage 444 is equivalent to the number of input ports 460 of each module 412 of the first stage 440.

Each module 416 of the third stage 444 is connected to each module 414 of the second stage 442 by a data path 424. The data paths 424 between the modules 414 of the second stage 442 and the modules 416 of the third stage 444 are configured to facilitate data transfer from the modules 414 of the second stage 442 to the modules 416 of the third stage 444.

The data paths 424 between the modules 414 of the second stage 442 and the modules 416 of the third stage 444 can be constructed in any manner configured to effectively facilitate data transfer from the modules 414 of the second stage 442 to the modules 416 of the third stage 444. In some embodiments, for example, the data paths are optical connectors between the modules. In other embodiments, the data paths are within a midplane. Such a midplane can be similar to that described in further detail herein. Such a midplane can be effectively used to connect each module of the second stage with each module of the third stage. In still other embodiments, the modules are contained within a single chip package and the data paths are electrical traces.

Figure 4B:
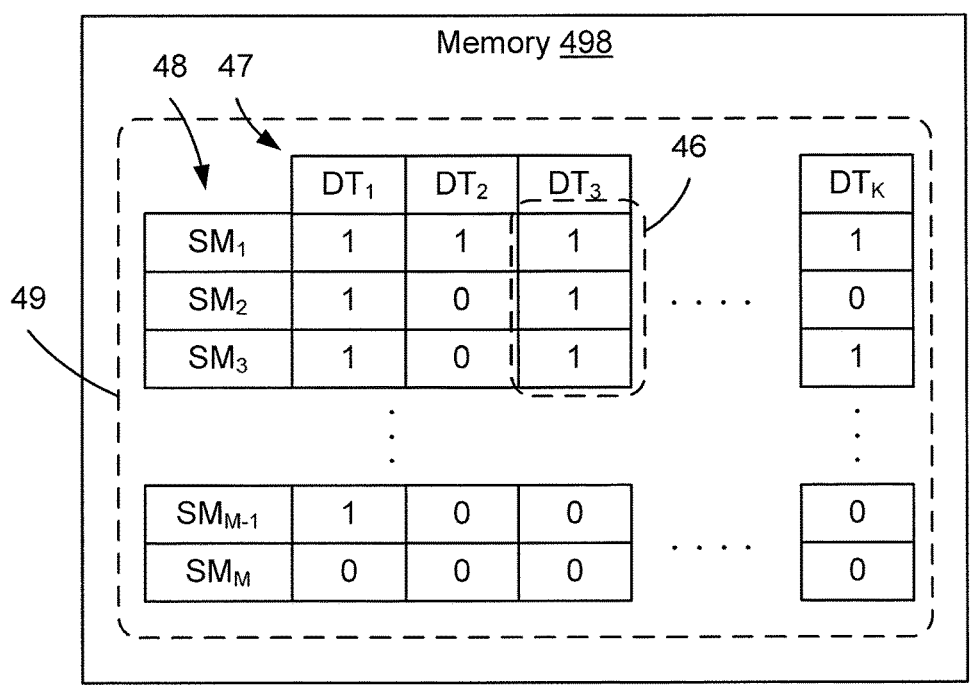
FIG. 4B is a schematic diagram that illustrates a switch table that can be stored in a memory of a module shown in FIG. 4A, according to an embodiment.

FIG. 4B is a schematic diagram that illustrates a switch table 49 that can be stored in a memory 498 of a module shown in FIG. 4A, according to an embodiment. A module (e.g., a switch module) such as one of the second stage modules 414 shown in FIG. 4A can be configured to perform cell switching based on a switch table such as switch table 49 shown in FIG. 4B. For example, the switch table 49 (or a similarly configured switch table) can be used by (and/or included in) a module in one stage of modules, for example, to determine to whether or not a cell can be transmitted to its destination via a module in another stage of modules. In some embodiments, the module through which a cell can be transmitted to the destination of the cell can be referred to as a switching destination. Specifically, switching destinations can be looked up in the switch table 49 based on destination information (which can be determined outside of the switch fabric 400) included with, for example, a cell.

The switch table 49 includes binary values (e.g., binary value of "1", a binary value of "0") that represent whether or not one or more of the destinations represented by destination values $DT_1$ through $DT_K$ (shown in row 47) can be reached through one or more of the modules (which can be at a neighboring stage) represented by module values $SM_1$ through $SM_M$ (shown in column 48). Specifically, the switch table 49 includes a binary value of "1" when a destination (e.g., destination $DT_1$) in a column including the binary value can be reached via a module (e.g., module $SM_2$) in a row intersecting the column. The switch table 49 includes a binary value of "0" when a destination in a column including the binary value may not be reached via a module in a row intersecting the column. For example, the binary values of "1" in each of the entries at 46 indicate that if a module (that includes switch table 49) sends data to a module represented by module values $SM_1$ through $SM_3$, the data can ultimately be transmitted to a destination represented by destination value $DT_3$. In some embodiments, a module can be configured to randomly select one of the modules from the group of modules represented by module values $SM_1$ through $SM_3$ (which are switching destinations), and can send the data to the selected module so that the data can be transmitted to the destination represented by destination value $DT_3$.

In some embodiments, the destination values 47 can be destination port values associated with, for example, an edge device (e.g., an access switch) of a switch core, a server in communication with an edge device, and so forth. In some embodiments, a destination value (which corresponds with at least one of the destination values 47 included in the switch table 49) can be associated with a cell (e.g., included in a header of a cell) based on, for example, classification of a packet that is included in the cell. Accordingly, the destination value associated with the cell can be used by a module to look-up switching destinations using switch table 49. The classification of the packet can be performed at an edge device (e.g., an access switch) of a switch core.

In some embodiments, the memory (and thus the switch table 49) can be included in one or more module systems of a module. In some embodiments, the switch table 49 can be associated with more than one input port and/or more than one output port of a module system (or module systems). More details related to module systems are described in connection with FIG. 7.

Figure 5A:
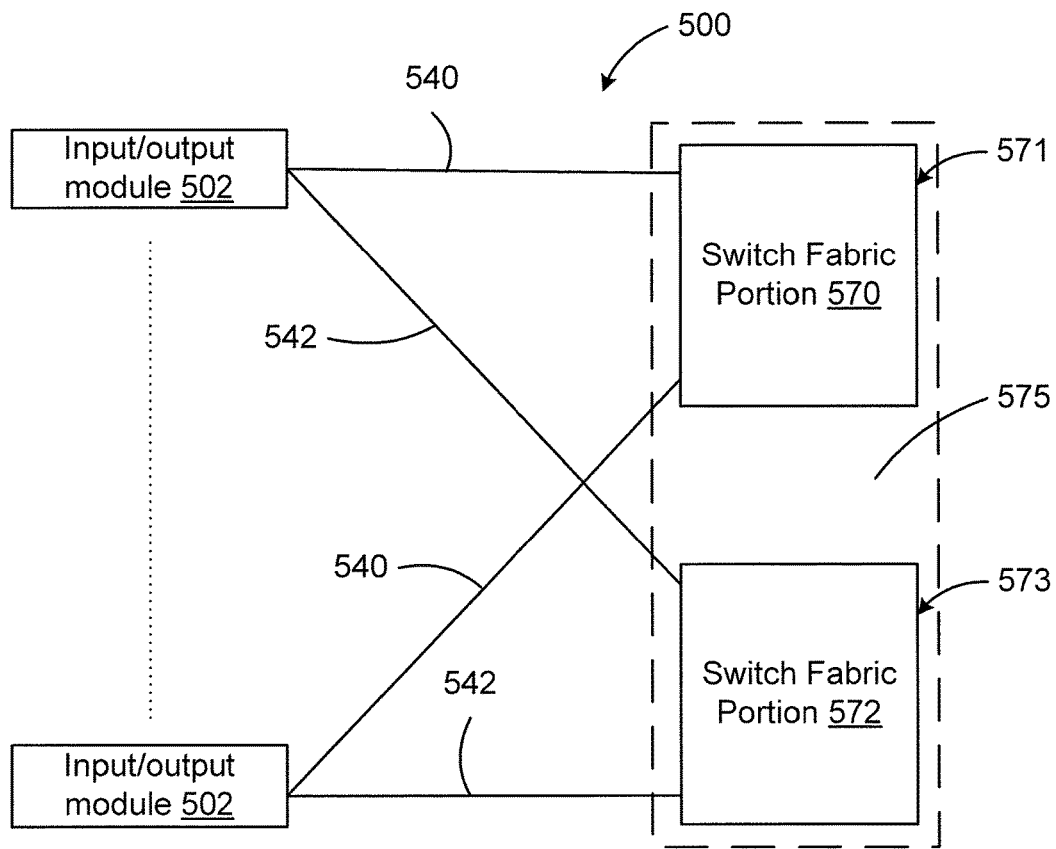
FIG. 5A is a schematic diagram that illustrates a switch fabric system, according to an embodiment.

FIG. 5A is a schematic diagram that illustrates a switch fabric system 500, according to an embodiment. Switch fabric system 500 includes multiple input/output modules 502, a first set of cables 540, a second set of cables 542, and a switch fabric 575. The switch fabric 575 includes a first switch fabric portion 571 disposed within a housing 570 or chassis, and a second switch fabric portion 573 disposed within a housing 572 or chassis.

The input/output modules 502 (which can be, for example, edge devices) are configured to send data to and/or receive data from the first switch fabric portion 571 and/or the second switch fabric portion 573. Additionally, each input/output module 502 can include a parsing function, a classifying function, a forwarding function, and/or a queuing and scheduling function. Thus, packet parsing, packet classifying, packet forwarding, and packet queuing and scheduling all occur prior to a data packet entering the first switch fabric portion 571 and/or the second switch fabric portion 573. Accordingly, these functions do not need to be preformed at each stage of the switch fabric 575, and each module of the switch fabric portions 571, 573 (described in further detail herein) do not need to include capabilities to perform these functions. This can reduce the cost, power consumption, cooling requirements and/or physical area required for each module of the switch fabric portions 571, 573. This also reduces the latency associated with the switch fabric. In some embodiments, for example, the end-to-end latency (i.e., time it takes to send data through the switch fabric from an input/output module to another input/output module) can be lower than the end-to-end latency of a switch fabric system using an Ethernet protocol. In some embodiments, the throughput of the switch fabric portions 571, 573 is constrained only by the connection density of the switch fabric system 500 and not by power and/or thermal limitations. In some embodiments, the input/output modules 502 (and/or the functionality associated with the input/output modules 502) can be included in, for example, an edge device within an edge portion of a switch core such as that shown in FIG. 1. The parsing function, classifying function, forwarding function, and queuing and scheduling function can be preformed similar to the functions disclosed in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which have been incorporated herein by reference in their entireties.

Each input/output module 502 is configured to connect to a first end of a cable of the first set of cables 540 and a first end of a cable of the second set of cables 542. Each cable 540 is disposed between an input/output module 502 and the first switch fabric portion 571. Similarly, each cable 542 is disposed between an input/output module 502 and the second switch fabric portion 573. Using the first set of cables 540 and the second set of cables 542, each input/output module 502 can send data to and/or receive data from the first switch fabric portion 571 and/or the second switch fabric portion 573, respectively.

The first set of cables 540 and the second set of cables 542 can be constructed of any material suitable to transfer data between the input/output modules 502 and the switch fabric portions 571, 573. In some embodiments, for example, each cable 540, 542 is constructed of multiple optical fibers. In such an embodiment, each cable 540, 542 can have twelve transmit and twelve receive fibers. The twelve transmit fibers of each cable 540, 542 can include eight fibers for transmitting data, one fiber for transmitting a control signal, and three fibers for expanding the data capacity and/or for redundancy. Similarly, the twelve receive fibers of each cable 540, 542 have eight fibers for transmitting data, one fiber for transmitting a control signal, and three fibers for expanding the data capacity and/or for redundancy. In other embodiments, any number of fibers can be contained within each cable.

A first switch fabric portion 571 is used in conjunction with a second switch fabric portion 573 for redundancy and/or greater capacity. In other embodiments, only one switch fabric portion is used. In still other embodiments, more than two switch fabric portions are used for increased redundancy and/or greater capacity. For example, four switch fabric portions can be operatively coupled to each input/output module by, for example, four cables. The second switch fabric portion 573 is structurally and functionally similar to the first switch fabric 571. Accordingly, only the first switch fabric portion 571 is described in detail herein.

Figure 5B:
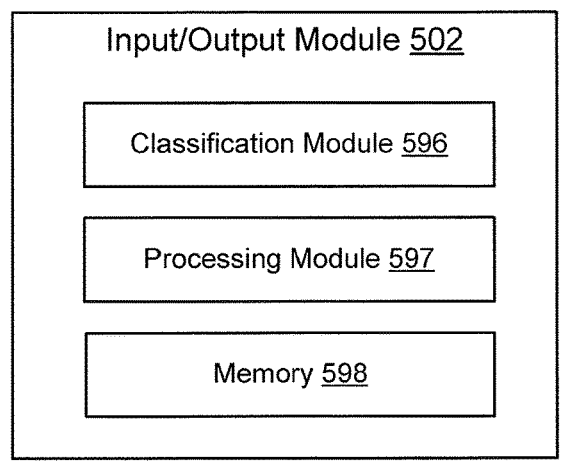
FIG. 5B is a schematic diagram that illustrates an input/output module, according to an embodiment.

FIG. 5B is a schematic diagram that illustrates an input/output module 502, according to an embodiment. As shown in FIG. 5B, the input/output module 502 includes a classification module 596, a processing module 597, and a memory 598. The classification module 596 can be configured to perform classification of a data such as Ethernet-type classification of a packet.

Various types of data processing can be performed at the processing module 597. For example, data, such as packets, can be parsed into cells at the processing module 597. In some embodiments, a congestion resolution scheme can be implemented at and/or scheduling of transmission of data (e.g., cells) via a switch fabric (e.g., switch fabric 400 shown in FIG. 4A) can be performed at the processing module 597. The processing module 597 can also be configured to concatenate information (e.g., header information, destination information, source information) to, for example, cell payloads that can be used to switch the cells (based on a switch table such as that shown in FIG. 4B) through a switch fabric (e.g., switch fabric 400 shown in FIG. 4A).

One or more portions of data (e.g., packets, cells) can be stored at (e.g., queued at) the memory 598 while processing of the data at the classification module 596 and/or the processing module 597 is performed. For example, data parsed into cells can be queued at the memory 598 while the processing module 597 performs processing related to congestion scheme resolution. Accordingly, the memory 598 can have a size sufficient to implement a congestion resolution scheme such as that described, for example, in connection with FIG. 16A through FIG. 21.

Figure 6:
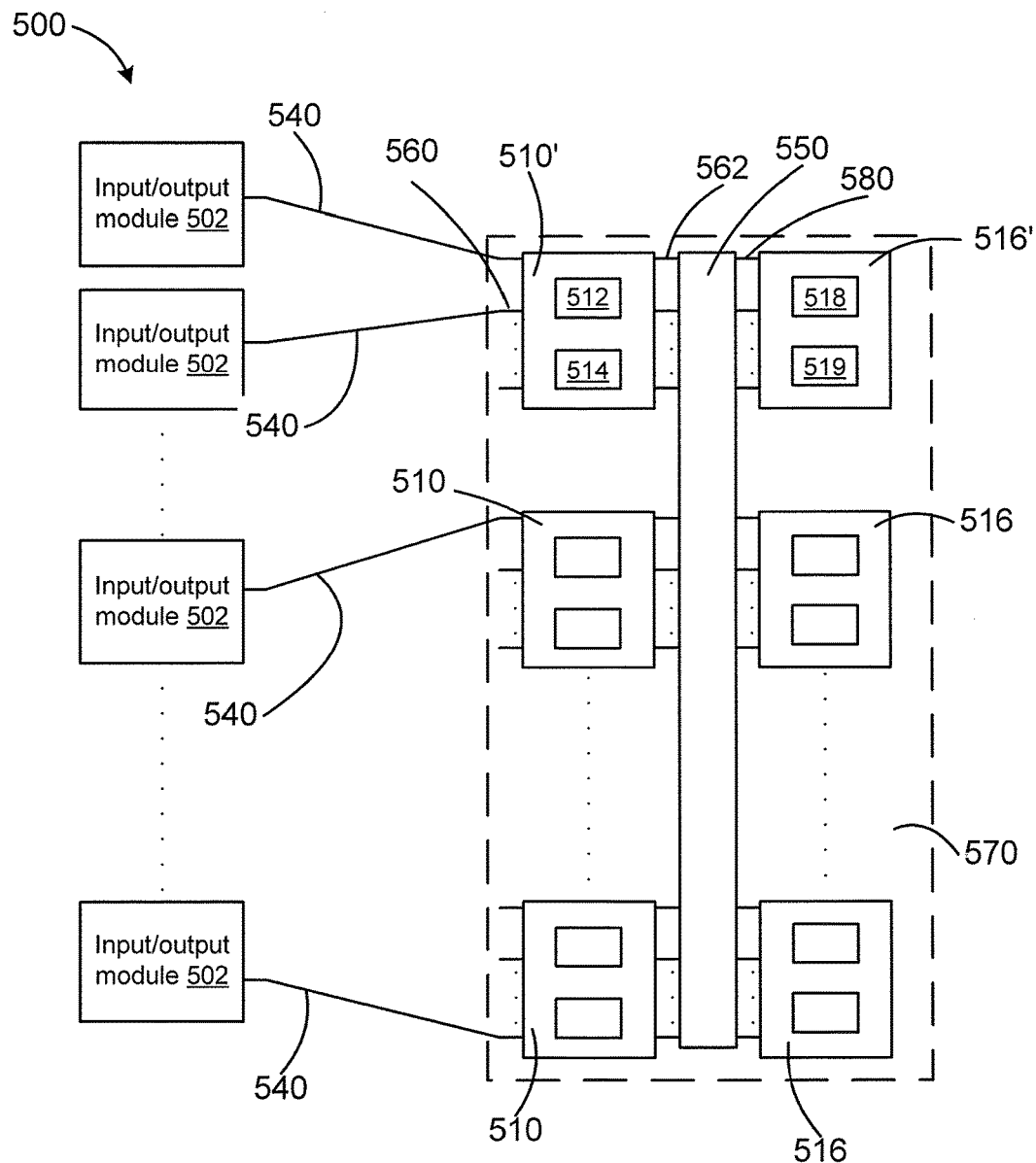
FIG. 6 is a schematic diagram that illustrates a portion of the switch fabric system of FIG. 5A, according to an embodiment.

FIG. 6 shows a portion of the switch fabric system 500 of FIG. 5A, including the first switch fabric portion 571, in greater detail. The first switch fabric portion 571 includes interface cards 510, which are associated with a first stage and a third stage of the first switch fabric portion 571; interface cards 516, which are associated with a second stage of the first switch fabric portion 571; and a midplane 550. In some embodiments, the first switch fabric portion 571 includes eight interface cards 510, which are associated with the first stage and the third stage of the first switch fabric, and eight interface cards 516, which are associated with the second stage of the first switch fabric. In other embodiments, a different number of interface cards associated with the first stage and the third stage of the first switch fabric and/or a different number of interface cards associated with the second stage of the first switch fabric can be used.

As shown in FIG. 6, each input/output module 502 is operatively coupled to an interface card 510 via one of the cables of the first set of cables 540. In some embodiments, for example, each of eight interface cards 510 is operatively coupled to sixteen input/output modules 502, as described in further detail herein. Thus, the first switch fabric portion 571 can be coupled to 128 input/output modules (16×8=128). Each of the 128 input/output modules 502 can send data to and receive data from the first switch fabric portion 571.

Each interface card 510 is connected to each interface card 516 via the midplane 550. Thus, each interface card 510 can send data to and receive data from each interface card 516, as described in further detail herein. Using a midplane 550 to connect the interface cards 510 to the interface cards 516, decreases the number of cables used to connect the stages of the first switch fabric portion 571.

FIG. 7 shows a first interface card 510', the midplane 550, and a first interface card 516', in greater detail. Interface card 510' is associated with the first stage and the third stage of the first switch fabric portion 571, and interface card 516' is associated with the second stage of the first switch fabric portion 571. Each interface card 510 is structurally and functionally similar to the first interface card 510'. Likewise, each interface card 516 is structurally and functionally similar to the first interface card 516'.

The first interface card 510' includes multiple cable connector ports 560, a first module system 512, a second module system 514, and multiple midplane connector ports 562. For example, FIG. 7 shows the first interface card 510' having sixteen cable connector ports 560 and eight midplane connector ports 562. Each cable connector port 560 of the first interface card 510' is configured to receive a second end of a cable from the first set of cables 540. Thus, as stated above, sixteen cable connector ports 560 on each of the eight interface cards 510 are used to receive the 128 cables (16×8=128). While shown in FIG. 7 as having sixteen cable connector ports 560, in other embodiments, any number of cable connector ports can be used, such that each cable from the first set of cables can be received by a cable connector port in the first switch fabric. For example, if sixteen interface cards are used, each interface card can include eight cable connector ports.

The first module system 512 and the second module system 514 of the first interface card 510' each includes a module of the first stage of the first switch fabric portion 571 and a module of the third stage of the first switch fabric portion 571. In some embodiments, eight cable connector ports of the sixteen cable connector ports 560 are operatively coupled to the first module system 512 and the remaining eight cable connector ports of the sixteen cable connector ports 560 are operatively coupled to the second module system 514. Both the first module system 512 and the second module system 514 are operatively coupled to each of the eight midplane connector ports 562 of interface card 510'.

The first module system 512 and the second module system 514 of first interface card 510' are ASICs. The first module system 512 and the second module system 514 are instances of the same ASIC. Thus, manufacturing costs can be decreased because multiple instances of a single ASIC can be produced. Further, a module of the first stage of the first switch fabric portion 571 and a module of the third stage of the first switch fabric are both included on each ASIC.

In some embodiments, each midplane connector port of the eight midplane connector ports 562 has twice the data capacity of each cable connector port of the sixteen cable connector ports 560. Thus, instead of having eight data transmit and eight data receive connections, the eight midplane connector ports 562 each has sixteen data transmit and sixteen data receive connections. Thus, the bandwidth of the eight midplane connector ports 562 is equivalent to the bandwidth of the sixteen cable connector ports 560. In other embodiments, each midplane connector port has thirty-two data transmit and thirty-two data receive connections. In such an embodiment, each cable connector port has sixteen data transmit and sixteen data receive connections.

The eight midplane connector ports 562 of the first interface card 510' are connected to the midplane 550. The midplane 550 is configured to connect each interface card 510 which is associated with the first stage and the third stage of the first switch fabric portion 571, to each interface card 516 which is associated with the second stage of the first switch fabric portion 571. Thus, the midplane 550 ensures that each midplane connector port 562 of each interface card 510 is connected to a midplane connector port 580 of a different interface card 516. Said another way, no two midplane connector ports of the same interface card 510 are operatively coupled to the same interface card 516. Thus, the midplane 550 allows each interface card 510 to send data to and receive data from any of the eight interface cards 516.

While FIG. 7 shows a schematic view of the first interface card 510' the midplane 550, and the first interface card 516', in some embodiments, the interface cards 510, the midplane 550, and the interface cards 516 are physically positioned similar to the horizontally positioned interface cards 620, the midplane 640, and vertically positioned interface cards 630, respectively, shown in FIGS. 5 through 7 and described in further detail herein. Thus, the modules associated with the first stage and the modules associated with the third stage (both on the interface cards 510) are placed on one side of the midplane 550, and the modules associated with the second stage (on the interface cards 516) are placed on the opposite side of the midplane 550. This topology allows each module associated with the first stage to be operatively coupled to each module associated with the second stage, and each module associated with the second stage to be operatively coupled to each module associated with the third stage.

The first interface card 516' includes multiple midplane connector ports 580, a first module system 518, and a second module system 519. The multiple midplane connector ports 580 are configured to send data to and receive data from any of the interface cards 510, via the midplane 550. In some embodiments, the first interface card 516' includes eight midplane connector ports 580.

The first module system 518 and the second module system 519 of the first interface card 516' are operatively coupled to each midplane connector port 580 of the first interface card 516'. Thus, through the midplane 550, each of the module systems 512, 514 associated with the first stage and the third stage of the first switch fabric portion 571 is operatively coupled to each of the module systems 518, 519 associated with the second stage of the first switch fabric portion 571. Said another way, each module system 512, 514 associated with the first stage and the third stage of the first switch fabric portion 571 can send data to and receive data from any of the module systems 518, 519 associated with the second stage of the first switch fabric portion 571, and vice versa. Specifically, a module associated with the first stage within a module system 512 or 514 can send data to a module associated with the second stage within a module system 518 or 519. Similarly, the module associated with the second stage within the module system 518 or 519 can send data to a module associated with the third stage within a module system 512 or 514. In other embodiments, the module associated with the third stage can send data and/or control signals to the module associated with the second stage, and the module associated with the second stage can send data and/or control signals to the module associated with the first stage.

In embodiments where each module of the first stage of the first switch fabric portion 571 has eight inputs (i.e., two modules per each interface card 510), the second stage of the first switch fabric portion 571 can have at least eight modules for the first switch fabric portion 571 to remain rearrangeably non-blocking. Thus, the second stage of the first switch fabric portion 571 has at least eight modules and is rearrangeably non-blocking. In some embodiments, twice the number of modules of the second stage are used to facilitate expansion of the switch fabric system 500 from a three-stage switch fabric to a five-stage switch fabric, as described in further detail herein. In such a five-stage switch fabric, the second stage supports twice the switching throughput as the second stage within the three-stage switch fabric of the switch fabric system 500. For example, in some embodiments, sixteen modules of the second stage can be used to facilitate future expansion of the switch fabric system 500 from a three-stage switch fabric to a five-stage switch fabric.

The first module system 518 and the second module system 519 of first interface card 516' are ASICs. The first module system 518 and the second module system 519 are instances of the same ASIC. Additionally, in some embodiments, the first module system 518 and the second module system 519 which are associated with the second stage of the first switch fabric portion 571, are instances of the ASIC also used for the first module system 512 and the second module system 514 of the first interface card 510', which are associated with the first stage and the third stage of the first switch fabric portion 571. Thus, manufacturing costs can be decreased because multiple instances of a single ASIC can be used for each of the module systems in the first switch fabric portion 571.

In use, data is transferred from a first input/output module 502 to a second input/output module 502 via the first switch fabric portion 571. The first input/output module 502 sends data into the first switch fabric portion 571 via a cable of the first set of cables 540. The data passes through a cable connector port 560 of one of the interface cards 510' and into the first stage module within a module system 512 or 514.

The first stage module within the module system 512 or 514 forwards the data to a second stage module within a module system 518 or 519, by sending the data through one of the midplane connector ports 562 of the interface card 510', through the midplane 550, and to one of the interface cards 516'. The data enters the interface card 516' through a midplane connector port 580 of the interface card 516'. The data is then sent to the second stage module within a module system 518 or 519.

The second stage module, determines how the second input/output module 502 is connected and redirects the data back to the interface card 510', via the midplane 550. Because each module system 518 or 519 is operatively coupled to each module system 512 and 514 on interface card 510', the second stage module within the module system 518 or 519 can determine which third stage module within the module system 512 or 514 is operatively coupled to the second input/output module and send the data accordingly.

The data is sent to the third stage module within a module system 512, 514 on the interface card 510'. The third stage module then sends the data to the second input/output module of the input/output modules 502 via a cable of the first set of cables 540 through a cable connector port 560.

In other embodiments, instead of the first stage module sending the data to a single second stage module, the first stage module separates the data into separate portions (e.g., cells) and forwards a portion of the data to each second stage module to which the first stage module is operatively coupled (e.g., in this embodiment, every second stage module receives a portion of the data). Each second stage module then determines how the second input/output module is connected and redirects the portions of the data back to a single third stage module. The third stage module then reconstructs the received portions of the data and sends the data to the second input/output module.

Figure 9:
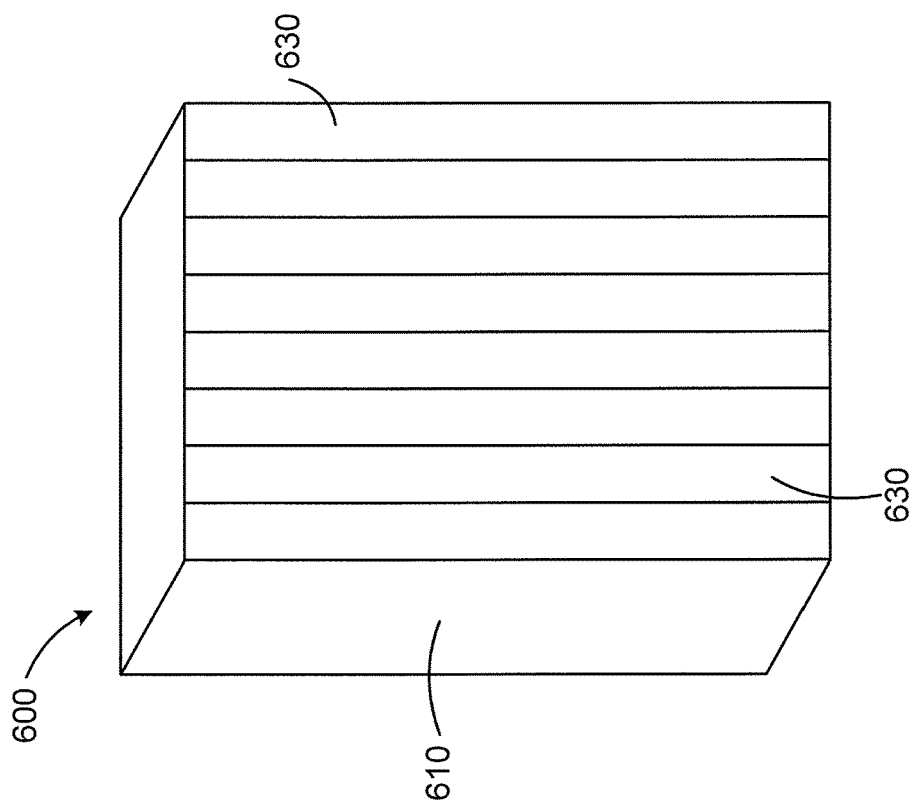
FIGS. 8 and 9 show front and back perspective views respectively, of a housing used to house a switch fabric, according to an embodiment.
Figure 8:
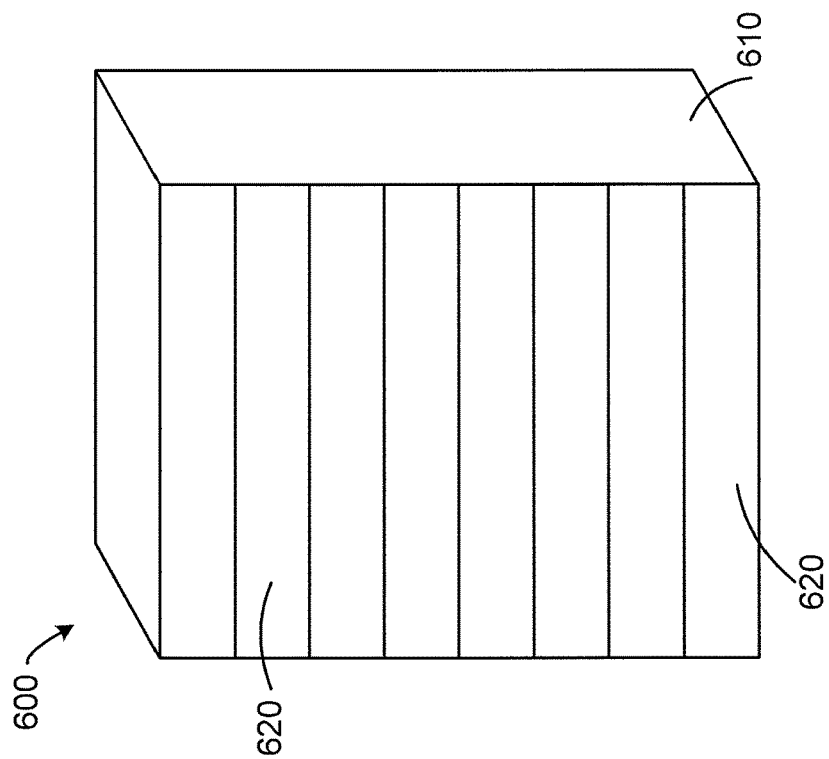
Figure 10:
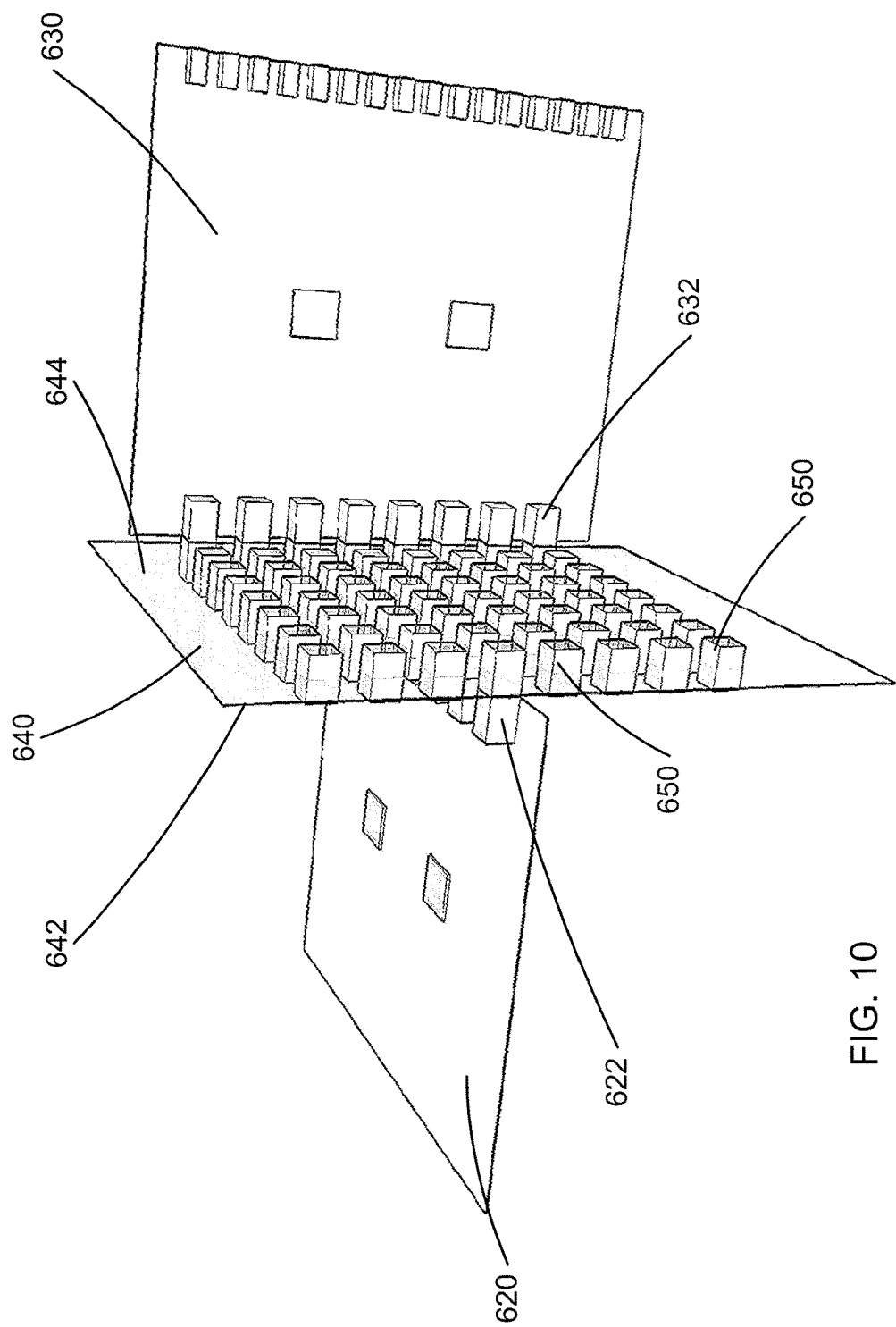
FIG. 10 shows a portion of the housing of FIG. 8, according to an embodiment.

FIGS. 8-10 show a housing 600 (i.e., a chassis) used to house a switch fabric (such as first switch fabric portion 571 described above), according to an embodiment. The housing 600 includes a casing 610, a midplane 640, horizontally positioned interface cards 620 and vertically positioned interface cards 630. FIG. 8 shows a front view of the casing 610 in which eight horizontally positioned interface cards 620 can be seen disposed within the casing 610. FIG. 9 shows a rear view of the casing 610 in which eight vertically positioned interface cards 630 can be seen disposed within the casing 610.

Each horizontally positioned interface card 620 is operatively coupled to each vertically positioned interface card 630 by the midplane 640 (see FIG. 10). The midplane 640 includes a front surface 642, a rear surface 644 and an array of receptacles 650 that connect the front surface 642 with the rear surface 644, as described below. As shown in FIG. 10, the horizontally positioned interface cards 620 include multiple midplane connector ports 622 that connect to the receptacles 650 on the front surface 642 of the midplane 640. Similarly, the vertically positioned interface cards 630 include multiple midplane connector ports 632 that connect to the receptacles on the rear surface 644 of the midplane 640. In this manner, a plane defined by each horizontally positioned interface card 620 intersects a plane defined by each vertically positioned interface card 630.

The receptacles 650 of the midplane 640 operatively couple each horizontally-positioned interface card 620 to each vertically-positioned interface card 630. The receptacles 650 facilitate the transfer of signals between a horizontally-positioned interface card 620 and a vertically-positioned interface card 630. In some embodiments, for example, the receptacles 650 can be multiple-pin connectors configured to receive multiple pin-connectors disposed on the midplane connector ports 622, 632 of the interface cards 620, 630, hollow tubes that allow a horizontally-positioned interface card 620 to directly connect with a vertically-positioned interface card 630, and/or any other device configured to operatively couple two interface cards. Using such a midplane 640, each horizontally-positioned interface card 620 is operatively coupled to each vertically-positioned interface card 630 without routing connections (e.g., electrical traces) on the midplane.

FIG. 10 shows a midplane including a total of 64 receptacles 650 positioned in an 8×8 array. In such an embodiment, eight horizontally-positioned interface cards 620 can be operatively coupled to eight vertically-positioned interface cards 630. In other embodiments, any number of receptacles can be included on the midplane and/or any number of horizontally-positioned interface cards can be operatively coupled to any number of vertically-positioned interface cards through the midplane.

If the first switch fabric portion 571 were housed in housing 600, for example, each interface card 510 associated with the first stage and the third stage of the first switch fabric portion 571 would be positioned horizontally and each interface card 516 associated with the second stage of the first switch fabric portion 571 would be positioned vertically. Thus, each interface card 510 associated with the first stage and the third stage of the first switch fabric portion 571 is easily connected to each interface card 516 associated with the second stage of the first switch fabric portion 571, through the midplane 640. In other embodiments, each interface card associated with the first stage and the third stage of the first switch fabric portion is positioned vertically and each interface card associated with the second stage of the first switch fabric portion is positioned horizontally. In still other embodiments, each interface card associated with the first stage and the third stage of the first switch fabric portion can be positioned at any angle with respect to the housing and each interface card associated with the second stage of the first switch fabric portion can be positioned at an angle orthogonal to the angle of the interface card associated with the first stage and the third stage of the first switch fabric portion with respect to the housing.

Figure 11:
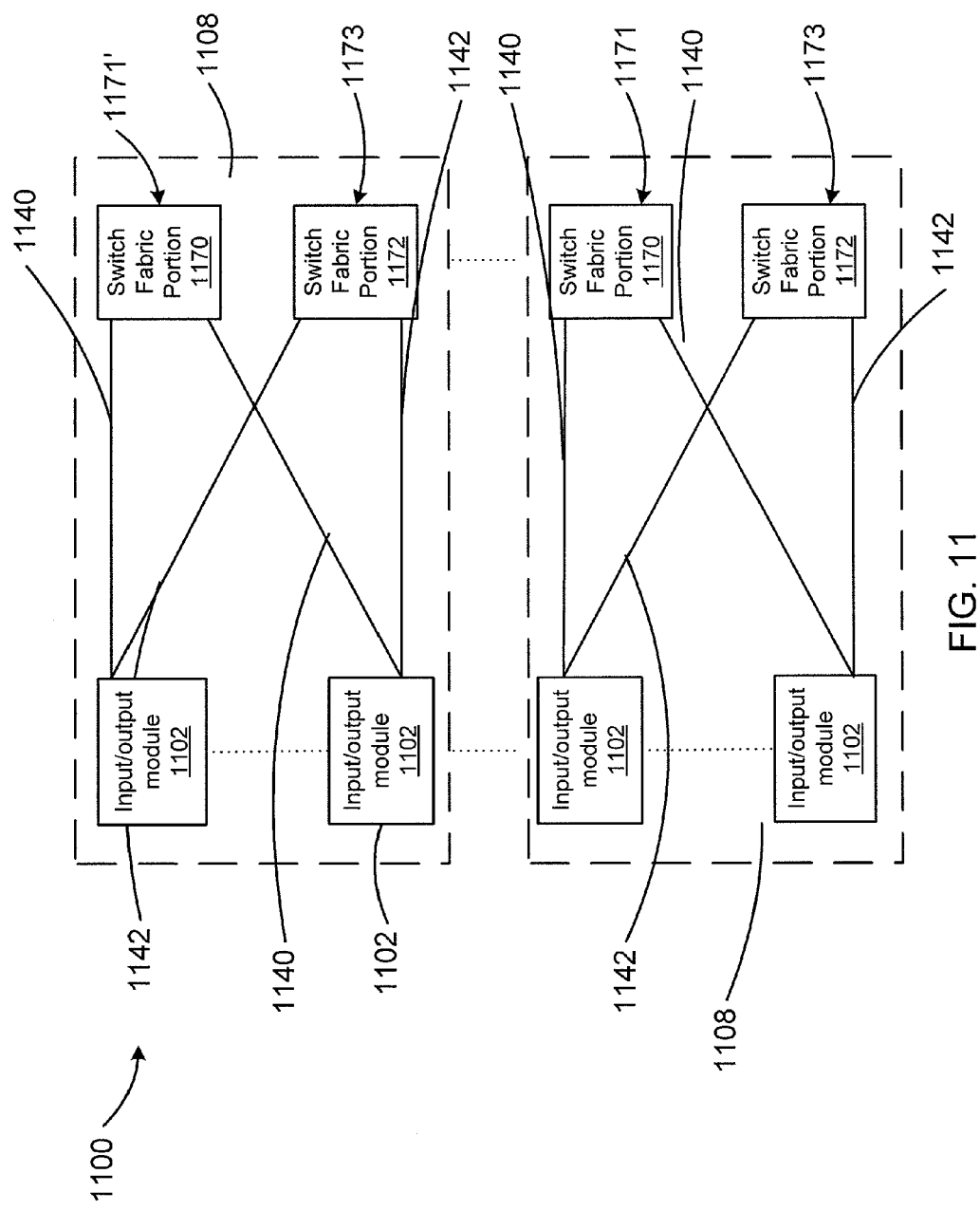
FIGS. 11 and 12 are schematic diagrams that illustrate a switch fabric in a first configuration and a second configuration respectively, according to another embodiment.
Figure 12:
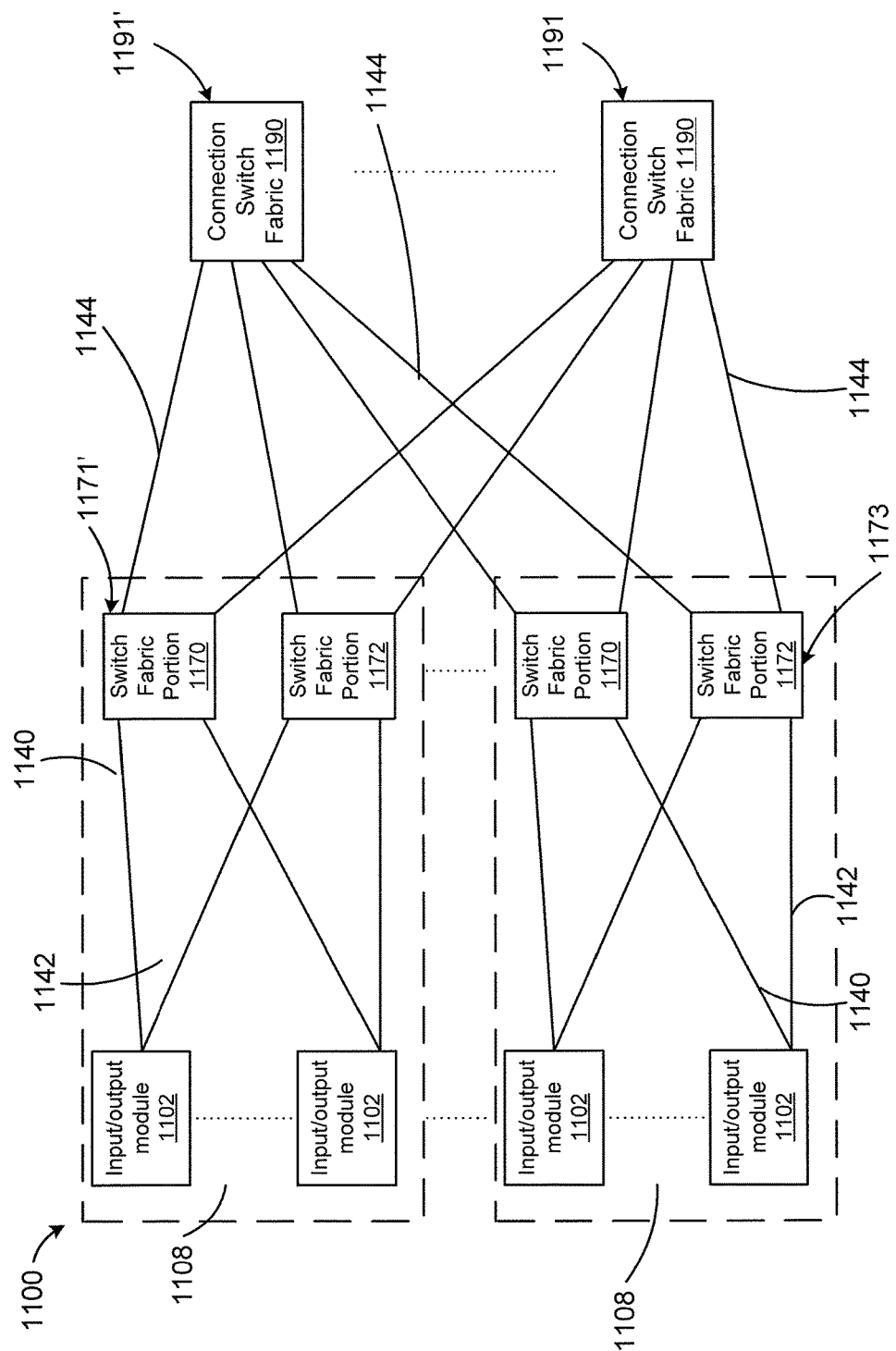

FIGS. 11 and 12 are schematic diagrams that illustrate a switch fabric 1100 in a first configuration and a second configuration, respectively, according to an embodiment. The switch fabric 1100 includes multiple switch fabric systems 1108.

Each switch fabric system 1108 includes multiple input/output modules 1102, a first set of cables 1140, a second set of cables 1142, a first switch fabric portion 1171 disposed within a housing 1170, and a second switch fabric portion 1173 disposed within a housing 1172. Each switch fabric system 1108 is structurally and functionally similar. Further, the input/output modules 1102, the first set of cables 1140, and the second set of cables 1142 are structurally and functionally similar to the input/output modules 202, the first set of cables 240, and the second set of cables 242, respectively.

When the switch fabric 1100 is in the first configuration, the first switch fabric portion 1171 and the second switch fabric portion 1173 of each switch fabric system 1108 function similar to the first switch fabric portion 571 and the second switch fabric portion 573, described above. Thus, when the switch fabric 1100 is in the first configuration, the first switch fabric portion 1171 and the second switch fabric portion 1173 operate as stand-alone three-stage switch fabrics. Accordingly, each switch fabric system 1108 acts as a stand-alone switch fabric system and is not operatively coupled to the other switch fabric systems 1108 when the switch fabric 1100 is in the first configuration.

In the second configuration (FIG. 12), the switch fabric 1100 further includes a third set of cables 1144 and multiple connection switch fabrics 1191, each disposed within a housing 1190. The housing 1190 can be similar to the housing 600 described in detail above. Each switch fabric portion 1171, 1173 of each switch fabric system 1108 is operatively coupled to each connection switch fabric 1191 via the third set of cables 1144. Thus, when the switch fabric 1100 is in the second configuration, each switch fabric system 1108 is operatively coupled to the other switch fabric systems 1108 via the connection switch fabrics 1191. Accordingly, the switch fabric 1100 in the second configuration is a five-stage Clos network.

The third set of cables 1144 can be constructed of any material suitable to transfer data between the switch fabric portions 1171, 1173 and the connection switch fabrics 1191. In some embodiments, for example, each cable 1144 is constructed of multiple optical fibers. In such an embodiment, each cable 1144 can have thirty-six transmit and thirty-six receive fibers. The thirty-six transmit fibers of each cable 1144 can include thirty-two fibers for transmitting data, and four fibers for expanding the data capacity and/or for redundancy. Similarly, the thirty-six receive fibers of each cable 1144 have thirty-two fibers for transmitting data, and four fibers for expanding the data capacity and/or for redundancy. In other embodiments, any number of fibers can be contained within each cable. By using cables having an increased number of optical fibers, the number of cables used can be significantly reduced.

Figure 13:
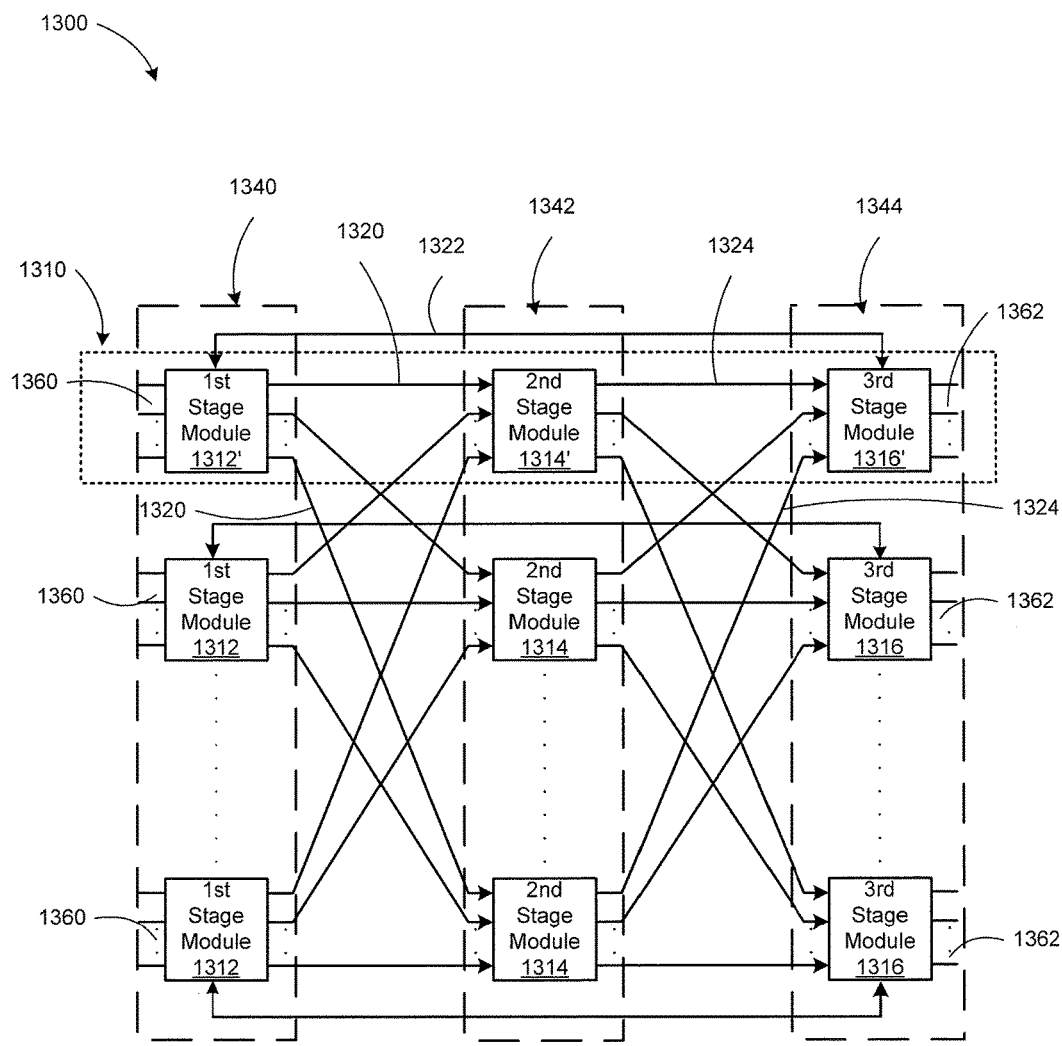
FIG. 13 is a schematic diagram that illustrates flow of data associated with a switch fabric, according to an embodiment.
Figure 14:
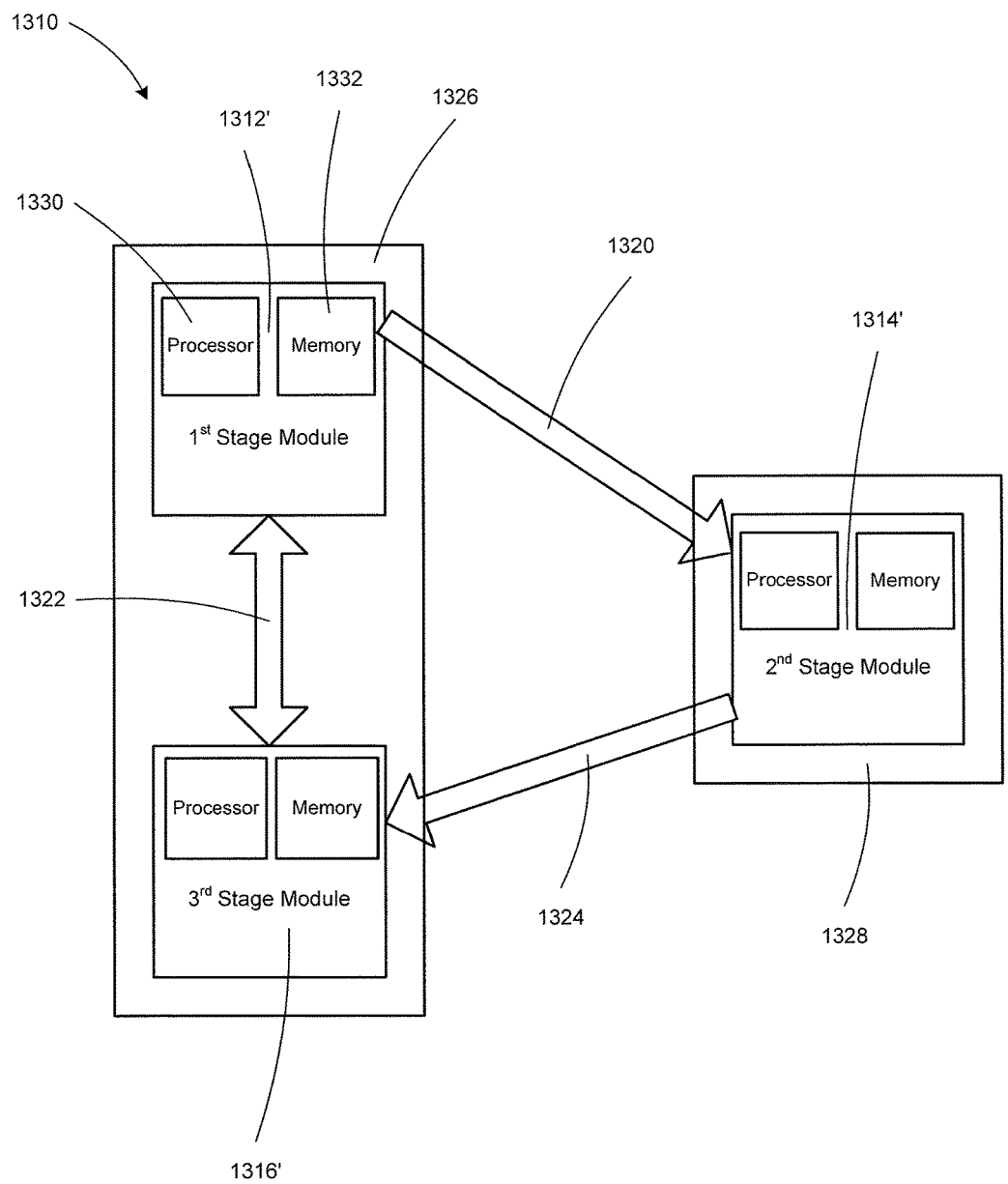
FIG. 14 is a schematic diagram that illustrates flow control within the switch fabric shown in FIG. 13, according to an embodiment

As discussed above, flow control can be performed within a switch fabric of, for example, a data center. FIGS. 13 and 14, and the accompanying description, are schematic diagrams that illustrate flow control within a switch fabric. Specifically, FIG. 13 is a schematic diagram that illustrates flow of data associated with a switch fabric 1300, according to an embodiment. The switch fabric 1300 shown in FIG. 13 is similar to switch fabric 400 shown in FIG. 4A and can be implemented in a data center such as data center 100 shown in FIG. 1. In this embodiment, switch fabric 1300 is a three-stage non-blocking Clos network and includes a first stage 1340, a second stage 1342, and a third stage 1344. The first stage 1340 includes modules 1312, the second stage 1342 includes modules 1314, and the third stage 1344 includes modules 1316. In some embodiments, the switch fabric 1300 can be a cell switched switch fabric and each module 1312 of the first stage 1340 can be a cell switch. Each module 1312 of the first stage 1340 includes a set of input ports 1360 configured to receive data as it enters the switch fabric 1300. Each module 1316 of the third stage 1344 includes output ports 1362 configured to allow data to exit the switch fabric 1300. Each module 1316 of the third stage 1344 includes the same number of output ports 1362.

Each module 1314 of the second stage 1342 is operatively coupled to each module of the first stage 1340 by a unidirectional data path 1320. Each unidirectional data path 1320 between each module of the first stage 1340 and each module 1314 of the second stage 1342 is configured to facilitate data transfer from the modules 1312 of the first stage 1340 to the modules 1314 of the second stage 1342. Because the data paths 1320 are unidirectional, they do not facilitate data transfer from the modules 1314 of the second stage 1342 to the modules 1312 of the first stage 1340. Such unidirectional data paths 1320 cost less, use fewer data connections, and are easier to implement than similar bidirectional data paths.

Each module 1316 of the third stage 1344 is connected to each module 1314 of the second stage 1342 by a unidirectional data path 1324. The unidirectional data paths 1324 between the modules 1314 of the second stage 1342 and the modules 1316 of the third stage 1344 are configured to facilitate data transfer from the modules 1314 of the second stage 1342 to the modules 1316 of the third stage 1344. Because the data paths 1324 are unidirectional, they do not facilitate data transfer from the modules 1316 of the third stage 1344 to the modules 1314 of the second stage 1344. As stated above, such unidirectional data paths 1324 cost less and use less area than similar bidirectional data paths.

The unidirectional data paths 1320 between the modules 1312 of the first stage 1340 and the modules 1314 of the second stage 1342 and/or the unidirectional data paths 1320 between the modules 1314 of the second stage 1342 and the modules 1316 of the third stage 1344 can be constructed in any manner configured to effectively facilitate data transfer. In some embodiments, for example, the data paths are optical connectors between the modules. In other embodiments, the data paths are within a midplane connector. Such a midplane connector can be similar to that described in FIGS. 8 through 10. Such a midplane connector can be effectively used to connect each module of the second stage with each module of the third stage. In still other embodiments, the modules are contained within a single chip package and the unidirectional data paths are electrical traces.

Each module 1312 of the first stage 1340 is physically proximate to a respective module 1316 of the third stage 1344. Said another way, each module 1312 of the first stage 1340 is paired with a module 1316 of the third stage 1344. For example, in some embodiments, each module 1312 of the first stage 1340 is within the same chip package of a module 1316 of the third stage 1344. A bidirectional flow-control path 1322 exists between each module 1312 of the first stage 1340 and its respective module 1316 of the third stage 1344. The flow-control path 1322 allows a module 1312 of the first stage 1340 to send a flow-control indicator to the respective module 1316 of the third stage 1344, and vice versa. As described in further detail herein, this allows any module in any stage of the switch fabric to send a flow-control indicator to the module sending it data. In some embodiments, the bidirectional flow-control path 1322 is constructed of two separate unidirectional flow control paths. The two separate unidirectional flow control paths allow flow-control indicators to pass between a module 1312 of the first stage 1340 and a module 1316 of the third stage 1344.

FIG. 14 is a schematic diagram that illustrates flow control within the switch fabric 1300 shown in FIG. 13, according to an embodiment. Specifically, the schematic diagram illustrates a detailed view of a first row 1310 of the switch fabric 1300 shown in FIG. 13. The first row includes a module 1312' of the first stage 1340, a module 1314' of the second stage 1342, and a module 1316' of the third stage 1344. The module 1312' of the first stage 1340 includes a processor 1330 and a memory 1332. The processor 1330 is configured to control receiving and transmitting data. The memory 1332 is configured to buffer data when the module 1314' of the second stage 1342 cannot yet receive the data and/or the module 1312' of the first stage 1340 cannot yet send the data. In some embodiments, for example, if the module 1314' of the second stage 1342 has sent a suspension indicator to the module 1312' of the first stage 1340, the module 1312' of the first stage 1340 buffers the data until the module 1314' of the second stage 1342 can receive the data. Similarly, in some embodiments the module 1312' of the first stage 1340 can buffer data when multiple data signals are received by the module 1312' at substantially the same time (e.g., from multiple input ports). In such embodiments, if only a single data signal can be outputted from the module 1312' at a given time (e.g., each clock cycle), the other data signals received can be buffered. Similar to the module 1312' of the first stage 1340, each module in the switch fabric 1300 includes a processor and a memory.

The module 1312' of the first stage 1340 and its pair module 1316' of the third stage 1344 are both included on a first chip package 1326. This allows the flow-control path 1322 between the module 1312' of the first stage 1340 and the module 1316' of the third stage 1344 to be easily constructed. For example, the flow-control path 1322 can be a trace on the first chip package 1326 between the module 1312' of the first stage 1340 and the module 1316' of the third stage. In other embodiments, the module of the first stage and the module of the third stage are on separate chip packages but are in close proximity to each other, which still allows the flow-control path between them to be constructed without using a large amount of wiring and/or a long trace.

The module 1314' of the second stage 1342 is included on a second chip package 1328. The unidirectional data path 1320 between the module 1312' of the first stage 1340 and the module 1314' of the second stage 1342, and the unidirectional data path 1324 between the module of the second stage 1314' and the module 1316' of the third stage 1344 operatively connect the first chip package 1326 to the second chip package 1328. While not shown in FIG. 14, the module 1312' of the first stage 1340 and the module 1316' of the third stage 1344 are also connected to each module of the second stage by unidirectional data paths. As stated above, the unidirectional data path can be constructed in any manner configured to effectively facilitate data transfer between the modules.

The flow-control path 1322 and the unidirectional data paths 1320, 1324 can be effectively used to send flow-control indicators between the modules 1312', 1314', 1316'. For example, if the module 1312' of the first stage 1340 is sending data to the module 1314' of the second stage 1342 and the amount of data in the buffer of the module 1314' of the second stage 1342 exceeds a threshold, the module 1314' of the second stage 1342 can send a flow-control indicator to the module 1316' of the third stage 1344 via the unidirectional data path 1324 between the module 1314' of the second stage 1342 and the module 1316' of the third stage 1344. This flow-control indicator triggers the module 1316' of the third stage 1344 to send a flow-control indicator to the module 1312' of the first stage 1340 via the flow-control path 1322. The flow-control indicator sent from the module 1316' of the third stage 1344 to the module 1312' of the first stage 1340 causes the module 1312' of the first stage 1340 to stop sending data to the module 1314' of the second stage 1342. Similarly, flow-control indicators can be sent from the module 1314' of the second stage 1342 to the module 1312' of the first stage 1340 via the module 1316' of the third stage 1344 requesting that data be sent (i.e., resume sending data) from the module 1312' of the first stage 1340 to the module 1314' of the second stage 1342.

Having two stages of the switch fabric within the same chip package with an on-chip bidirectional flow-control path between them minimizes the connections between separate chip packages, which can be bulky and/or require a large amount of volume. Additionally, having two stages physically within the same package with an on-chip bidirectional flow-control path between them, allows the data paths between chip packages to be unidirectional while providing an ability for the flow-control communication between a sending module and a receiving module. More details related to bidirectional flow-control paths within a switch fabric are described in co-pending U.S. patent application Ser. No. 12/345,490, filed on Dec. 29, 2008, entitled, "Flow-Control in a Switch Fabric," which is incorporated herein by reference in its entirety.

As described in connection with FIGS. 13 and 14, a buffer module can be included in a module within a stage of a switch fabric. More details related to a buffer module that can be included in, for example, a stage of a switch fabric are described in connection with FIG. 15.

Figure 15:
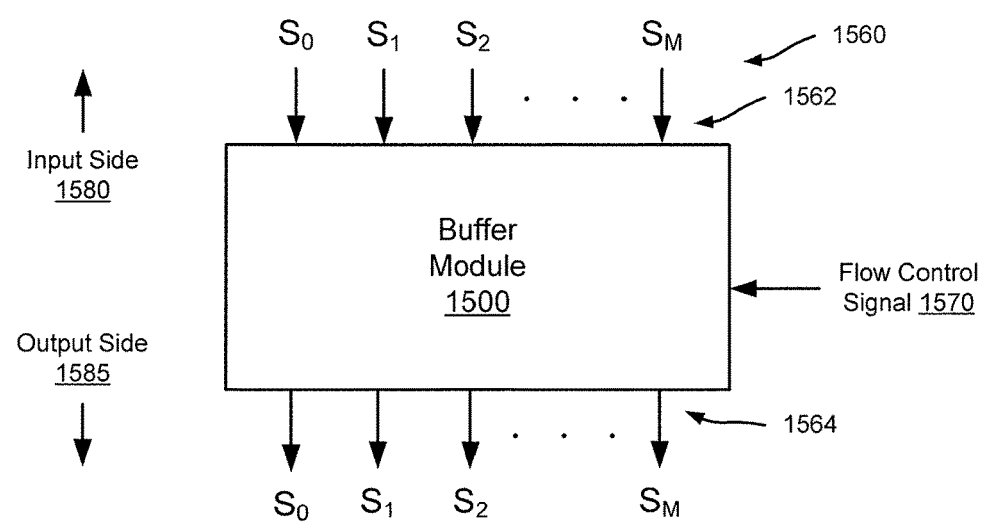
FIG. 15 is a schematic diagram that illustrates a buffer module, according to an embodiment.

FIG. 15 is a schematic diagram that illustrates a buffer module 1500, according to an embodiment. As shown in FIG. 15, data signals $S_0$ through $S_M$ are received at the buffer module 1500 on an input side 1580 of the buffer module 1500 (e.g., through input ports 1562 of the buffer module 1500). After processing at the buffer module 1500, the data signals $S_0$ through $S_M$ are transmitted from the buffer module 1500 on an output side 1585 of the buffer module 1500 (e.g., through output ports 1564 of the buffer module 1500). Each of the data signals $S_0$ through $S_M$ can define a channel (also can be referred to as a data channel). The data signals $S_0$ through $S_M$ can collectively be referred to as data signals 1560. Although the input side 1580 of the buffer module 1500 and the output side 1585 of the buffer module 1500 are shown on different physical sides of the buffer module 1500, the input side 1580 of the buffer module 1500 and the output side 1585 of the buffer module 1500 are logically defined and do not preclude various physical configurations of the buffer module 1500. For example, one or more of the input ports 1562 and/or one or more of the output ports 1564 of the buffer module 1500 can be physically located at any side (and/or the same side) of the buffer module 1500.

The buffer module 1500 can be configured to process the data signals 1560 such that processing latencies of the data signals 1560 through the buffer module 1500 can be relatively small and substantially constant. Accordingly, the bit rates of the data signals 1560, as the data signals 1560 are processed through the buffer module 1500, can be substantially constant. For example, the processing latency of data signal $S_2$ through the buffer module 1500 can be a substantially constant number of clock cycles (e.g., a single clock cycle, a few clock cycles). Accordingly, the data signal $S_2$ may be time-shifted by the number of clock cycles, and the bit rate of the data signal $S_2$ transmitted into the input side 1580 of the buffer module 1500 will be substantially the same as the bit rate of the data signal $S_2$ transmitted from the output side 1585 of the buffer module 1500.

The buffer module 1500 can be configured to modify a bit rate of one or more of the data signals 1560 in response to one or more portions of flow control signal 1570. For example, the buffer module 1500 can be configured to delay data signal $S_2$ received at the buffer module 1500 in response to a portion of the flow control signal 1570 indicating that data signal $S_2$ should be delayed for a specified period of time. Specifically, the buffer module 1500 can be configured to store (e.g. hold) one or more portions of the data signal $S_2$ until the buffer module 1500 receives an indicator (e.g., a portion of flow control signal 1570) that data signal $S_2$ should no longer be delayed. Accordingly, the bit rate of the data signal $S_2$ transmitted into the input side 1580 of the buffer module 1500 will be different (e.g., substantially different) than the bit rate of the data signal $S_2$ transmitted from the output side 1585 of the buffer module 1500.

In some embodiments, processing at the buffer module 1500 can be performed at memory bank based on, for example, segments of variable-sized cells. For example, in some embodiments, the segments of the cells can be processed through various memory banks (e.g., static random-access memory (SRAM) memory banks) included in the buffer module 1500 during a distribution process. The memory banks can collectively define a shared memory buffer. In some embodiments, the segments of the data signals can be distributed to memory banks in a predefined fashion (e.g., in a predefined pattern, in accordance with a predefined algorithm) during the distribution process. For example, in some embodiments, the leading segments of the data signals 1560 can be processed at portions of the buffer module 1500 (e.g., specified memory banks of the buffer module 1500) that can be different than portions where the trailing segments are processed within the buffer module 1500. In some embodiments, the segments of the data signals 1560 can be processed in a particular order. In some embodiments, for example, each of the segments of the data signals 1560 can be processed based on their respective positions within a cell. After the segments of the cells have been processed through the shared memory buffer, the segments of the cells can be ordered and sent from the buffer module 1500 during a reassembly process.

In some embodiments, for example, a read multiplexing module of the buffer module 1500 can be configured to reassemble the segments associated with the data signals 1560 and send (e.g., transmit) the data signals 1560 from the buffer module 1500. The reassembly process can be defined based on the predefined methodology used to distribute segments to memory banks of the buffer module 1500. For example, the read multiplexing module can be configured to first read a leading segment associated with a cell from a leading memory bank, and then read trailing segments associated with the cell from trailing memory banks in a round-robin fashion (because the segments were written in a round-robin fashion). Accordingly, very few control signals, if any, need to be transmitted between a write multiplexing module and the read multiplexing module. More details related to segment processing (e.g., segment distribution and/or segment reassembly) are described in co-pending U.S. patent application Ser. No. 12/415,517, filed on Mar. 31, 2009, entitled, "Methods and Apparatus Related to a Shared Memory Buffer for Variable-Sized Cells," which has been incorporated herein by reference in its entirety.

Figure 16A:
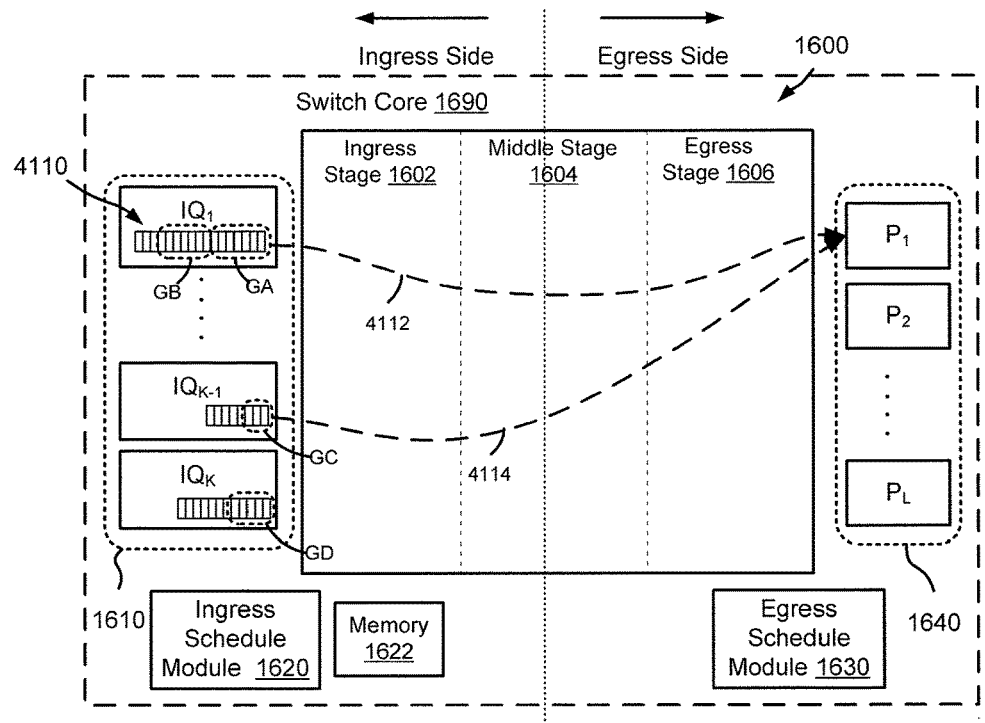
FIG. 16A is a schematic block diagram of an ingress schedule module and an egress schedule module configured to coordinate transmissions of groups of cells via a switch fabric of a switch core, according to an embodiment.

FIG. 16A is a schematic block diagram of an ingress schedule module 1620 and an egress schedule module 1630 configured to coordinate transmissions of groups of cells via a switch fabric 1600 of a switch core 1690, according to an embodiment. Coordinating can include, for example, scheduling the transmission of the groups of cells via the switch fabric 1600, tracking requests and/or responses related to transmission of the groups of cells, and so forth. The ingress schedule module 1620 can be included on an ingress side of the switch fabric 1600 and the egress schedule module 1630 can be included on an egress side of the switch fabric 1600. The switch fabric 1600 can include an ingress stage 1602, a middle stage 1604, and an egress stage 1606. In some embodiments, the switch fabric 1600 can be defined based on a Clos network architecture (e.g., a non-blocking Clos network, a strict sense non-blocking Clos network, a Benes network) and the switch fabric 1600 can include a data plane and a control plane. In some embodiments, the switch fabric 1600 can be a core portion of a data center (not shown), which can include a network or interconnection of devices.

As shown in FIG. 16A, ingress queues $IQ_1$ through $IQ_K$ (collectively referred to as ingress queues 1610) can be disposed on the ingress side of the switch fabric 1600. The ingress queues 1610 can be associated with an ingress stage 1602 of the switch fabric 1600. In some embodiments, the ingress queues 1610 can be included in a line card. In some embodiments, the ingress queues 1610 can be disposed outside of the switch fabric 1600 and/or outside of the switch core 1690. Each of the ingress queues 1610 can be a first-in-first-out (FIFO) type queue. Although not shown, in some embodiments, each of the ingress queues $IQ_1$ through $IQ_K$ can be associated with (e.g., uniquely associated with) an input/output port (e.g., a 10 Gb/s port). In some embodiments, each of the ingress queues $IQ_1$ through $IQ_K$ can have a size sufficient to implement a congestion resolution scheme such as a request-grant congestion resolution scheme For example, ingress queue $IQ_{K-1}$ can have a size sufficient to hold a cell (or group of cells) until a request-grant congestion scheme has been executed for the cell (or group of cells).

As shown in FIG. 16A, egress ports $P_1$ through $P_L$ (collectively referred to as egress ports 1640) can be disposed on the egress side of the switch fabric 1600. The egress ports 1640 can be associated with an egress stage 1606 of the switch fabric 1600. In some embodiments, the egress ports 1640 can be referred to as destination ports.

In some embodiments, the ingress queues 1610 can be included in one or more ingress line cards (not shown) disposed outside of the ingress stage 1602 of the switch fabric 1600. In some embodiments, the egress ports 1640 can be included in one or more egress line cards (not shown) disposed outside of the egress stage 1606 of the switch fabric 1600. In some embodiments, one or more of the ingress queues 1610 and/or one or more of the egress ports 1640 can be included in a one or more stages (e.g., ingress stage 1602)

of the switch fabric 1600. In some embodiments, the egress schedule module 1620 can be included in one or more egress line cards and/or the ingress schedule module 1630 can be included in one or more ingress line cards. In some embodiments, each line card (e.g., egress line card, ingress line card) associated with the switch core 1690 can include one or more schedule modules (e.g., egress schedule module, ingress schedule module).

In some embodiments, the ingress queues 1610 and/or the egress ports 1640 can be included in one or more gateway devices (not shown) disposed between the switch fabric 1600 and/or peripheral processing devices (not shown). The gateway device(s), the switch fabric 1600 and/or the peripheral processing devices can collectively define at least a portion of a data center (not shown). In some embodiments, the gateway device(s) can be edge devices within an edge portion of the switch core 1690. In some embodiments, the switch fabric 1600 and the peripheral processing devices can be configured to handle data based on different protocols. For example, the peripheral processing devices can include, for example, one or more host devices (e.g., host devices configured to execute one or more virtual resources, a web server) that can be configured to communicate based on an Ethernet protocol and the switch fabric 1600, which can be a cell-based fabric. In other words, the gateway device(s) can provide the other devices configured to communicate via one protocol with access to the switch fabric 1600, which can be configured to communicate via another protocol. In some embodiments, the gateway device(s) can be referred to as an access switch or as a network device. In some embodiments, the gateway device(s) can be configured to function as a router, a network hub device, and/or a network bridge device.

In this embodiment, for example, the ingress schedule module 1630 can be configured to define a group of cells GA queued at ingress queue $IQ_1$ and a group of cells GC queued at ingress queue $IQ_{K-1}$. The group of cells GA is queued at a front portion of the ingress queue $IQ_1$ and a group of cells GB is queued within the ingress queue $IQ_1$ behind the group of cells GA. Because ingress queue $IQ_1$ is a FIFO type queue, the group of cells GB cannot be transmitted via the switch fabric 1600 until the group of cells GA have been transmitted from the ingress queue $IQ_1$. The group of cells GC is queued at a front portion of the ingress queue $IQ_{K-1}$.

In some embodiments, a portion of the ingress queues 1610 can be mapped to (e.g., assigned to) one or more of the egress ports 1640. For example, ingress queues $IQ_1$ through $IQ_{K-1}$ can be mapped to egress port $P_1$ so that all of the queued cells 310 ingress ports $IQ_1$ through $IQ_{K-1}$ will be scheduled by the ingress schedule module 1620 for transmission via the switch fabric 1600 to egress port $P_1$. Similarly, ingress queues $IQ_K$ can be mapped to egress port $P_2$. The mapping can be stored at a memory (e.g., memory 1622) as, for example, a look-up table that can be accessed by ingress schedule module 1620 when scheduling (e.g., requesting) transmission of groups of cells.

In some embodiments, one or more of the ingress queues 1610 can be associated with a priority value (also can be referred to a transmission priority value). The ingress schedule module 1620 can be configured to schedule transmission of cells from the ingress queues 1610 based on the priority values. For example, ingress schedule module 1620 can be configured to request transmission of group of cells GC to egress port $P_1$ before requesting transmission of group of cells GA to egress port $P_1$ because ingress queue $IQ_{K-1}$ can be associated with a higher priority value than ingress queue $IQ_1$. The priority values can be defined based on a level of service (e.g., a quality of service (QoS)). For example, in some embodiments, different types of network traffic can be associated with a different level of service (and, thus a different priority). For example, storage traffic (e.g., read and write traffic), inter-processor communication, media signaling, session layer signaling, and so forth each can be associated with at least one level of service. In some embodiments, the priority values can be based on, for example, the IEEE 802.1qbb protocol, which defines a priority-based flow control strategy.

In some embodiments, one or more of the ingress queues 1610 and/or one or more of the egress ports 1640 can be paused. In some embodiments, one or more of the ingress queues 1610 and/or one or more of the egress ports 1640 can be paused so that cells are not dropped. For example, if egress port $P_1$ is temporarily unavailable, transmission of cells from ingress queue $IQ_1$ and/or ingress queue $IQ_{K-1}$ can be paused so that cells won't be dropped at egress port $P_1$ because egress port $P_1$ is temporarily unavailable. In some embodiments, one or more of the ingress queues 1610 can be associated with a priority value. For example, if egress port $P_1$ is congested, transmission of cells from ingress queue $IQ_1$ to egress port $P_1$ can be paused rather than transmission of cells ingress queue $IQ_{K-1}$ to egress port $P_1$ because ingress queue $IQ_{K-1}$ can be associated with a higher priority value than ingress queue $IQ_1$.

The ingress schedule module 1620 can be configured to exchange signals with (e.g., transmit signals to and receive signals from) the egress schedule module 1630 to coordinate the transmission of the group of cells GA via the switch fabric 1600 to egress port $P_1$, and to coordinate the transmission of group of cells GC via the switch fabric 1600 to egress port $P_1$. Because the group of cells GA is to be transmitted to egress port $P_1$, the egress port $P_1$ can be referred to as a destination port of the group of cells GA. Similarly, egress port $P_1$ can be referred to as a destination port of the group of cells GB. As shown in FIG. 16A, the group of cells GA can be transmitted via a transmission path 4112 that is different than a transmission path 4114 through which the group of cells GC is transmitted.

The group of cells GA and the group of cells GB are defined by the ingress schedule module 1620 based on cells 4110 that are queued at ingress queue $IQ_1$. Specifically, the group of cells GA can be defined based on each cell from the group of cells GA having a common destination port and having a specified position within the ingress queue $IQ_1$. Similarly, the group of cells GC can be defined based on each cell from the group of cells GC having a common destination port and having a specified position within the ingress queue $IQ_{K-1}$. Although not shown, in some embodiments, for example, the cells 4110 can include content (e.g., data packets) received at the switch core 1690 from one or more peripheral processing devices (e.g., a personal computer, a server, a router, a personal digital assistant (PDA)) via one or more networks (e.g., a local area network (LAN), a wide area network (WAN), a virtual network) that can be wired and/or wireless. More details related to defining of groups of cells, such as group of cells GA, the group of cells GB, and/or the group of cells GC, are discussed in connection with FIGS. 17 and 18.

Figure 16B:
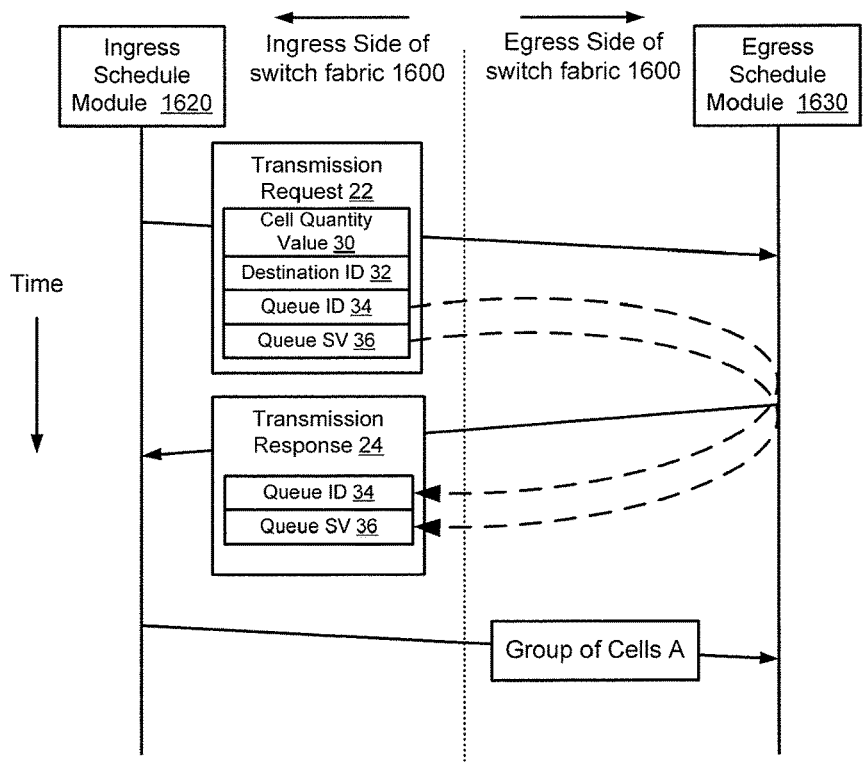
FIG. 16B is a signaling flow diagram that illustrates signaling related to the transmission of the group of cells, according to an embodiment.

FIG. 16B is a signaling flow diagram that illustrates signaling related to the transmission of the group of cells GA, according to an embodiment. As shown in FIG. 16B, time is increasing in a downward direction. After the group of cells GA has been defined (as shown in FIG. 16A), the ingress schedule module 1620 can be configured to send a request to schedule the group of cells GA for transmission via the switch fabric 1600; the request is shown as a transmission request 22. The transmission request 22 can be defined as a request to transmit the group of cells GA to egress port $P_1$, which is the destination port of the group of cells GA. In some embodiments, the destination port of the group of cells GA can be referred to as a target of the transmission request 22 (also can be referred to as a target destination port). In some embodiments, the transmission request 22 can include a request to transmit the group of cells GA via a particular transmission path (such as transmission path 4112 shown in FIG. 16A) through the switch fabric 1600, or at a particular time. The ingress schedule module 1620 can be configured to send the transmission request 22 to the egress schedule module 1630 after the transmission request 22 has been defined at the ingress schedule module 1620.

In some embodiments, the transmission request 22 can be queued on an ingress side of the switch fabric 1600 before being sent to the egress side of the switch fabric 1600. In some embodiments, the transmission request 22 can be queued until the ingress schedule module 1620 triggers sending of the transmission request 22 to the egress side of the switch fabric 1600. In some embodiments, the ingress schedule module 1620 can be configured to hold (or trigger holding of) the transmission request 22 in, for example, an ingress transmission request queue (not shown) because a volume of transmission requests for sending from the ingress side of the switch fabric 1600 is higher than a threshold value. The threshold value can be defined based on latency of transmission via the switch fabric 1600.

In some embodiments, the transmission request 22 can be queued at an egress queue (not shown) on an egress side of the switch fabric 1600. In some embodiments, the egress queue can be included in a line card (not shown), can be disposed within or outside of the switch fabric 1600, or can be disposed outside of the switch core 1690. Although not shown, in some embodiments, the transmission request 22 can be queued in an egress queue or a portion of an egress queue associated with a specific ingress queue (e.g., ingress queue $IQ_1$). In some embodiments, each of the egress ports 1640 can be associated with egress queues that are associated with (e.g., correspond with) priority values of the ingress queues 1610. For example, egress port $P_1$ can be associated with an egress queue (or portion of an egress queue) associated with ingress queue $IQ_1$ (which can have a specified priority value) and an egress queue (or portion of an egress queue) associated with ingress queue $IQ_K$ (which can have a specified priority value). Accordingly, a transmission request 22, which is queued at ingress queue $IQ_1$, can be queued at the egress queue associated with ingress queue $IQ_1$. In other words, the transmission request 22 can be queued in an egress queue (on an egress side of the switch fabric 1600) associated with a priority value of at least one of the ingress queues 1610. Similarly, the transmission request 22 can be queued in an ingress transmission request queue (not shown) or portion of an ingress transmission queue associated with a priority value of the at least one of the ingress queues 1610.

If the egress schedule module 1630 determines that the destination port of the group of cells GA (i.e., egress port $P_1$ shown in FIG. 16A) is available to receive the group of cells GA, the egress schedule module 1630 can be configured to send a transmission response 24 to the ingress schedule module 1620. The transmission response 24 can be, for example, an authorization for the group of cells GA to be transmitted (e.g., transmitted from the ingress queue $IQ_1$ shown in FIG. 16A) to the destination port of the group of cells GA. An authorization to transmit the group of cells can be referred to as a transmission authorization. In some embodiments, the group of cells GA and/or the ingress queue $IQ_1$ can be referred to as a target of the transmission response 24. In some embodiments, authorization for the group of cells GA to be transmitted can be granted when transmission across the switch fabric 1600 is substantially guaranteed, for example, because the destination port is available.

In response to the transmission response 24, the ingress schedule module 1620 can be configured to transmit the group of cells GA from the ingress side of the switch fabric 1600 to the egress side of the switch fabric 1600 via the switch fabric 1600. In some embodiments, the transmission response 24 can include an instruction to transmit the group of cells GA via a particular transmission path (such as transmission path 4112 shown in FIG. 16A) through the switch fabric 1600, or at a particular time. In some embodiments, the instruction can be defined based on, for example, a routing policy.

As shown in FIG. 16B, the transmission request 22 includes a cell quantity value 30, a destination identifier (ID) 32, a queue identifier (ID) 34, and a queue sequence value (SV) 36 (which can collectively be referred to as a request tag). The cell quantity value 30 can represent a number of cells included in the group of cells GA. For example, in this embodiment, the group of cells GA includes seven (7) cells (shown in FIG. 16A). The destination identifier 32 can represent the destination port of the group of cells GA so that the target of the transmission request 22 can be determined by the egress schedule module 1630.

The cell quantity value 30 and the destination identifier 32 can be used by the egress schedule module 1630 to schedule the group of cells GA for transmission via the switch fabric 1600 to egress port $P_1$ (shown in FIG. 16A). As shown in FIG. 16B, in this embodiment, the egress schedule module 1630 is configured to define and send the transmission response 24 because the number of cells included in the group of cells GA can be handled (e.g., can be received) at the destination port of the group of cells GA (e.g., egress port $P_1$ shown in FIG. 16A).

In some embodiments, if the number of cells included in the group of cells GA cannot be handled (e.g., cannot be received) at the destination port of the group of cells GA (e.g., egress port $P_1$ shown in FIG. 16A) because the destination port of the group of cells GA is unavailable (e.g., in an unavailable state, in a congested state), the egress schedule module 1630 can be configured communicate the unavailability to the ingress schedule module 1620. In some embodiments, for example, the egress schedule module 1630 can be configured to deny the request (not shown) to transmit the group of cells GA via the switch fabric 1600 when the destination port of the group of cells GA is unavailable. The denial of the transmission request 22 can be referred to as a transmission denial. In some embodiments, the transmission denial can include a response tag.

In some embodiments, the availability or unavailability of, for example, egress port $P_1$ (shown in FIG. 16A) can be determined by the egress schedule module 1630 based on a condition being satisfied. For example, the condition can be related to a storage limit of a queue (not shown in FIG. 16A) associated with egress ports $P_1$ being exceeded, a flow rate of data via egress ports $P_1$, a number of cells already scheduled for transmission from the ingress queues 1610 via the switch fabric 1600 (shown in FIG. 16A), and so forth. In some embodiments, egress port $P_1$ can be unavailable to receive cells via the switch fabric 1600 when egress port $P_1$ is disabled.

As shown in FIG. 16B, the queue identifier 34 and the queue sequence value 36 are transmitted to the egress schedule module 1630 in the transmission request 22. The queue identifier 34 can represent and/or can be used to identify (e.g., uniquely identify) the ingress queue $IQ_1$ (shown in FIG. 16A) where the group of cells GA is being queued. The queue sequence value 36 can represent the location of the group of cells GA with respect to other groups of cells within the ingress queue $IQ_1$. For example, the group of cells GA can be associated with a queue sequence value of X and the group of cells GB (queued at ingress queue $IQ_1$ shown in FIG. 16A) can be associated with a queue sequence value of Y. The queue sequence value of X can indicate that the group of cells GA is to be transmitted from ingress queue $IQ_1$ before the group of cells GB, which is associated with a queue sequence value of Y.

In some embodiments, the queue sequence value 36 can be selected from a range of queue sequence values associated with ingress queue $IQ_1$ (shown in FIG. 16A). The range of queue sequence values can be defined so that sequence values from the range of sequence values will not be repeated for a specified period of time for the ingress queue $IQ_1$. For example, the range of queue sequence values can be defined so that queue sequence values from the range of queue sequence values may not be repeated during at least a period of time required to flush several cycles of cells (e.g., cells 160) queued at the ingress queue $IQ_1$ through the switch core 1690 (shown in FIG. 16A). In some embodiments, a queue sequence value can be incremented (within a range of queue sequence values) and associated with each group of cells that is defined by the ingress schedule module 1620 based on cells 4110 queued at ingress queue $IQ_1$.

In some embodiments, the range of queue sequence values associated with the ingress queue $IQ_1$ can overlap with a range of queue sequence values associated with another of the ingress queues 1610 (shown in FIG. 16A). Accordingly, the queue sequence value 36, even if from a non-unique range of queue sequence values, can be included with (e.g., included within) queue identifier 34 (which can be unique) to uniquely identify group of cells GA (at least during a specified period of time). In some embodiments, the queue sequence value 36 can be unique within the switch fabric 1600 or a globally unique value (GUID) (e.g., a universal unique identifier (UUID)).

In some embodiments, the ingress schedule module 1620 can be configured to wait to define a transmission request (not shown) associated with group of cells GB. For example, the ingress schedule module 1620 can be configured to wait until transmission request 22 is sent or wait until a response (e.g., the transmission response 24, a transmission denial) is received in response to transmission request 22 before defining a transmission request associated with group of cells GB.

As shown in FIG. 16B, the egress schedule module 1630 can be configured to include the queue identifier 34 and the queue sequence value 36 (which can collectively be referred to as a response tag) in the transmission response 24. The queue identifier 34 and the queue sequence value 36 can be included in the transmission response 24 so that the transmission response 24 can be associated with the group of cells GA at the ingress schedule module 1620 when the transmission response 24 is received at the ingress schedule module 1620. Specifically, the queue identifier 34 and the queue sequence value 36 can collectively be used to identify the group of cells GA as being, for example, authorized for transmission via the switch fabric 1600.

In some embodiments, the egress schedule module 1630 can be configured to delay sending the transmission response 24 in response to the transmission request 22. In some embodiments, the egress schedule module 1630 can be configured to delay responding if, for example, the destination port of the group of cells GA (i.e., egress port $P_1$ shown in FIG. 16A) is unavailable (e.g., temporarily unavailable). In some embodiments, the egress schedule module 1630 can be configured to send the transmission response 24 in response to egress port $P_1$ changing from an unavailable state to an available state.

In some embodiments, the egress schedule module 1630 can be configured to delay sending the transmission response 24 because the destination port of the group of cells GA (i.e., egress port $P_1$ shown in FIG. 16A) is receiving data from another of the ingress queues 1610. For example, the egress port $P_1$ can be unavailable to receive data from ingress queue $IQ_1$ because the egress port $P_1$ is receiving a different group of cells (not shown) from, for example, ingress queue $IQ_K$ (shown in FIG. 16A). In some embodiments, groups of cells from ingress queue $IQ_1$ can be associated with a higher priority value than groups of cells from ingress queue $IQ_K$ based on priority values associated with ingress queue $IQ_1$ and ingress queue $IQ_K$. The egress schedule module 1630 can be configured to delay sending of the transmission response 24 for a time period calculated based on, for example, a size of the different group of cells being received at egress port $P_1$. For example, the egress schedule module 1630 can be configured to delay sending the transmission response 24 targeted to group of cells GA for a projected time period required to complete processing of the different group of cells at egress port $P_1$. In other words, the egress schedule module 1630 can be configured to delay sending the transmission response 24 targeted to group of cells GA based on a projected time that the egress port $P_1$ will change from an unavailable state to an available state.

In some embodiments, the egress schedule module 1630 can be configured to delay sending the transmission response 24 because at least a portion of a transmission path (such as transmission path 4112 shown in FIG. 16A) through which the group of cells GA is to be transmitted is unavailable (e.g., congested). The egress schedule module 1630 can be configured to delay sending of the transmission response 24 until the portion of the transmission path is no longer congested, or based on a projected time that the portion of the transmission path will no longer be congested.

As shown in FIG. 16B, the group of cells GA can be transmitted to the destination port of the group of cells GA based on (e.g. in response to) the transmission response 24. In some embodiments, the group of cells GA can be transmitted based on one or more instructions included in the transmission response 24. For example, in some embodiments, the group of cells GA can be transmitted via the transmission path 4112 (shown in FIG. 16A) based on an instruction included in the transmission response 24, or based on one or more rules for transmission of groups of cells via the switch fabric 1600 (e.g., rules for transmission of groups of cells via a rearrangable switch fabric). Although not shown, in some embodiments, after the group of cells GA has been received at egress port $P_1$ (shown in FIG. 16A), content (e.g., data packets) from the group of cells can be transmitted to one or more network entities (e.g., a personal computer, a server, a router, a PDA) via one or more networks (e.g., a LAN, a WAN, a virtual network) that can be wired and/or wireless.

Referring back to FIG. 16A, in some embodiments, the group of cells GA can be transmitted via the transmission path 4112 and received at an egress queue (not shown) that can be relatively small compared with, for example, the ingress queues 1610. In some embodiments, the egress queue (or portion of the egress queue) can be associated with a priority value. The priority value can be associated with one or more of the ingress queues 1610. The egress schedule module 1630 can be configured to retrieve the group of cells GA from the egress queue and can be configured to transmit the group of cells GA to egress port $P_1$.

In some embodiments, the group of cells GA can be retrieved and transmitted to egress port $P_1$ with a response identifier included with the group of cells GA by the ingress schedule module 1620 when the group of cells GA is transmitted to the egress side of the switch fabric 1600. The response identifier can be defined at the egress schedule module 1630 and included in the transmission response 24. In some embodiments, if the group of cells GA is queued at an egress queue (not shown) associated the destination port of the group of cells GA, the response identifier can be used to retrieve the group of cells GA from the destination port of the group of cells GA so that the group of cells GA can be transmitted from the switch fabric 1600 via the destination port of the group of cells GA. The response identifier can be associated with a location in the egress queue that has been reserved by the egress schedule module 1630 for queuing of the group of cells GA.

In some embodiments, a group of cells queued at the ingress queues 1610 can be moved to the memory 1622 when a transmission request (such as transmission request 22 shown in FIG. 16B) associated with the group of cells is defined. For example, a group of cells GD queued at ingress queue $IQ_K$ can be moved to the memory 1622 in response to a transmission request associated with the group of cells GD being defined. In some embodiments, the group of cells GD can be moved to the memory 1622 before the transmission request associated with the group of cells GD is sent from the ingress schedule module 1620 to the egress schedule module 1630. The group of cells GD can be stored in the memory 1622 until the group of cells GD is transmitted from the ingress side of the switch fabric 1600 to the egress side of the switch fabric 1600. In some embodiments, the group of cells can be moved to the memory 1622 to reduce congestion (e.g., head-of-line (HOL) blocking) at the ingress queue $IQ_K$.

In some embodiments, the ingress schedule module 1620 can be configured to retrieve a group of cells stored in the memory 1622 based on a queue identifier and/or a queue sequence value associated with the group of cells. In some embodiments, the location of the group of cells within the memory 1622 can be determined based on a look-up table and/or an index value. The group of cells can be retrieved before the group of cells is transmitted from the ingress side of the switch fabric 1600 to the egress side of the switch fabric 1600. For example, the group of cells GD can be associated with a queue identifier and/or a queue sequence value. A location within the memory 1622 where the group of cells GD is stored can be associated with the queue identifier and/or the queue sequence value. A transmission request defined by the ingress schedule module 1620 and sent to the egress schedule module 1630 can include the queue identifier and/or the queue sequence value. A transmission response received from the egress schedule module 1630 can include the queue identifier and/or the queue sequence value. In response to the transmission response, the ingress schedule module 1620 can be configured to retrieve the group of cells GD from the memory 1622 at the location based on the queue identifier and/or the queue sequence value, and the ingress schedule module 1620 can trigger transmission of the group of cells GD.

In some embodiments, a number of cells included in a group of cells can be defined based on an amount of space available in the memory 1622. For example, the ingress schedule module 1620 can be configured to define the number of cells included in the group of cells GD based on an amount of available storage space included in the memory 1622 at the time that the group of cells GD is being defined. In some embodiments, the number of cells included in the group of cells GD can be increased if the amount of available storage space included in the memory 1622 increased. In some embodiments, the number of cells included in the group of cells GD can be increased by the ingress schedule module 1620 before and/or after the group of cells GD is moved to the memory 1622 for storage.

In some embodiments, a number of cells included in a group of cells can be defined based on a latency of transmission across, for example, the switch fabric 1600. Specifically, the ingress schedule module 1620 can be configured to define the size of a group of cells to facilitate flow across the switch fabric 1600 in view of latencies associated with the switch fabric 1600. For example, the ingress schedule module 1620 can be configured to close a group of cells (e.g., define a size of the group of cells) because the group of cells has reached a threshold size defined based on the latency of the switch fabric 1600. In some embodiments, the ingress schedule module 1620 can be configured to immediately send a data packet in a group of cells, rather than wait for additional data packets to define a larger group of cells, because the latency across the switch fabric 1600 is low.

In some embodiments, the ingress schedule module 1620 can be configured to limit the number of transmission requests sent from the ingress side of the switch fabric 1600 to the egress side of the switch fabric 1600. In some embodiments, the limit can be defined based on a policy stored at the ingress schedule module 1620. In some embodiments, a limit can be defined based on a priority value associated with one or more of the ingress queues 1610. For example, ingress schedule module 1620 can be configured to permit (based on a threshold limit) more transmission requests associated with ingress queue $IQ_1$ than from ingress queue $IQ_K$ because ingress queue $IQ_1$ has a higher priority value than ingress queue $IQ_K$.

In some embodiments, one or more portions of the ingress schedule module 1620 and/or the egress schedule module 1630 can be a hardware-based module (e.g., a DSP, FPGA) and/or a software-based module (e.g., a module of computer code, a set of processor-readable instructions that can be executed at a processor). In some embodiments, one or more of the functions associated with the ingress schedule module 1620 and/or the egress schedule module 1630 can be included in different modules and/or combined into one or more modules. For example, the group of cells GA can be defined by a first sub-module within the ingress schedule module 1620 and the transmission request 22 (shown in FIG. 16B) can be defined by a second sub-module within the ingress schedule module 1620.

In some embodiments, the switch fabric 1600 can have more or less stages than are shown in FIG. 16A. In some embodiments, the switch fabric 1600 can be a reconfigurable (e.g., a rearrangeable) switch fabric and/or a time-division multiplexed switch fabric. In some embodiments, switch fabric 1600 can be defined based on a Clos network architecture (e.g., a strict sense non-blocking Clos network, a Benes network).

Figure 17:
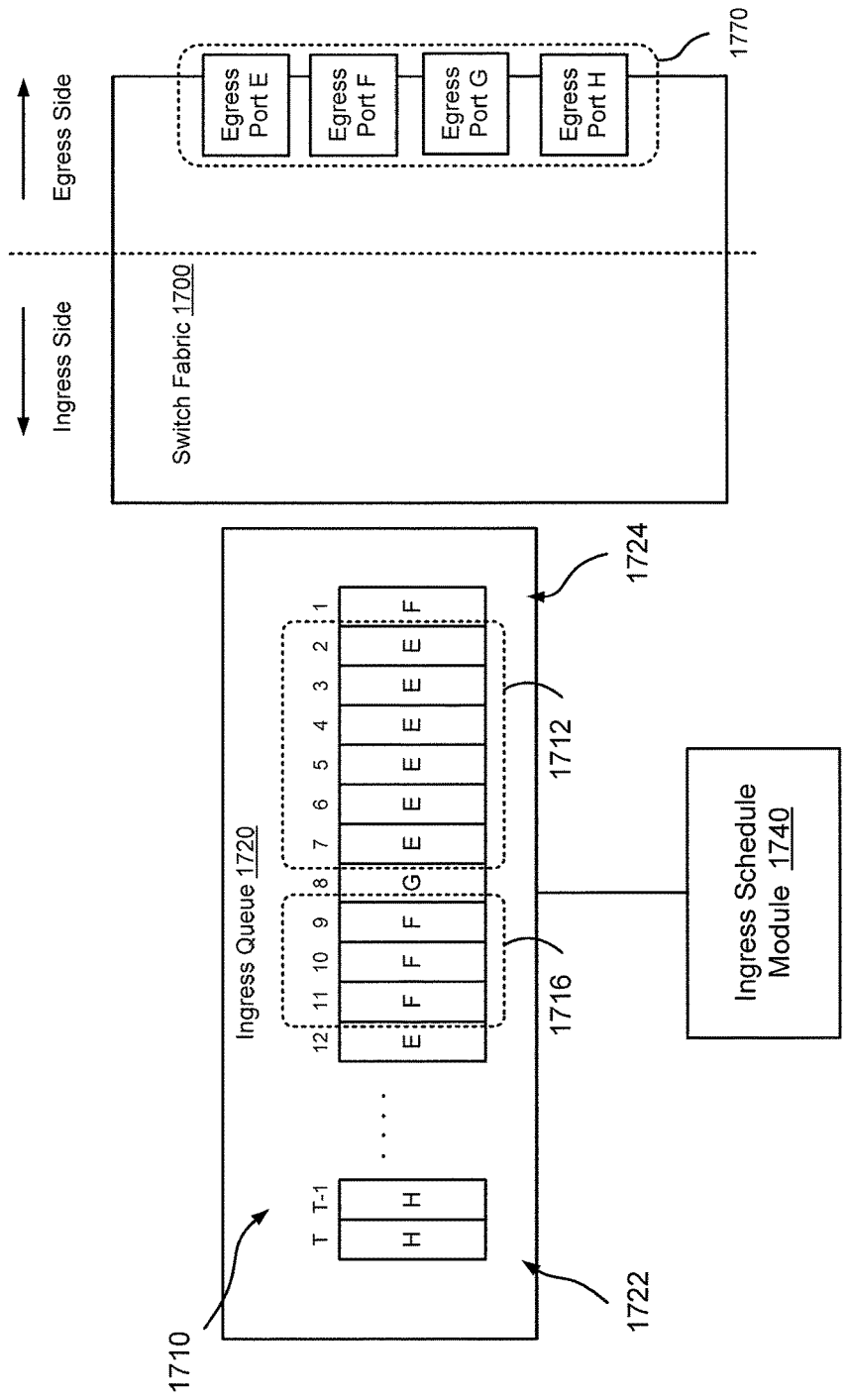
FIG. 17 is a schematic block diagram that illustrates two groups of cells queued at an ingress queue disposed on an ingress side of a switch fabric, according to an embodiment.

FIG. 17 is a schematic block diagram that illustrates two groups of cells queued at an ingress queue 1720 disposed on an ingress side of a switch fabric 1700, according to an embodiment. The groups of cells are defined by an ingress schedule module 1740 on an ingress side of the switch fabric 1700 that can be, for example, associated with a switch core and/or included in a switch core such as that shown in FIG. 16A. The ingress queue 1720 is also on the ingress side of the switch fabric 1700. In some embodiments, the ingress queue 1720 can be included in an ingress line card (not shown) associated with the switch fabric 1700. Although not shown, in some embodiments, one or more of the groups of cells can include many cells (e.g., 25 cells, 10 cells, 100 cells) or only one cell.

As shown in FIG. 17, the ingress queue 1720 includes cells 1 through T (i.e., $cell_1$ through $cell_T$), which can collectively be referred to as queued cells 1710. The ingress queue 1720 is a FIFO type queue with $cell_1$ being at the front end 1724 (or transmission end) of the queue and $cell_T$ being at the back end 1722 (or entry end) of the queue. As shown in FIG. 17, queued cells 1710 at the ingress queue 1720 include a first group of cells 1712 and a second group of cells 1716. In some embodiments, each cell from the queued cells 1710 can have an equal length (e.g., 32 byte length, 64 byte length). In some embodiments, two or more of the queued cells 1710 can have different lengths.

Each cell from the queued cells 1710 has content queued for transmission to one of four egress ports 1770—egress port E, egress port F, egress port G, or egress port H—as indicated by the egress port label (e.g., letter "E", letter "F") on each cell from the queued cells 1710. The egress port 1770 to which a cell is to be transmitted can be referred to as a destination port. The queued cells 1710 can each be transmitted to their respective destination port via the switch fabric 1700. In some embodiments, the ingress schedule module 1740 can be configured to determine the destination port for each cell from the queued cells 1710 based on, for example, a look-up table (LUT) such as a routing table. In some embodiments, the destination port of each cell from the queued cells 1710 can be determined based on a destination of content (e.g., data) included in the cell. In some embodiments, one or more of the egress ports 1770 can be associated with an egress queue where cells can be queued until transmitted via the egress ports 1770.

The first group of cells 1712 and the second group of cells 1716 can be defined by the ingress schedule module 1740 based on the destination ports of the queued cells 1710. As shown in FIG. 17, each cell included in the first group of cells 1712 has the same destination port (i.e., egress port E) as indicated by the egress port labels "E." Similarly, each cell included in the second group of cells 1716 has the same destination port (i.e., egress port F) as indicated by the egress port labels "F."

The groups of cells (e.g., the first group of cells 1712) are defined based on destination port because the groups of cells are transmitted via the switch fabric 1700 as a group. For example, if $cell_1$ were included in the first group of cells 1712, the first group of cells 1712 could not be delivered to a single destination port because $cell_1$ has a different destination port (egress port "F") than $cell_2$ through $cell_7$ (egress port "E"). Thus, the first group of cells 1712 could not be delivered via the switch fabric 1700 as a group.

The groups of cells are defined as continuous blocks of cells because the groups of cells are transmitted via the switch fabric 1700 as a group and because the ingress queue 1720 is a FIFO type queue. For example, $cell_{12}$ and $cell_2$ through $cell_7$ could not be defined as a group of cells because $cell_{12}$ cannot be transmitted with the block of cells $cell_2$ through $cell_7$. $Cell_8$ through $cell_{11}$ are intervening cells that must be transmitted from ingress queue 1720 after $cell_2$ through $cell_7$ are transmitted from ingress queue 1720, but before $cell_{12}$ is transmitted from ingress queue 1720. In some embodiments, if the ingress queue 1720 were not a FIFO type queue, one or more of the queued cells 1710 could be transmitted out of order and groups could span intervening cells.

Although not shown, each cell from the queues cells 1710 can have a sequence value that can be referred to as a cell sequence value. The cell sequence value can represent an order of, for example, $cell_2$ with respect to $cell_3$. The cell sequence value can be used to re-order the cells at, for example, one or more of the egress ports 1770 before the content associated with the cells is transmitted from the egress ports 1770. For example, in some embodiments, group of cells 1712 can be received at an egress queue (not shown) associated with egress port E and re-ordered based on cell sequence values. In some embodiments, the egress queue can be relatively small (e.g., a shallow egress queue) compared with the ingress queue 1720.

In addition, data (e.g., data packets) that is included within the cells can also have a sequence value that can be referred to as a data sequence value. For example, the data sequence value can represent a relative ordering of, for example, a first data packet with respect to a second data packet. The data sequence values can be used to re-order the data packets at, for example, one or more of the egress ports 1770 before the data packets are transmitted from the egress ports 1770.

Figure 18:
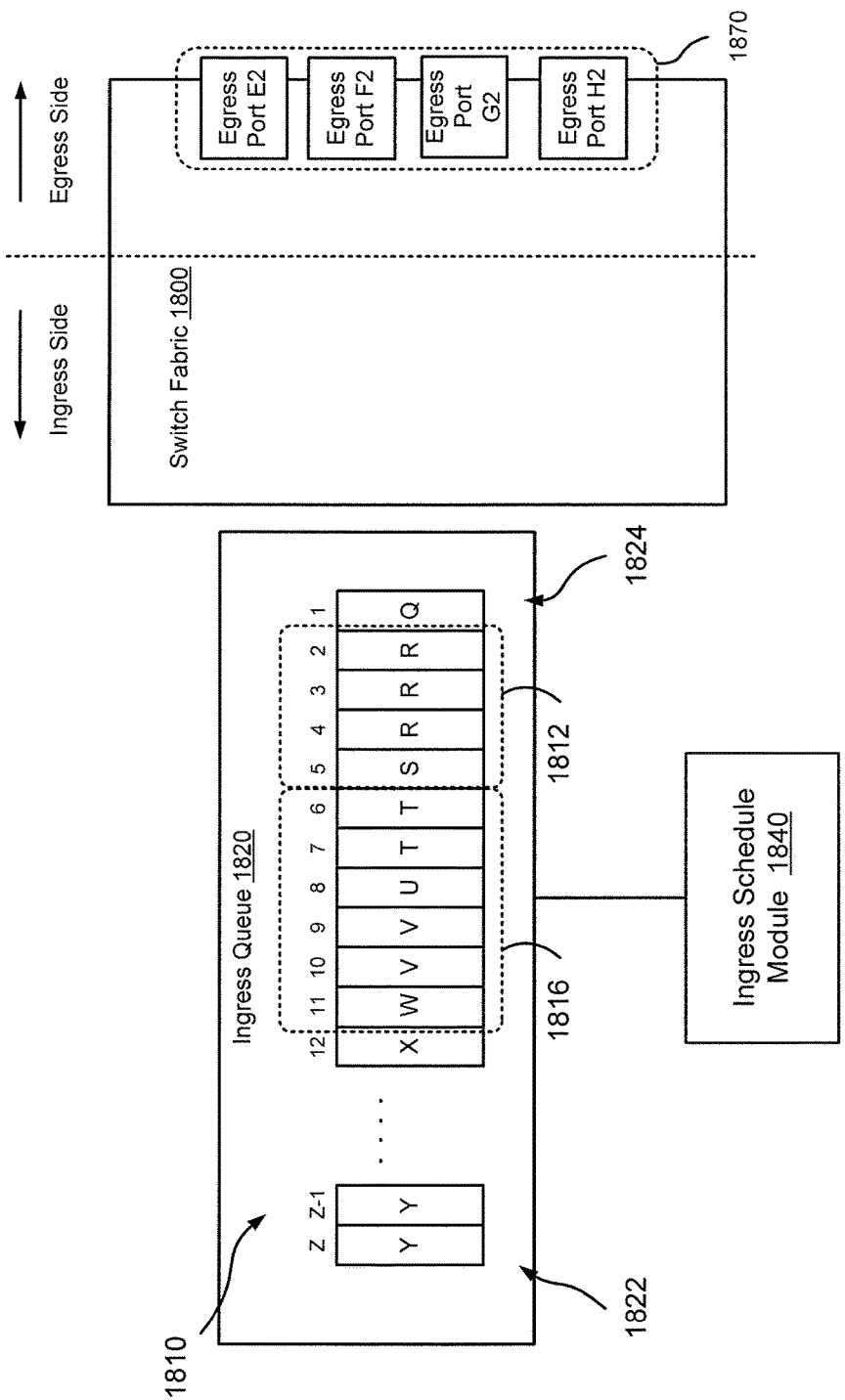
FIG. 18 is a schematic block diagram that illustrates two groups of cells queued at an ingress queue disposed on an ingress side of a switch fabric, according to another embodiment.

FIG. 18 is a schematic block diagram that illustrates two groups of cells queued at an ingress queue 1820 disposed on an ingress side of a switch fabric 1800, according to another embodiment. The groups of cells are defined by an ingress schedule module 1840 on an ingress side of the switch fabric 1800 that can be, for example, associated with a switch core and/or included in a switch core such as that shown in FIG. 16A. The ingress queue 1820 is also on the ingress side of the switch fabric 1800. In some embodiments, the ingress queue 1820 can be included in an ingress line card (not shown) associated with the switch fabric 1800. Although not shown, in some embodiments, one or more of the groups of cells can include only one cell.

As shown in FIG. 18, the ingress queue 1820 includes cells 1 through Z (i.e., $cell_1$ through $cell_Z$), which can collectively be referred to as queued cells 1810. The ingress queue 1820 is a FIFO type queue with $cell_1$ being at the front end 1824 (or transmission end) of the queue and $cell_Z$ being at the back end 1822 (or entry end) of the queue. As shown in FIG. 18, queued cells 1810 at the ingress queue 1820 include a first group of cells 1812 and a second group of cells 1816. In some embodiments, each cell from the queued cells 1810 can have an equal length (e.g., 32 byte length, 64 byte length). In some embodiments, two or more of the queued cells 1810 can have different lengths. In this embodiment, ingress queue 1820 is mapped to egress port F2 so that all of the cells 1810 are scheduled by the ingress schedule module 1840 for transmission via the switch fabric 1800 to egress port F2.

Each cell from the queued cells 1810 has content associated with one or more data packets (e.g., Ethernet data packets). The data packets are represented by the letters "Q" through "Y." For example, as shown in FIG. 18, data packet R is divided into three different cells, $cell_2$, $cell_3$, and $cell_4$.

The groups of cells (e.g., the first group of cells 1812) are defined so that portions of data packets are not associated with different groups of cells. Said differently, the groups of cells are defined so that entire data packets are associated with a single group of cells. The boundaries of the groups of cells are defined based on boundaries of the data packets queued at ingress queue 1820 so that the data packets are not included in different groups of cells. Dividing data packets into different groups of cells could result in undesirable consequences such as buffering at the egress side of the switch fabric 1800. For example, if a first portion of data packet T (e.g., $cell_6$) was included in the first group of cells 1812 and second portion of data packet T (e.g., $cell_7$) was included in the second group of cells 1816, the first portion of data packet T would have to be buffered in at least a portion of one or more egress queues (not shown) at the egress side of the switch fabric 1800 until the second portion of the data packet T were transmitted to the egress side of the switch fabric 1800 so that the entire data packet T could be transmitted from the switch fabric 1800 via egress port E2.

In some embodiments, the data packets that are included within the queued cells 1810 can also have a sequence value that can be referred to as a data sequence value. The data sequence value can represent a relative ordering of, for example, data packet R with respect to a data packet S. The data sequence values can be used to re-order the data packets at, for example, one or more of the egress ports 1870 before the data packets are transmitted from the egress ports 1870.

Figure 19:
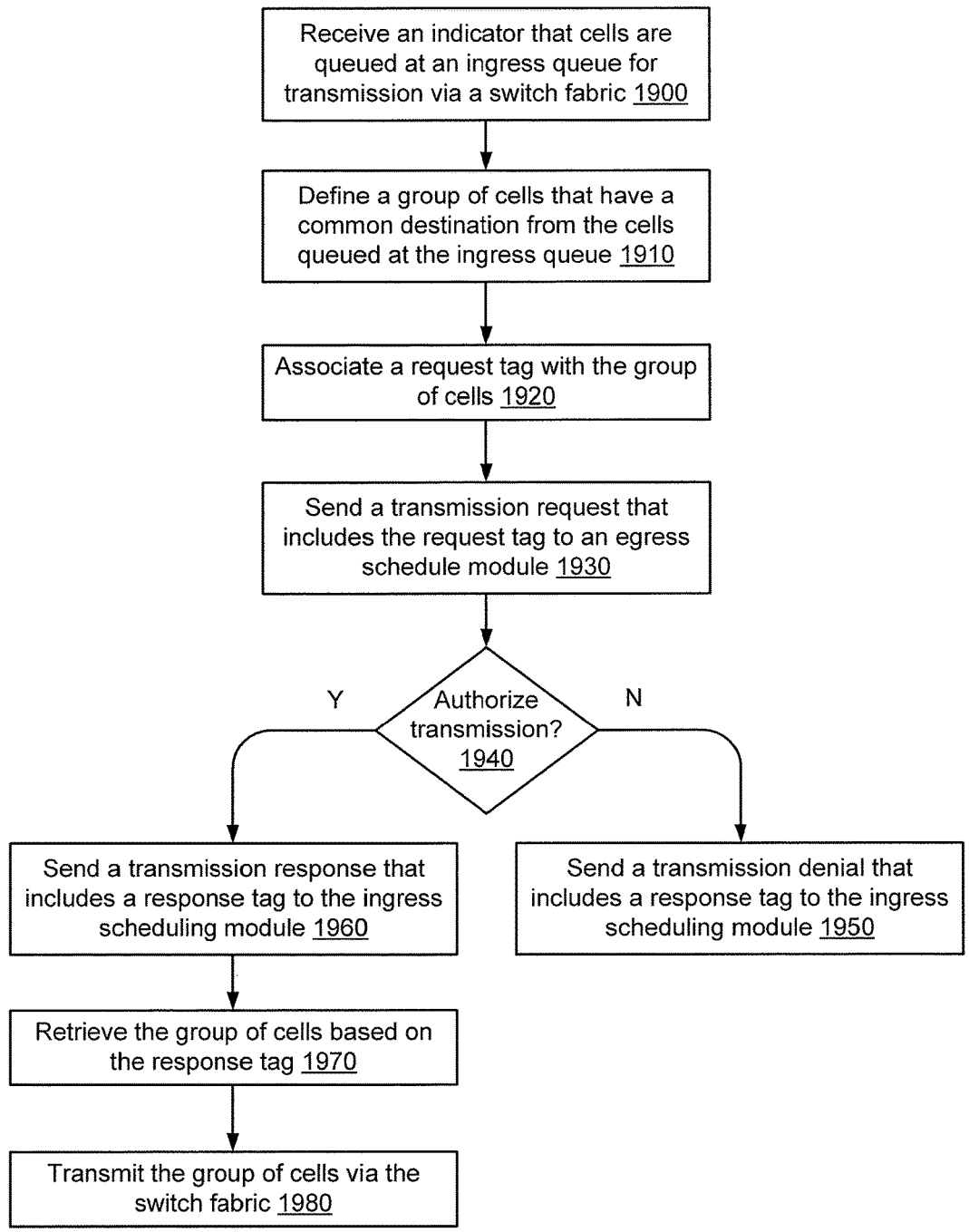
FIG. 19 is a flowchart that illustrates a method for scheduling transmission of a group of cells via a switch fabric, according to an embodiment.

FIG. 19 is a flowchart that illustrates a method for scheduling transmission of a group of cells via a switch fabric, according to an embodiment. As shown in FIG. 19, an indicator that cells are queued at an ingress queue for transmission via a switch fabric is received, at 1900. In some embodiments, the switch fabric can be based on a Clos architecture and can have multiple stages. In some embodiments, the switch fabric can be associated with (e.g., can be within) a switch core. In some embodiments, the indicator can be received when new cells are received at the ingress queue, or when the cells are ready (or nearly ready) to be transmitted via the switch fabric.

A group of cells that have a common destination are defined from the cells queued at the ingress queue, at 1910. The destination of each cell from the group of cells can be determined based on a look-up table. In some embodiments, the destination can be determined based on a policy and/or based on a packet classification algorithm. In some embodiments, the common destination can be a common destination port associated with an ingress portion of the switch fabric.

A request tag is associated with the group of cells, at 1920. The request tag can include, for example, one or more of a cell quantity value, a destination identifier, a queue identifier, a queue sequence value, and so forth. The request tag can be associated with the group of cells before the group of cells is transmitted to an ingress side of the switch fabric.

A transmission request that includes the request tag is sent to an egress schedule module, at 1930. In some embodiments, the transmission request can include a request to be transmitted at a particular time or via a particular transmission path. In some embodiments, the transmission request can be sent after the group of cells has been stored in a memory associated with an ingress stage of the switch fabric. In some embodiments, the group of cells can be moved to the memory to reduce the probability of congestion at the ingress queue. In other words, the group of cells can be moved to the memory so that other cells queued behind the group of cells can be prepared for transmission (or transmitted) from the ingress queue without waiting for the group of cells to be transmitted from the ingress queue. In some embodiments, the transmission request can be a request to transmit to a specified egress port (e.g., a specified destination port).

A transmission denial that includes a response tag is sent to the ingress scheduling module, at 1950 when, in response to the transmission request, transmission via the switch fabric is not authorized at 1940. In some embodiments, the transmission request can be denied because the switch fabric is congested, a destination port is unavailable, and so forth. In some embodiments, the transmission request can be denied for a specified period of time. In some embodiments, the response tag can include one or more identifiers that can be used to associate the transmission denial with the group of cells.

If the transmission via the switch fabric is authorized at 1940, a transmission response that includes a response tag to the ingress scheduling module is sent, at 1960. In some embodiments, the transmission response can be a transmission authorization. In some embodiments, the transmission response can be sent after a destination of the group of cells is ready (or nearly ready) to receive the group of cells.

The group of cells is retrieved based on the response tag, at 1970. If the group of cells has been moved to a memory, the group of cells can be retrieved from the memory. If the group of cells is queued at the ingress queue, the group of cells can be retrieved from the ingress queue. The group of cells can be retrieved based on a queue identifier and/or a queue sequence value included in the response tag. The queue identifier and/or the queue sequence value can be from the queue tag.

The group of cells can be transmitted via the switch fabric, at 1980. The group of cells can be transmitted via the switch fabric according to an instruction included in the transmission response. In some embodiments, the group of cells can be transmitted at a specified time and/or via a specified transmission path. In some embodiments, the group of cells can be transmitted via the switch fabric to a destination such as an egress port. In some embodiments, after being transmitted via the switch fabric, the group of cells can be queued at an egress queue associated with a destination (e.g., destination port) of the group of cells.

Figure 20:
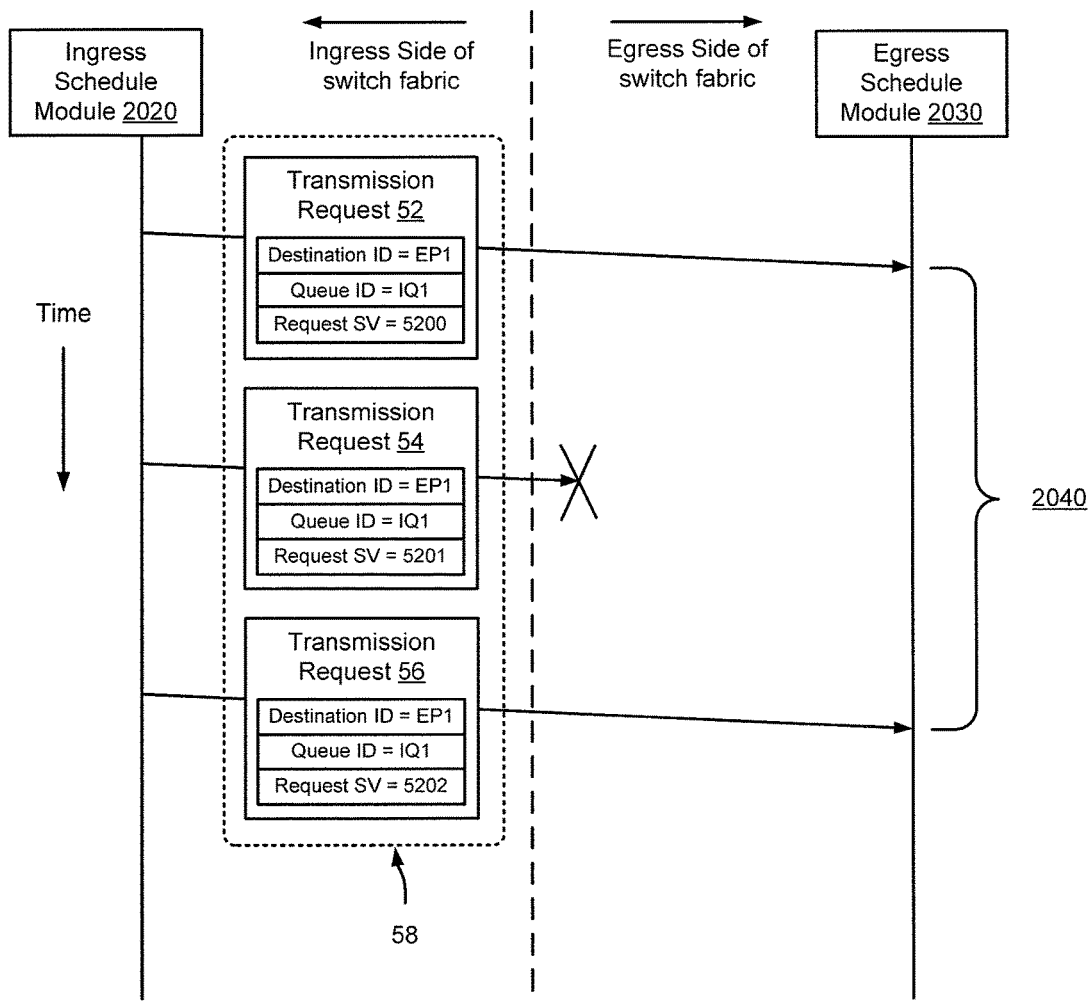
FIG. 20 is a signaling flow diagram that illustrates processing of request sequence values associated with transmission requests, according to an embodiment.

FIG. 20 is a signaling flow diagram that illustrates processing of request sequence values associated with transmission requests, according to an embodiment. As shown in FIG. 20, a transmission request 52 is transmitted from an ingress schedule module 2020 on an ingress side of a switch fabric to an egress schedule module 2030 on an egress side of a switch fabric. A transmission request 56 is transmitted from the ingress schedule module 2020 to the egress schedule module 2030 after the transmission request 52 is transmitted. As shown in FIG. 20, transmission request 54 is transmitted from ingress schedule module 2030, but is not received by egress schedule module 2030. Transmission request 52, transmission request 54, and transmission request 56 are each associated with the same ingress queue IQ1 as indicated by their respective queue identifiers, and are associated with the same destination port EP1 as indicated by their respective destination identifiers. Transmission request 52, transmission request 54 and transmission request 56 can collectively be referred to as transmission requests 58. As shown in FIG. 20, time is increasing in a downward direction.

As shown in FIG. 20, each of the transmission requests 58 can include a request sequence value (SV). The request sequence values can represent a sequence of a transmission request with respect to other transmission requests. In this embodiment, the request sequence values can be from a range of request sequence values that are associated with the destination port EP1, and are incremented in whole integers in numerical order. In some embodiments, the request sequence values can be, for example, strings and can be incremented in a different order (e.g., reverse numerical order). Transmission request 52 includes a request sequence value of 5200, transmission request 54 includes a request sequence value of 5201, and transmission request 56 includes a request sequence value of 5202. In this embodiment, the request sequence value of 5200 indicates that transmission request 52 was defined and sent before transmission request 54, which has a request sequence value of 5201.

The egress schedule module 2030 can determine that transmission of a transmission request from ingress schedule module 2020 may have failed based on the request sequence values. Specifically, the egress schedule module 2030 can determine that a transmission request associated with the request sequence value of 5201 was not received before transmission request 56, which is associated with request sequence value 5202, was received. In some embodiments, the egress schedule module 2030 can execute an action with respect to the missing transmission request 54 when a time period between receipt of transmission request 52 and transmission request 56 (shown as time period 2040) exceeds a threshold time period. In some embodiments, egress schedule module 2030 can request that ingress schedule module 2020 retransmit transmission request 54. The egress schedule module 2030 can include the missing request sequence value so that the ingress schedule module 2020 can identify the transmission request 54 that was not received. In some embodiments, egress schedule module 2030 can deny a request for transmission of a group of cells included in transmission request 56. In some embodiments, the egress schedule module 2030 can be configured to process and/or respond to transmission requests (such as transmission requests 58) based on queue sequence values in a substantially similar fashion to the methods described in connection with request sequence values.

Figure 21:
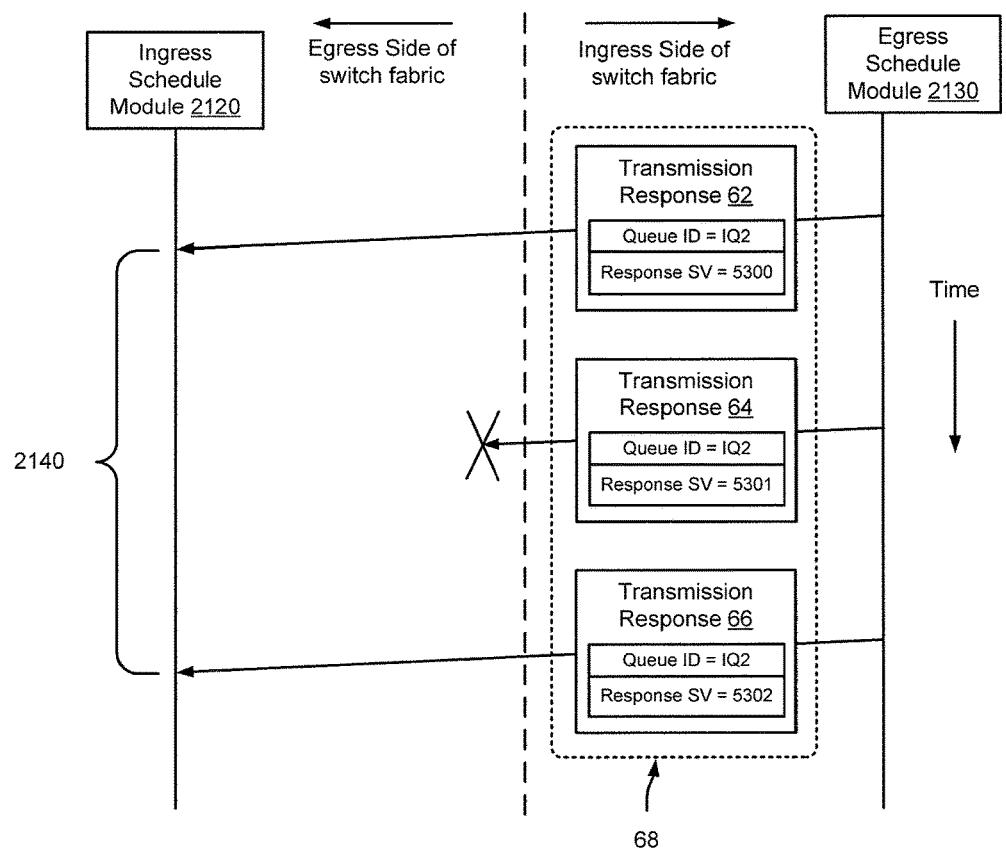
FIG. 21 is a signaling flow diagram that illustrates response sequence values associated with transmission responses, according to an embodiment.

FIG. 21 is a signaling flow diagram that illustrates response sequence values associated with transmission responses, according to an embodiment. As shown in FIG. 21, a transmission response 62 is transmitted from an egress schedule module 2130 on an egress side of a switch fabric to an ingress schedule module 2120 on an ingress side of a switch fabric. A transmission response 66 is transmitted from the egress schedule module 2130 to the ingress schedule module 2120 after the transmission response 62 is transmitted. As shown in FIG. 21, transmission response 64 is transmitted from egress schedule module 2130, but is not received by ingress schedule module 2120. Transmission response 62, transmission response 64, and transmission response 66 are associated with the same ingress queue IQ2 as indicated by their respective queue identifiers. Transmission response 62, transmission response 64 and transmission response 66 can collectively be referred to as transmission responses 68. As shown in FIG. 21, time is increasing in a downward direction.

As shown in FIG. 21, each of the transmission responses 68 can include an response sequence value (SV). The response sequence values can represent a sequence of a transmission response with respect to other transmission responses. In this embodiment, the response sequence values can be from a range of response sequence values that are associated with the ingress queue IQ2, and are incremented in whole integers in numerical order. In some embodiments, the response sequence values can be, for example, strings and can be incremented in a different order (e.g., reverse numerical order). Transmission response 62 includes an response sequence value of 5300, transmission response 64 includes an response sequence value of 5301, and transmission response 66 includes an response sequence value of 5302. In this embodiment, the response sequence value of 5300 indicates that transmission response 62 was defined and sent before transmission response 64, which has an response sequence value of 5301.

The ingress schedule module 2120 can determine that transmission of a transmission response from egress schedule module 2130 may have failed based on the response sequence values. Specifically, the ingress schedule module 2120 can determine that a transmission response associated with the response sequence value of 5301 was not received before transmission response 66, which is associated with the response sequence value of 5302, was received. In some embodiments, the ingress schedule module 2120 can execute an action with respect to the missing transmission response 64 when a time period between receipt of transmission response 62 and transmission response 66 (shown as time period 2140) exceeds a threshold time period. In some embodiments, ingress schedule module 2120 can request that egress schedule module 2130 retransmit transmission response 64. The ingress schedule module 2120 can include the missing response sequence value so that the egress schedule module 2130 can identify the transmission response 64 that was not received. In some embodiments, ingress schedule module 2120 can drop a group of cells when a transmission response associated with a transmission request is not received within a specified period of time.

Figure 22:
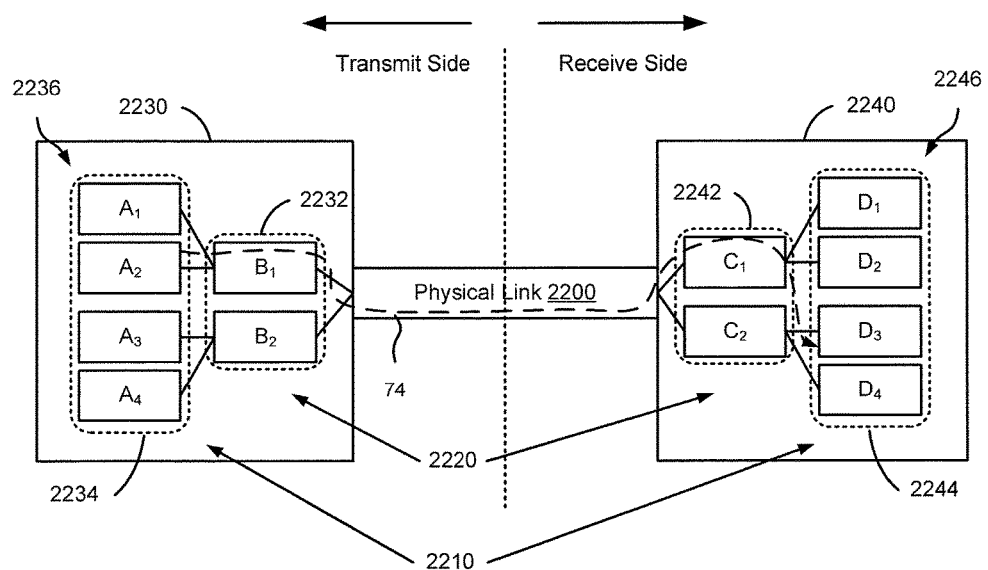
FIG. 22 is a schematic block diagram that illustrates multiple stages of flow-controllable queues, according to an embodiment.

FIG. 22 is a schematic block diagram that illustrates multiple stages of flow-controllable queues, according to an embodiment. As shown in FIG. 22, a transmit side of a first stage of queues 2210 and a transmit side of a second stage of queues 2220 are included in a source entity 2230 on a transmit side of a physical link 2200. A receive side of the first stage of queues 2210 and a receive side of the second stage of queues 2220 are included in a destination entity 2240 on a receive side of the physical link 2200. The source entity 2230 and/or the destination entity 2240 can be any type of computing device (e.g., a portion of a switch core, a peripheral processing device) that can be configured to receive and/or transmit data via the physical link 2200. In some embodiments, the source entity 2230 and/or the destination entity 2240 can be associated with a data center.

As shown in FIG. 22, the first stage of queues 2210 includes transmit queues $A_1$ through $A_4$ on the transmit side of the physical link 2200 (referred to as first-stage transmit queues 2234) and receive queues $D_1$ through $D_4$ on the receive side of the physical link 2200 (referred to as first-stage receive queues 2244). The second stage of queues 2220 includes transmit queues $B_1$ and $B_2$ on the transmit side of the physical link 2200 (referred to as second-stage transmit queues 2232) and receive queues $C_1$ and $C_2$ on the receive side of the physical link 2200 (referred to as second-stage receive queues 2242).

Flow of data via the physical link 2200 can be controlled (e.g., modified, suspended) based on flow control signaling associated with flow control loops between the source entity 2230 and the destination entity 2240. For example, data transmitted from the source entity 2230 on the transmit side of the physical link 2200 can be received at the destination entity 2240 on the receive side of the physical link 2200. A flow control signal can be defined at and/or sent from the destination entity 2240 to the source entity 2230 when the destination entity 2240 is unavailable to receive data from source entity 2230 via the physical link 2200. The flow control signal can be configured to trigger the source entity 2230 to modify the flow of the data from the source entity 2230 to the destination entity 2240.

For example, if receive queue $D_2$ is unavailable to handle data transmitted from transmit queue $A_1$, the destination entity 2240 can be configured to send a flow control signal associated with a flow control loop to the source entity 2230; the flow control signal can be configured to trigger suspension of transmission of data from the transmit queue $A_1$ to the receive queue $D_2$ via a transmission path that includes at least a portion of the second stage of queues 2220 and the physical link 2200. In some embodiments, the receive queue $D_2$ can be unavailable, for example, when the receive queue $D_2$ is too full to receive data. In some embodiments, the receive queue D2 can change from an available state to an unavailable state (e.g., a congestion state) in response to data previously received from the transmit queue $A_1$. In some embodiments, transmit queue $A_1$ can be referred to as a target of the flow control signal. The transmit queue $A_1$ can be identified within the flow control signal based on a queue identifier associated with the transmit queue $A_1$. In some embodiments, the flow control signal can be referred to as a feedback signal.

In this embodiment, a flow control loop is associated with the physical link 2200 (referred to as a physical link control loop), a flow control loop is associated with first the stages of queues 2210 (referred to as a first stage control loop), and a flow control loop is associated with the second stage of queues 2220 (referred to as a second stage control loop). Specifically, the physical link control loop is associated with a transmission path that includes the physical link 2200, and excludes the first stage of queues 2210 as well as the second stage of queues 2220. Flow of data via the physical link 2200 can be turned on and turned off based on flow control signaling associated with the physical link control loop.

The first stage control loop can be based on transmission of data from at least one of the transmit queues 2234 within the second stage of queues 2210 and a flow control signal defined based on an availability of (e.g., an indicator of an availability of) at least one of the receive queues 2244 within the first stage of queues 2210. Thus, the first stage control loop can be referred to as being associated with the first stage of queues 2210. The first stage control loop can be associated with a transmission path that includes the physical link 2200, at least a portion of the second stage of queues 2220, and at least a portion of the first stage of queues 2210. Flow control signaling associated with the first stage control loop can trigger control of data flow from transmit queues 2234 associated with the first stage of queues 2210.

The second stage control loop can be associated with a transmission path that includes the physical link 2200 and includes at least a portion of the second stage of queues 2220, but excludes the first stage of queues 2210. The second stage control loop can be based on transmission of data from at least one of the transmit queues 2232 within the second stage of queues 2220 and a flow control signal defined based on an availability of (e.g., an indicator of an availability of) at least one of the receive queues 2242 within the second stage of queues 2220. Thus, the second stage control loop can be referred to as being associated with the second stage of queues 2220. Flow control signaling associated with the second stage control loop can trigger control of data flow from transmit queues 2232 associated with the second stage of queues 2220.

In this embodiment, the flow control loop associated with the second stage of queues 2220 is a priority-based flow control loop. Specifically, each transmit queue from the second-stage transmit queues 2232 is paired with a receive queue from the second-stage receive queues 2242; and each queue pair is associated with a level of service (also can be referred to as a class of service or quality of service). In this embodiment, second-stage transmit queue $B_1$ and second-stage transmit queue $C_1$ define a queue pair and are associated with level of service X. The second-stage transmit queue $B_2$ and second-stage transmit queue $C_2$ define a queue pair and are associated with service level Y. In some embodiments, different types of network traffic can be associated with a different level of service (and, thus a different priority). For example, storage traffic (e.g., read and write traffic), inter-processor communication, media signaling, session layer signaling, and so forth each can be associated with at least one level of service. In some embodiments, the second stage control loop can be based on, for example, the Institute of Electrical and Electronics Engineers (IEEE) 802.1qbb protocol, which defines a priority-based flow control strategy.

Flow of data via a transmission path 74, shown in FIG. 22, can be controlled using at least one of the control loops. Transmission path 74 includes first-stage transmit queue $A_2$, second-stage transmit queue $B_1$, the physical link 2200, second-stage receive queue $C_1$, and first-stage receive queue $D_3$. Changes in data flow via a queue in one stage of the transmission path 74 based on a flow control loop associated with that stage, however, can impact data flow through another stage of the transmission path 74. Flow control at one stage can affect data flow at another stage because the queues (e.g., transmit queues 2232, transmit queues 2234) within the source entity 2230 and the queues (e.g., receive queues 2242, receive queues 2244) within the destination entity 2240 are staged. In other words, flow control based on one flow control loop can have an impact on flow of data via elements associated with a different flow control loop.

For example, flow of data from first-stage transmit queue $A_1$ via transmission path 74 to first-stage receive queue $D_3$ can be modified based on one or more of the control loops—the first stage control loop, the second stage control loop, and/or the physical link control loop. Suspension of data flow to the first-stage receive queue $D_3$ may be triggered because the first-stage receive queue $D_3$ may have changed from an available state to an unavailable state (e.g., a congestion state).

If the data flowing to first-stage receive queue $D_3$ is associated with level of service X, the flow of data via second-stage transmit queue $B_1$ and second-stage receive queue $C_1$ (which define the queue pair associated with level of service X) can be suspended based on flow control signaling associated with the second stage control loop (which is a priority-based control loop). But suspending transmission of data via the queue pair associated with level of service X can result in suspension of data transmissions from transmit queues that fan into the second-stage transmit queue $B_1$. Specifically, suspending transmission of data via the queue pair associated with level of service X can result in suspension of data transmissions from not only first-stage transmit queue $A_2$, but also of data transmissions from first-stage transmit queue $A_1$. In other words, flow of data from the first-stage transmit queue $A_1$ is indirectly or collaterally affected. In some embodiments, data received at transmit queue $A_1$ and data received at transmit queue $A_2$ can be associated with the same level of service X, but the data received at transmit queue $A_1$ and the data received at transmit queue $A_2$ may be from, for example, from different (e.g., independent) network devices (not shown) such as peripheral processing devices that can be associated with a different level of service.

The data flowing to first-stage receive queue $D_3$ can also be suspended by specifically suspending transmission of data from the first-stage transmit queue $A_2$ based on flow control signaling associated with the first stage control loop. By directly suspending transmission of data from the first-stage transmit queue $A_2$, data transmissions from first-stage transmit queue $A_1$ may not be disrupted. In other words, flow control of the first-stage transmit queue $A_2$ can be directly controlled based on a flow control signal associated with the first stage control loop without suspending data transmission from other first-stage transmit queues such as the first-stage transmit queue $A_1$.

Flow of data to first-stage receive queue $D_3$ can also be controlled by suspending transmission of data via the physical link 2200 based on flow control signaling associated with the physical link control loop. But suspending transmission of data via the physical link 2200 can result in suspension of all data transmissions via the physical link 2200.

The queues on the transmit side of the physical link 2200 can be referred to as transmit queues 2236 and the queues on the receive side of the physical link can be referred to as receive queues 2246. In some embodiments, the transmit queues 2236 can also be referred to as source queues, and the receive queues 2246 can be referred to as destination queues. Although not shown, in some embodiments, one or more of the transmit queues 2236 can be included in one or more interface cards associated with the source entity 2230, and one or more of the receive queues 2246 can be included in one or more interface cards associated with the destination entity 2240.

When source entity 2230 transmits data via the physical link 2200, source entity 2230 can be referred to as a transmitter disposed on a transmit side of the physical link 2200. Destination entity 2240 can be configured to receive the data and can be referred to as a receiver disposed on a receive side of the physical link 2200. Although not shown, in some embodiments, the source entity 2230 (and associated elements (e.g., transmit queues 2236)) can be configured to function as a destination entity (e.g., a receiver) and the destination entity 2240 (and associated elements (e.g., receive queues 2246)) can be configured to function as a source entity (e.g., a transmitter). Moreover, the physical link 2200 can function as a bidirectional link.

In some embodiments, the physical link 2200 can be a tangible link such as an optical link (e.g., a fiber optic cable, a plastic fiber cable), a cable link (e.g., a copper-based wire), a twisted pair link (e.g., a category-5 cable), and so forth. In some embodiments, the physical link 2200 can be a wireless link. Data transmissions via the physical link 2200 can be defined based on a protocol such as an Ethernet protocol, a wireless protocol, an Ethernet protocol, a fiber channel protocol, a fiber-channel-over Ethernet protocol, an Infiniband-related protocol, and/or so forth.

In some embodiments, the second stage control loop can be referred to as being nested within the first stage control loop because the second stage of queues 2220, which is associated with the second stage control loop, is disposed inside of the first stage of queues 2210, which is associated with the first stage control loop. Similarly, the physical link control loop can be referred to as being nested within the second stage control loop. In some embodiments, the second stage control loop can be referred to as an inner control loop and the first stage control loop can be referred to as an outer control loop.

Figure 23:
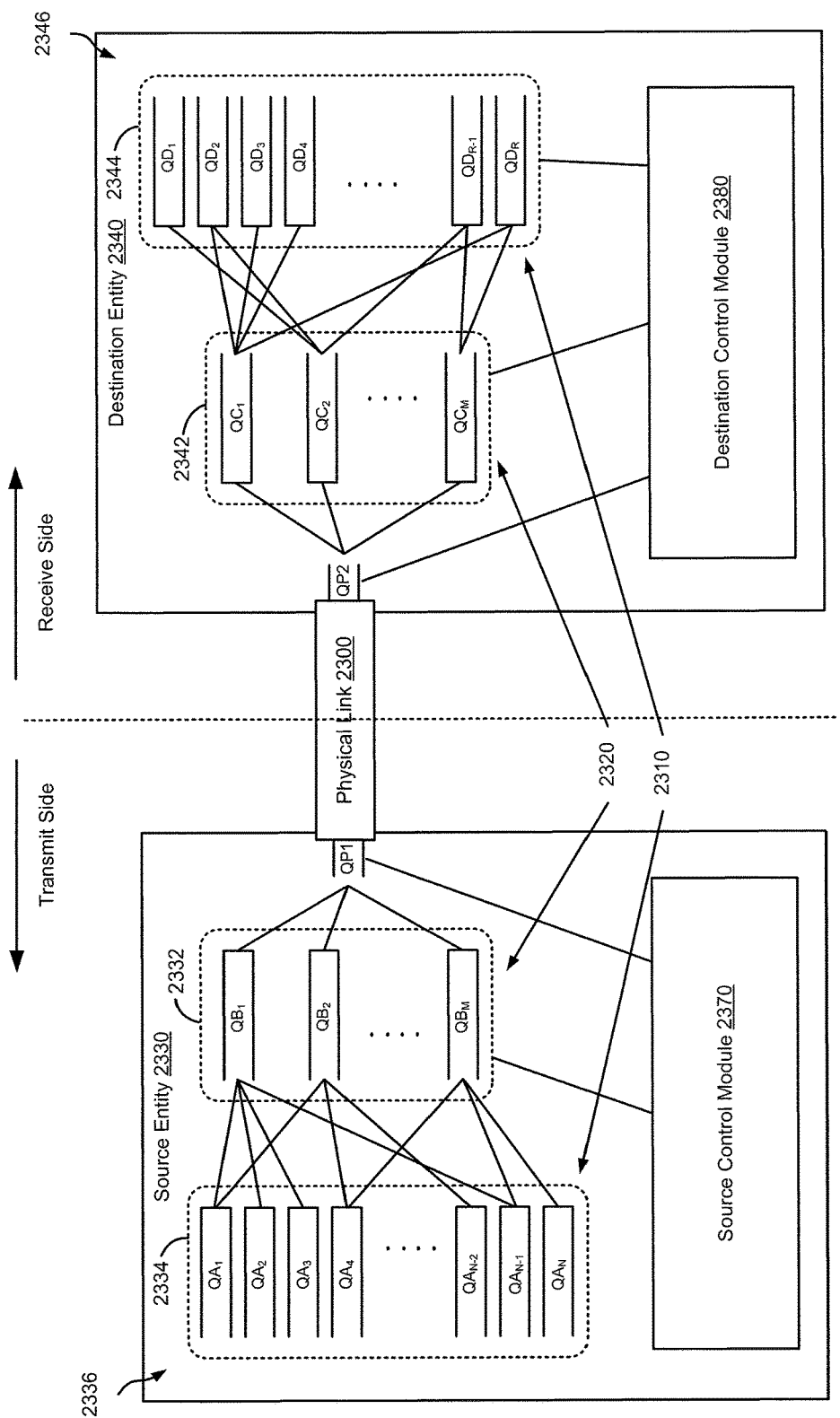
FIG. 23 is a schematic block diagram that illustrates multiple stages of flow-controllable queues, according to an embodiment.

FIG. 23 is a schematic block diagram that illustrates multiple stages of flow-controllable queues, according to an embodiment. As shown in FIG. 23, a transmit side of a first stage of queues 2310 and a transmit side of a second stage of queues 2320 are included in a source entity 2330 disposed on a transmit side of a physical link 2300. A receive side of the first stage of queues 2310 and a receive side of the second stage of queues 2320 are included in a destination entity 2340 disposed on a receive side of the physical link 2300. The queues on the transmit side of the physical link 2300 can collectively be referred to as transmit queues 2336 and the queues on the receive side of the physical link can collectively be referred to as receive queues 2346. Although not shown, in some embodiments, the source entity 2330 can be configured to function as a destination entity, and the destination entity 2340 can be configured to function as a source entity (e.g., a transmitter). Moreover, the physical link 2300 can function as a bidirectional link.

As shown in FIG. 23, source entity 2330 is in communication with destination entity 2340 via the physical link 2300. Source entity 2330 has a queue QP1 configured to buffer data (if necessary) before the data is transmitted via the physical link 2300, and destination entity 2340 has a queue QP2 configured to buffer data (if necessary) received via the physical link 2300 before the data is distributed at the destination entity 2340. In some embodiments, flow of data via the physical link 2300 can be handled without the buffers queue QP1 and queue QP2.

Transmit queues $QA_1$ through $QA_N$, which are included the first stage of queues 2310, can each be referred to as a first-stage transmit queue and can collectively be referred to as transmit queues 2334 (or as queues 2334). Transmit queues $QB_1$ through $QB_M$, which are included in the second stage of queues 2320, can each be referred to as a second-stage transmit queue and can collectively be referred to as transmit queues 2332 (or as queues 2332). Receive queues $QD_1$ through $QD_R$, which are included in the first stage of queues 2310, can each be referred to as a first-stage receive queue and can collectively be referred to as receive queues 2344 (or as queues 2344). Receive queues $QC_1$ through $QC_M$, which are in the second stage of queues 2320, can each be referred to as a second-stage receive queue and can collectively be referred to as receive queues 2342 (or as queues 2342).

As shown in FIG. 23, each queue from the second stage of queues 2320 is disposed within a transmission path between the physical link 2300 and at least one queue from the first stage of queues 2310. For example, a portion of a transmission path can be defined by first-stage receive queue $QD_4$, second-stage receive queue $QC_1$, and the physical link 2300. Second-stage receive queue $QC_1$ is disposed within the transmission path between first-stage receive queue $QD_4$ and the physical link 2300.

In this embodiment, a physical link control loop is associated with the physical link 2300, a first stage control loop is associated with first the stages of queues 2310, and a second stage control loop is associated with the second stage of queues 2320. In some embodiments, the second stage control loop can be priority-based control loop. In some embodiments, the physical link control loop can include the physical link 2300, queue QP1, and queue QP2.

Flow control signals can be defined at and/or transmitted between a source control module 2370 at the source entity 2330 and a destination control module 2380 at the destination entity 2340. In some embodiments, the source control module 2370 can be referred to as a source flow control module, and the destination control module 2380 can be referred to as a destination flow control module. For example, destination control module 2380 can be configured to send a flow control signal to source control module 2370 when one or more of the receive queues 2346 (e.g., receive queue $QD_2$) at the destination entity 2340 is unavailable to receive data. The flow control signal can be configured to trigger source control module 2370 to, for example, suspend the flow of data from one or more of the receive queues 2336 to the one or more receive queues 2346.

A queue identifier can be associated with data queued at a transmit queue from the transmit queues 2336 by the source control module 2370 before the data is transmitted. The queue identifier can represent and/or can be used to identify the transmit queue where the data is being queued. For example, when a data packet is queued at first-stage transmit queue $QA_4$, a queue identifier uniquely identifying first-stage transmit queue $QA_4$ can be appended to the data packet or included in a field (e.g., a header portion, a trailer portion, a payload portion) within the data packet. In some embodiments, the queue identifier can be associated with data at the source control module 2370, or triggered by the source control module 2370. In some embodiments, the queue identifier can be associated with data just before the data is transmitted, or after the data has been transmitted from one of the transmit queues 2336.

The queue identifier can be associated with data transmitted from the transmit side of the physical link 2300 to the receive side of the physical link 2300 so that the source of the data (e.g., the source queue) can be identified. Accordingly, a flow control signal can be defined to suspend transmission of one or more of the transmit queues 2336 based on the queue identifier. For example, a queue identifier associated with first-stage transmit queue $QA_N$ can be included in a data packet transmitted from first-stage transmit queue $QA_N$ to first-stage receive queue $QD_3$. If after receiving the data packet, first-stage receive queue $QD_3$ is unable to receive another data packet from first-stage transmit queue $QA_N$, a flow control signal requesting that first-stage transmit queue $QA_N$ suspend transmission of additional data packets to first-stage receive queue $QD_3$ can be defined based on the queue identifier associated with first-stage transmit queue $QA_N$. The queue identifier can be parsed from the data packet by the destination control module 2380 and used by the destination control module 2380 to define the flow control signal.

In some embodiments, data transmissions to first-stage receive queue $QD_R$ from several of the transmit queues 2336 (e.g., first-stage transmit queues 2334) can be suspended in response to the first-stage receive queue $QD_R$ changing from an available state to an unavailable state. Each of the several transmit queues 2336 can be identified within a flow control signal based on their respective queue identifiers.

In some embodiments, one or more of the transmit queues 2336 and/or one or more of the receive queues 2346 can be a virtual queue (e.g., a logically defined group of queues). Accordingly, a queue identifier can be associated with (e.g., can represent) the virtual queue. In some embodiments, a queue identifier can be associated with a queue from a set of queues that define a virtual queue. In some embodiments, each queue identifier from a set of queue identifiers associated with the physical link 2300 can be unique. For example, each transmit queues 2336, which are associated with the physical link 2300 (e.g., associated with a hop), can be associated with a unique queue identifier.

In some embodiments, the source control module 2370 can be configured to associate a queue identifier with only a specified subset of the transmit queues 2336 and/or only a subset of data queued at one of the transmit queues 2336. For example, if data is transmitted from first-stage transmit queue $QA_2$ to first-stage receive queue $QD_1$ without a queue identifier, a flow control signal configured to request that transmission of data from first-stage transmit queue $QA_2$ be suspended may not be defined because the source of the data may not be known. Accordingly, a transmit queue from the transmit queues 2336 can be exempted from flow control by not associating (e.g., omitting) a queue identifier with data when the data is transmitted from the transmit queue.

In some embodiments, the unavailability of one or more of the receive queues 2346 at the destination entity 2340 can be defined based on a condition being satisfied. The condition can be related to a storage limit of a queue, a queue access rate, a flow rate of data into the queue, and so forth. For example, a flow control signal can be defined at the destination control module 2380 in response to a status of one or more of the receive queues 2346 such as second-stage receive queue $QC_2$ changing from an available state to an unavailable state (e.g., a congestion state) based on a threshold storage limit being exceeded. The second-stage receive queue $QC_2$ can be unavailable to receive data when in the unavailable state because, for example, the second-stage receive queue $QC_2$ is considered too full (as indicated by the threshold storage limit being exceeded). In some embodiments, one or more of the receive queue 2346 can be in an unavailable state when disabled. In some embodiments, the flow control signal can be defined based on a request to suspend transmission of data to a receive queue from the receive queues 2346 when the receive queue is unavailable to receive data. In some embodiments, the status of one or more of the receive queues 2346 can be changed from an available state to a congestion state (by destination control module 2380) in response to a specified subset of receive queues 2346 (e.g., receive queues within a specified stage) being in a congestion state.

In some embodiments, a flow control signal can be defined at the destination control module 2380 to indicate that one of the receive queues 2346 has changed from an unavailable state to an available state. For example, initially, the destination control module 2380 can be configured to define and send a first flow control signal to the source control module 2370 in response to first-stage receive queue $QD_3$ changing from an available state to an unavailable state. The first-stage receive queue $QD_3$ can change from the available state to the unavailable state in response to data sent from first-stage transmit queue $QA_2$. Accordingly, the target of the first flow control signal can be first-stage transmit queue $QA_2$ (as indicated based on a queue identifier). When the first-stage receive queue $QD_3$ changes from the unavailable state back to the available state, the destination control module 2380 can be configured to define and send a second flow control signal to the source control module 2370 indicating the change from the unavailable state back to the available state. In some embodiments, the source control module 2370 can be configured to trigger transmission of data from one or more of the transmit queues 2336 to the first-stage receive queue $QD_3$ in response to the second flow control signal.

In some embodiments, a flow control signal can have one or more parameter values that can be used by the source control module 2370 to modify transmission from one of the transmit queues 2336 (identified within the flow control signal by a queue identifier). For example, a flow control signal can include a parameter value that can trigger the source control module 2370 to suspend transmission from one of the transmit queues 2336 for a specified period of time (e.g., 10 milliseconds (ms)). In other words, the flow control signal can include a suspension-time-period parameter value. In some embodiments, the suspension time period can be indefinite. In some embodiments, the flow control signal can define a request to transmit data from one or more of the transmit queues 2336 at a specified rate (e.g., specified number of frames per second, specified number of bytes per second).

In some embodiments, a flow control signal (e.g., the suspension time period within the flow control signal) can be defined based on a flow control algorithm. The suspension time period can be defined based on a time period during which a receive queue from the receive queues 2346 (e.g., first-stage receive queue $QD_4$) will be unavailable. In some embodiments, the suspension time period can be defined based on more than one of the first stage receive queues 2344 being unavailable. For example, in some embodiments, the suspension time period can be increased when more or less than a specified number of the first stage receive queues 2344 is in a congestion state. In some embodiments, this type of determination can be made at the destination control module 2380. The time period during which the receive queue will be unavailable can be a projected (e.g., predicted) time period calculated by the destination control module 2380 based on, for example, a flow rate (e.g., a historic flow rate, a prior flow rate) of data from the receive queue.

In some embodiments, the source control module 2370 can deny or alter a request to modify the flow of data from one or more of the transmit queues 2336. For example, in some embodiments, the source control module 2370 can be configured to decrease or increase a suspension time period. In some embodiments, rather than suspend transmission of data in response to a flow control signal, the source control module 2370 can be configured to modify a transmission path associated with one of the transmission queues 2336. For example, if first-stage transmit queue $QA_2$ has received a request to suspend transmission based on a change in status of first-stage receive queue $QD_2$, the source control module 2370 can be configured to trigger transmission of data from first-stage transmit queue QA2 to, for example, first-stage receive queue $QD_3$ rather than comply with the request to suspend transmission.

As shown in FIG. 23, queues within the second stage of queues 2320 fan into or fan out of the physical link 2300. For example, transmit queues 2332 (i.e., queues $QB_1$ through $QB_M$) on the transmit side of the physical link 2300 fan into queue QP1 on the transmit side of physical link 2300. Accordingly, data queued at any of the transmit queues 2332 can be transmitted to queue QP1 of the physical link 2300. On the receive side of the physical link 2300, data transmitted from the physical link 2300 via queue QP2 can be broadcast to receive queues 2342 (i.e., queues $QC_1$ through $QC_M$).

Also, as shown in FIG. 23, transmit queues 2334 within a first stage of queues 2310 fan into the transmit queues 2332 within the second stage of queues 2320. For example, data queued at any of the first-stage transmit queues $QA_1$, $QA_4$, and $QA_{N-2}$ can be transmitted to second-stage transmit queue $QB_2$. On the receive side of the physical link 2300, data transmitted from, for example, second-stage receive queue $QC_M$ can be broadcast to first-stage receive queues $QD_{R-1}$ and $QD_R$.

Because many of the flow control loops (e.g., first control loop) are associated with different fan-in and fan-out architectures, the flow control loops can have various affects on the flow of data via the physical link 2300. For example, when transmission of data from the second-stage transmit queue $QB_1$ is suspended based on the second stage control loop, transmission of data from first-stage transmit queues $QA_1$, $QA_2$, $QA_3$, and $QA_{N-1}$ via the second-stage transmit queue $QB_1$ to one or more of the receive queues 2346 is also suspended. In this case, transmission of data from one or more upstream queues (e.g., first-stage transmit queue $QA_1$) can be suspended when transmission from a downstream queue (e.g., second-stage transmit queue $QB_1$) is suspended. In contrast, if transmission of data from first-stage transmit queue $QA_1$ along a transmission path that includes at least downstream second-stage transmit queue $QB_1$ is suspended based on the first stage control loop, a flow rate of data from the second-stage transmit queue $QB_1$ may be decreased without entirely suspending transmission of data from second-stage transmit queue $QB_1$; first-stage transmit queue $QA_1$, for example, may still be able to transmit data via second-stage transmit queue $QB_1$.

In some embodiments, the fan-in and fan-out architecture can be different than that shown in FIG. 23. For example, in some embodiments, some of the queues within the first stage of queues 2310 can be configured to fan into the physical link 2300, bypassing the second stage of queues 2320.

Flow control signaling associated with the transmit queues 2336 is handled by the source control module 2370 and flow control signaling associated with the receive queues 2346 is handled by the destination control module 2380. Although not shown, in some embodiments, flow control signaling can be handled by one or more control modules (or control sub-modules) that can be separate and/or integrated into a single control module. For example, flow control signaling associated with the first-stage receive queues 2344 can be handled by a control module separate from a control module configured to handle flow control signaling associated with the second-stage receive queues 2342. Likewise, flow control signaling associated with the first-stage transmit queues 2334 can be handled by a control module separate from a control module configured to handle flow control signaling associated with the second-stage transmit queues 2332. In some embodiments, one or more portions of the source control module 2370 and/or the destination control module 2380 can be a hardware-based module (e.g., a DSP, a FPGA) and/or a software-based module (e.g., a module of computer code, a set of processor-readable instructions that can be executed at a processor).

Figure 24:
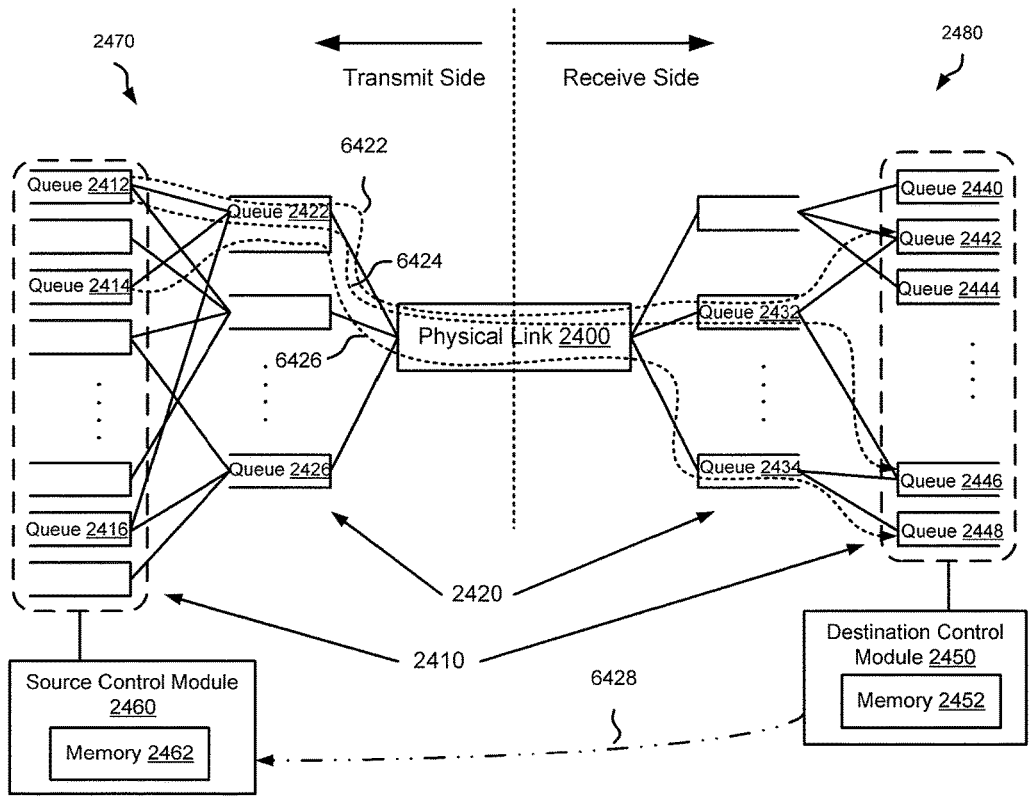
FIG. 24 is a schematic block diagram that illustrates a destination control module configured to define a flow control signal associated with multiple receive queues, according to an embodiment.

FIG. 24 is a schematic block diagram that illustrates a destination control module 2450 configured to define a flow control signal 6428 associated with multiple receive queues, according to an embodiment. The stages of queues include a first stage of queues 2410 and a second stage of queues 2420. As shown in FIG. 24, a source control module 2460 is associated with a transmit side of the first stage of queues 2410 and a destination control module 2450 is associated with a receive side of the first stage of queues 2410. The queues on the transmit side of a physical link 2400 can collectively be referred to as transmit queues 2470. The queues on the receive side of the physical link 2400 can collectively be referred to as receive queues 2480.

The destination control module 2450 is configured to send the flow control signal 6428 to the source control module 2460 in response to one or more receive queues within the first stage of queues 2410 being unavailable to receive data from a single source queue at the first stage of queues 2410. The source control module 2460 can be configured to suspend transmission of data from the source queue at the first stage of queues 2410 to the multiple receive queues at the first stage of queues 2410 based on the flow control signal 6428.

The flow control signal 6428 can be defined by the destination control module 2450 based on information associated with each unavailable receive queue within the first stage of queues 2410. The destination control module 2450 can be configured to collect the information associated with the unavailable receive queues and can be configured to define the flow control signal 6428 so that potentially conflicting flow control signals (not shown) will not be sent to the single source queue at the first stage of queues 2410. In some embodiments, the flow control signal 6428 defined based on the collection of information can be referred to as an aggregated flow control signal.

Specifically, in this example, the destination control module 2450 is configured to define the flow control signal 6428 in response to two receive queues—receive queue 2442 and receive queue 2446—at the receive side of the first stage of queues 2410 being unavailable to receive data from a transmit queue 2412 on the transmit side of the first stage of queues 2410. In this embodiment, receive queue 2442 and receive queue 2446 are changed from an available state to an unavailable state in response to data packets sent from transmit queue 2412 via transmission path 6422 and transmission path 6424, respectively. As shown in FIG. 24, transmission path 6422 includes transmit queue 2412, transmit queue 2422 within a second stage of queues 2420, the physical link 2400, receive queue 2432 within the second stage of queues 2420, and receive queue 2442. Transmission path 6424 includes transmit queue 2412, transmit queue 2422, the physical link 2400, receive queue 2432, and receive queue 2446.

In some embodiments, a flow control algorithm can be used to define the flow control signal 6428 based on information related to the unavailability of receive queue 2442 and/or information related to the unavailability of receive queue 2446. For example, if destination control module 2450 determines that receive queue 2442 and that receive queue 2446 will be unavailable for different time periods, the destination control module 2450 can be configured to define the flow control signal 6428 based on the different time periods. For example, the destination control module 2450 can request, via the flow control signal 6428, that transmission of data from transmit queue 2412 be suspended for a time period calculated based on the different time periods (e.g., a time period equal to an average of the different time periods, a time period equal to the greater of the time different periods). In some embodiments, the flow control signal 6428 can be defined based on individual suspension requests from the receive side of the first stage of queues 2410 (e.g., a suspension request associated with receive queue 2442 and a suspension request associated with receive queue 2446).

In some embodiments, the flow control signal 6428 can be defined based on a maximum or a minimum allowable time period. In some embodiments, the flow control signal 6428 can be calculated based on an aggregate flow rate of data from, for example, transmit queue 2412. For example, the suspension time period can be scaled based on the aggregate flow rate of data from transmit queue 2412. In some embodiments, for example, the suspension time period can be increased if the flow rate of data from transmit queue 2412 is larger than a threshold value, and the suspension time period can be decreased if the flow rate of data from transmit queue 2412 is lower than a threshold value.

In some embodiments, the flow control algorithm can be configured to wait for a specified period of time before defining and/or sending the flow control signal 6428. The wait time period can be defined so that multiple suspension requests related to transmit queue 2412 and, which can be received at different times within the wait time period, can be used to define the flow control signal 6428. In some embodiments, the wait period can be triggered in response to at least one suspension request related to transmit queue 2412 being received.

In some embodiments, the flow control signal 6428 can be defined by a flow control algorithm based on a priority value associated with each receive queue within the first stage of queues 2410. For example, if receive queue 2442 has a priority value that is higher than a priority value associated with receive queue 2446, the destination control module 2450 can be configured to define the flow control signal 6428 based on information associated with receive queue 2442 rather than receive queue 2446. For example, the flow control signal 6428 can be defined based on a suspension time period associated with receive queue 2442 rather than a suspension time period associated with receive queue 2446 because receive queue 2442 can have a higher priority value than a priority value associated with receive queue 2446.

In some embodiments, the flow control signal 6428 can be defined by a flow control algorithm based on an attribute associated with each receive queue within the first stage of queues 2410. For example, the flow control signal 6428 can be defined based on receive queue 2442 and/or receive queue 2446 being a specified type of queue (e.g., a last-in-first-out (LIFO) queue, a first-in-first-out (FIFO) queue). In some embodiments, the flow control signal 6428 can be defined based on receive queue 2442 and/or receive queue 2446 being configured to receive a specified type of data (e.g., a control data/signal queue, a media data/signal queue).

Although not shown, one or more control modules associated with a stage of queues (e.g., the first stage of queues 2410) can be configured to send information to a different control module where the information can be used to define a flow control signal. The different control module can be associated with a different stage of queues. For example, a suspension request associated with receive queue 2442 and a suspension request associated with receive queue 2446 can be defined at destination control module 2450. The suspension requests can be sent to a destination control module (not shown) associated with a receive side of the second stage of queues 2420. A flow control signal (not shown) can be defined at the destination control module associated with the receive side of the second stage of queues 2420 based on the suspension requests and based on a flow control algorithm.

The flow control signal 6428 can be defined based on a flow control loop associated with the first stage of queues 2410 (e.g., a first stage control loop). One or more flow control signals (not shown) can also be defined based on a flow control loop associated with the second stage of queues 2420 and/or a flow control loop associated with the physical link 2400.

Transmission of data associated with transmit queues within the first stage of queues 2410 (other than transmit queue 2412) is substantially unrestricted by flow control signal 6428 because flow of data to the receive queues 2442 and 2446 is controlled based on the first stage flow control loop. For example, transmit queue 2414 can continue to transmit data via transmit queue 2422 even though transmission of data from transmit queue 2412 is suspended. For example, transmit queue 2414 can be configured to transmit data via transmission path 6426, which includes transmit queue 2422, to receive queue 2448 even though transmission of data from transmit queue 2412 via transmit queue 2422 has been suspended. In some embodiments, transmit queue 2422 can be configured to continue to transmit data to receive queue 2442 from, for example, transmit queue 2416 even though transmission of data from queue 2412 via transmission path 6422 has been suspended based on flow control signal 6428.

If transmission of data to the receive queues 2442 and 2446 were instead suspended by controlling flow of data via transmit queue 2422 based on a flow control signal (not shown) associated with the second stage control loop, transmission of data from transmit queue 2414 and transmit queue 2416 via transmit queue 2422 would also be restricted (in addition to transmission of data from transmit queue 2412). Transmission of data from transmit queue 2422 could be suspended because it is associated with a specified level of service, and the data that caused, for example, congestion at receive queues 2442 and 2446 may be associated with that specified level of service.

One or more parameter values defined within the flow control signal 6428 can be stored at a memory 2452 of the destination control module 2450. In some embodiments, the parameter value(s) can be stored at the memory 2452 of the destination control module 2450 after they have been defined and/or when the flow control signal 6428 is sent to the source control module 2460. A parameter value defined within the flow control signal 6428 can be used to track a state of, for example, transmit queue 2412. For example, an entry within the memory 2452 can indicate that the transmit queue 2412 is in a suspended state (e.g., a non-transmit state). The entry can be defined based on a suspension-time-period parameter value defined within the flow control signal 6428. When the suspension time period has expired, the entry can be updated to indicate that the state of the transmit queue 2412 has changed to, for example, an active state (e.g., a transmit state). Although not shown, in some embodiments, the parameter value(s) can be stored at a memory (e.g., a remote memory) outside of the destination control module 2450.

In some embodiments, the parameter value(s) (e.g., state information defined based on the parameter value(s)) stored at the memory 2452 of the destination control module 2450 can be used by the destination control module 2450 to determine whether or not an additional flow control signal (not shown) should be defined. In some embodiments, the parameter value(s) can be used by the destination control module 2450 to define one or more additional flow control signals.

For example, if receive queue 2442 is changed from an available state to an unavailable (e.g., a congestion state) in response to a first data packet received from transmit queue 2412, a request to suspend transmission of data from transmit queue 2412 can be communicated via the flow control signal 6428. The flow control signal 6428 can indicate, based on a queue identifier, that transmit queue 2412 is a target of the request and can specify a suspension time period. The suspension time period and the queue identifier associated with transmit queue 2412 can be stored in the memory 2452 of the destination control module 2450 when the flow control signal 6428 is sent to the source control module 2460. After the flow control signal 6428 is sent, receive queue 2444 can be changed from an available state to a congestion state in response to a second data packet received from transmit queue 2412 (transmission path is not shown in FIG. 24). The second data packet can be sent from the transmit queue 2412 before transmission of data from the transmit queue 2412 is suspended based on flow control signal 6428. The destination control module 2450 can access the information stored in the memory 2452 and can determine that an additional flow control signal targeted to transmit queue 2412 should not be defined and sent to the source control module 2460 in response to the change in state associated with receive queue 2444 because flow control signal 6428 has already been sent.

In some embodiments, the source control module 2460 can be configured to suspend transmission from transmit queue 2412 based on the most recent flow control signal parameter values. For example, after the flow control signal 6428, which is targeted to transmit queue 2412, has been sent to the source control module 2460, a later flow control signal (not shown) targeted to transmit queue 2412 can be received at the source control module 2460. The source control module 2460 can be configured to implement one or more parameter values associated with the later flow control signal rather than parameter values associated with flow control signal 6428. In some embodiments, the later flow control signal can trigger the transmit queue 2412 to remain in a suspended state for a longer or shorter period of time than indicated in the flow control signal 6428.

In some embodiments, the source control module 2460 can optionally implement one or more of the parameter values associated with the later flow control signal when a priority value associated with the parameter value(s) is higher (or lower) than a priority value associated with one or more of the parameter values associated with flow control signal 6428. In some embodiments, each priority value can be defined at the destination control module 2450 and each priority value can be defined based on a priority value associated with one or more of the receive queues 2480.

In some embodiments, the flow control signal 6428 and the later flow control signal (which are both targeted to transmit queue 2412) can both be defined in response to the same receive queue from the receive queues 2480 being unavailable. For example, the later flow control signal can include updated parameter values defined by the destination control module 2450 based on receive queue 2442 remaining in an unavailable state for a longer period of time than previously calculated. In some embodiments, the flow control signal 6428 targeted to transmit queue 2412 can be defined in response to one of the receive queues 2480 changing state (e.g., changing from an available state to an unavailable state), and the later flow control signal targeted to transmit queue 2412 can be defined in response to another of the receive queues 2480 changing state (e.g., changing from an available state to an unavailable state).

In some embodiments, multiple flow control signals can be defined at the destination control module 2450 to suspend transmissions from multiple transmit queues from the first stage of queues 2410. In some embodiments, the multiple transmit queues can be transmitting data to a single receive queue such as receive queue 2444. In some embodiments, a history of the flow control signals to the multiple transmit queues from the first stage of queues 2410 can be stored in the memory 2452 of the destination control module 2450. In some embodiments, a later flow control signal associated with the single receive queue can be calculated based on the history of the flow control signals.

In some embodiments, suspension time periods that are associated with multiple transmit queues can be grouped and included in a flow control packet. For example, a suspension time period associated with transmit queue 2412 and a suspension time period associated with transmit queue 2414 can be included in a flow control packet (also can be referred to as a flow control packet). More details related to a flow control packet are described in connection with FIG. 25.

Figure 25:
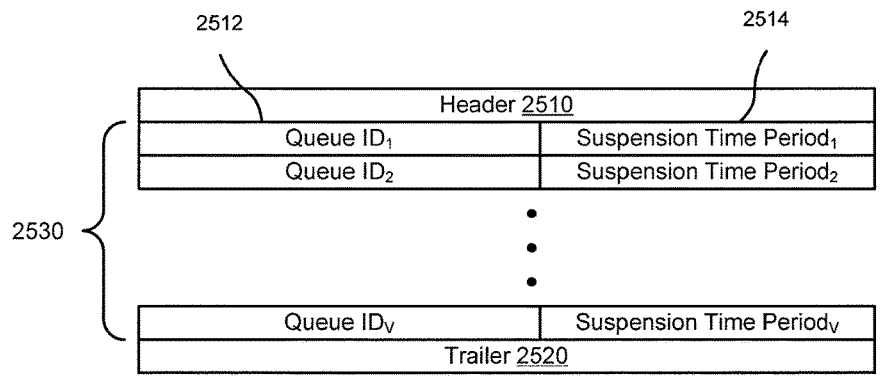
FIG. 25 is a schematic diagram that illustrates a flow control packet, according to an embodiment.

FIG. 25 is a schematic diagram that illustrates a flow control packet, according to an embodiment. The flow control packet includes a header 2510, a trailer 2520, and a payload 2530 that includes suspension-time-period parameter values (shown in column 2512) for several transmit queues represented by queue identifiers (IDs) (shown in column 2514). As shown in FIG. 25, transmit queues represented by queue IDs 1 through V (i.e., Queue $ID_1$ through Queue $ID_V$) are each associated with a suspension-time-period parameter value 1 through V (i.e., Suspension Time $Period_1$ through Suspension Time $Period_V$). The suspension-time-period parameter values 2514 indicate time periods during which transmit queues represented by the queue IDs 2512 should be suspended (e.g., prohibited) from transmitting data.

In some embodiments, the flow control packet can be defined at, for example, a destination control module such as destination control module 2450 shown in FIG. 24. In some embodiments, the destination control module can be configured to define a flow control packet at regular time intervals. For example, the destination control module can be configured to define a flow control packet every 10 ms. In some embodiments, the destination control module can be configured to define a flow control packet at random times, when a suspension-time-period parameter value has been calculated, and/or when a specified number of suspension-time-period parameter values have been calculated. In some embodiments, the destination control module can determine that at least a portion of the flow control packet should not be defined and/or sent, for example, based on one or more parameter values and/or state information accessed by the destination control module.

Although not shown, in some embodiments, multiple queue IDs can be associated with a single suspension-time-period parameter value. In some embodiments, at least one queue ID can be associated with a parameter value other than a suspension-time-period parameter value. For example, a queue ID can be associated with a flow rate parameter value. The flow rate parameter value can indicate a flow rate (e.g., a maximum flow rate) at which transmit queues (represented by the queue IDs) should transmit data. In some embodiments, the flow control packet can have one or more fields configured to indicate whether or not a particular receive queue is available to receive data.

The flow control packet can be communicated from the destination control module to a source control module (such as source control module 2460 shown in FIG. 24) via a flow control signal (such as flow control signal 6428 shown in FIG. 24). In some embodiments, the flow control packet can be defined based on a layer-2 (e.g., layer-2 of the OSI model) protocol. In other words, the flow control packet can be defined at and used within layer-2 of a network system. In some embodiments, the flow control packet can be transmitted between devices associated with layer-2 (e.g., a MAC device).

Referring back to FIG. 25, one or more parameter values (e.g., state information defined based on the parameter value(s)) associated with the flow control signal 6428 can be stored in a memory 2562 of the source control module 2560.

In some embodiments, the parameter value(s) can be stored at the memory 2562 of the source control module 2560 when the flow control signal 6428 is received at the source control module 2560. A parameter value defined within the flow control signal 6428 can be used to track a state of one or more of the receive queues 2580 (e.g., receive 2542). For example, an entry within the memory 2562 can indicate that receive queue 2542 is unavailable to receive data. The entry can be defined based on a suspension-time-period parameter value defined within the flow control signal 6428 and associated with an identifier (e.g., a queue identifier) of the receive queue 2542. When the suspension time period has expired, the entry can be updated to indicate that the state of the receive queue 2542 has changed to, for example, an active state. Although not shown, in some embodiments, the parameter value(s) can be stored at a memory (e.g., a remote memory) outside of the source control module 2560.

In some embodiments, the parameter value(s) (and/or state information) stored at the memory 2562 of the source control module 2560 can be used by the source control module 2560 to determine whether or not data should be transmitted to one or more of the receive queues 2580. For example, the source control module 2560 can be configured to transmit data from transmit queue 2516 to receive queue 2544 rather than receive queue 2542 based on state information related to receive queue 2544 and receive queue 2542.

In some embodiments, the source control module 2560 can analyze data transmission patterns to determine whether or not data should be transmitted from one or more of the source queues 2570 to one or more of the receive queues 2580. For example, the source control module 2560 can determine based on parameter values stored at the memory 2562 of the source control module 2560 that transmit queue 2514 is sending a relatively high volume of data to receive queue 2546. Based on this determination the source control module 2560 can trigger queue 2516 to transmit data to receive queue 2548 rather than receive queue 2546 because receive queue 2546 is receiving the high volume of data from transmit queue 2514. By analyzing transmission patterns associated with the transmit queues 2570 the onset of congestion at one or more of the receive queues 2580 can be substantially avoided.

In some embodiments, the source control module 2560 can analyze parameter values (and/or state information) stored at the memory 2562 of the source control module 2560 to determine whether or not data should be transmitted to one or more of the receive queues 2580. By analyzing stored parameter values (and/or state information), the onset of congestion at one or more of the transmit queues 2580 can be substantially avoided. For example, the source control module 2560 can trigger data to be transmitted to receive queue 2540 rather than receive queue 2542 based on the historical availability of receive queue 2540 compared with (e.g., being better than, being worse than) the historical availability of receive queue 2542. In some embodiments, for example, the source control module 2560 can transmit data to receive queue 2542 rather than receive queue 2544 based on the historical performance of receive queue 2542 compared with the historical performance of receive queue 2544 with respect to data bursts patterns. In some embodiments, the analysis of parameter values related to one or more of the receive queues 2580 can be based on a particular time window, a particular type of network transaction (e.g., inter-processor communication), a particular level of service, and so forth.

In some embodiments, the destination control module 2550 can send status information (e.g., current status information) about the receive queues 2580 that can be used by the source control module 2560 to determine whether or not data should be transmitted from one or more of the source queues 2570. For example, the source control module 2560 can trigger queue 2514 to transmit data to queue 2544 rather than queue 2546 because queue 2546 has more available capacity than queue 2544 as indicated by the destination control module 2550. In some embodiments, any combination of current status information, transmission pattern analysis, and historical data analysis can be used to substantially prevent, or reduce the likelihood of the onset of congestion of one or more of the receive queues 2580.

In some embodiments, the flow control signal 6428 can be sent from the destination control module 2550 to the source control module 2560 via an out-of-band transmission path. For example, the flow control signal 6428 can be sent via a link dedicated to communications related to flow control signaling. In some embodiments, the flow control signal 6428 can be transmitted via queues associated with the second stage of queues 2520, queues associated with the first stage of queues 2510, and/or the physical link 2500.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as ASICs, Programmable Logic Devices (PLDs), and Read-Only Memory (ROM) and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a network management module configured to be coupled to a plurality of edge devices having a first plurality of ports that are coupled to a multi-stage switch fabric and a second plurality of ports that are coupled to a plurality of peripheral processing devices;
the network management module configured to receive a first signal that includes (1) the data about the network resource operatively coupled to a peripheral processing device from the plurality of peripheral processing devices, (2) an access switch identifier, and (3) a port identifier;
the network management module configured to send a signal to a logical entity using the data about the network resource, the access switch identifier, and the port identifier such that the logical entity causes a virtual resource at a peripheral processing device from the plurality of peripheral processing devices to be provisioned when the virtual resource is attached to or separated from an edge device from the plurality of edge devices; and
the network management module configured to associate a network location with the virtual resource based on data received from the edge device.

2. The apparatus of claim 1, wherein:
the virtual resource is provisioned such that the virtual resource is migratable from a first peripheral processing device from the plurality of peripheral processing devices to a second peripheral processing device from the plurality of peripheral processing devices.

3. The apparatus of claim 1, wherein a number of ports in the first plurality of ports for the plurality of edge devices is less than a number of ports in the second plurality of ports of the plurality of edge devices.

4. The apparatus of claim 1, wherein the plurality of peripheral processing devices include at least one of (1) a plurality of compute nodes, (2) a plurality of service nodes, (3) a plurality of routers, or (4) a plurality of storage nodes.

5. The apparatus of claim 1, wherein the virtual resource is provisioned without a static description of a network that includes the virtual resource.

6. An apparatus, comprising:
a network management module configured to be operatively coupled to a plurality of edge devices that are operatively coupled to a plurality of peripheral processing devices,
the network management module configured to receive, from the edge device from the plurality of edge devices, information about a network resource operatively coupled to a peripheral processing device from the plurality of peripheral processing devices, when the network resource is attached to or separated from an edge device from the plurality of edge devices,
the network management module configured to determine network topology information for the network based on (1) the information about the network resource and (2) information about the edge device,
the network management module configured to store the information about the network resource, without storing the network topology information,
the network management module configured to send a signal to a logical entity, the signal including the network topology information and provisioning instructions and not including a static description of a network including the network resource.

7. The apparatus of claim 6, wherein the plurality of peripheral processing devices include at least one of each of (1) a plurality of compute nodes, (2) a plurality of service nodes, (3) a plurality of routers, or (4) a plurality of storage nodes.

8. The apparatus of claim 6, wherein:
the network resource is provisioned such that the network resource migratable from the first peripheral processing device to the second peripheral processing device from the plurality of peripheral processing devices.

9. The apparatus of claim 6, wherein the network management module receives the information about the network resource from a network device included in the network.

10. The apparatus of claim 6, wherein the information about the network resource is at least one of a network resource identifier or an identifier of the peripheral processing device operatively coupled to the network resource.

11. A method, comprising:
receiving a signal indicating that a status of a network resource associated with a peripheral processing device from a plurality of peripheral processing devices has changed;
querying the peripheral processing device for data about the network resource; and
sending, to a network management device, a signal that includes (1) the data about the network resource, (2) an access switch identifier, and (3) a port identifier, so as to instruct the network management device to initiate provisioning of the network resource using the data about the network resource, the access switch identifier, and the port identifier and not using a static description of a network including the network resource.

12. The method of claim 11, wherein the data about the network resource includes a device identifier of the network resource.

13. The method of claim 11, wherein the data about the network resource is queried using link layer discovery protocol (LLDP).

14. The method of claim 11, wherein:
the peripheral processing device is a first peripheral processing device,
the network resource status indicates that the network resource has (1) been instantiated, (2) started, or (3) moved to a second peripheral processing device from the plurality of peripheral processing devices.

15. The method of claim 11, wherein the port identifier is an identifier of a port at an access switch to which the peripheral processing device is operatively coupled, the access switch being identified by the access switch identifier.

16. The method of claim 11, wherein the network resource is hosted at the peripheral processing device.

* * * * *